United States Patent
Ha et al.

(10) Patent No.: US 10,091,411 B2
(45) Date of Patent: Oct. 2, 2018

(54) MOBILE TERMINAL AND CONTROLLING METHOD THEREOF FOR CONTINUOUSLY TRACKING OBJECT INCLUDED IN VIDEO

(71) Applicant: LG ELECTRONICS INC., Seoul (KR)

(72) Inventors: Kilho Ha, Seoul (KR); Jaewoo Seo, Seoul (KR); Kyoungtae Yoo, Seoul (KR); Geumju An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 257 days.

(21) Appl. No.: 14/701,261

(22) Filed: Apr. 30, 2015

(65) Prior Publication Data

US 2015/0365587 A1    Dec. 17, 2015

(30) Foreign Application Priority Data

Jun. 17, 2014 (KR) .................. 10-2014-0073421
Jun. 17, 2014 (KR) .................. 10-2014-0073422

(51) Int. Cl.
  *G06F 3/0488* (2013.01)
  *H04N 5/232* (2006.01)
  (Continued)

(52) U.S. Cl.
  CPC ....... *H04N 5/23216* (2013.01); *G06F 3/0482* (2013.01); *G06F 3/0486* (2013.01); *G06F 3/04842* (2013.01); *G06F 3/04847* (2013.01); *G06F 3/04883* (2013.01); *G11B 27/309* (2013.01); *H04N 5/23212* (2013.01); *H04N 5/23293* (2013.01); *H04N 5/772* (2013.01)

(58) Field of Classification Search
  CPC .. H04N 5/23216; H04N 5/77; H04N 5/23212; H04N 5/23293; G06F 3/04883; G06F 3/0482; G06F 3/04842; G06F 3/04847; G06F 3/0486; G11B 27/309
  See application file for complete search history.

(56) References Cited

U.S. PATENT DOCUMENTS 8,239,359 B2 *   8/2012  Barsook .............. G06F 17/3079
                                                        386/239
9,621,794 B2 *   4/2017  Shirakawa ......... H04N 5/23216
(Continued)

FOREIGN PATENT DOCUMENTS

JP    2004-140670 A    5/2004
JP    2009-181216 A    8/2009
(Continued)

*Primary Examiner* — Jennifer N To
*Assistant Examiner* — Amy P Hoang
(74) *Attorney, Agent, or Firm* — Birch, Stewart, Kolasch & Birch, LLP

(57) ABSTRACT

A mobile terminal including a memory configured to store a plurality of videos; a touchscreen configured to display an image on a screen; and a controller configured to in response to receiving a selection of at least one object included in the image, search the videos for at least one video including an image of the selected at least one object; control the touchscreen to display a list including at least one item indicating the searched video; and in response to receiving a selection of at least one item included in the list, play a video corresponding to the selected at least one item.

12 Claims, 112 Drawing Sheets

(51) Int. Cl.
*G06F 3/0486* (2013.01)
*G06F 3/0484* (2013.01)
*G06F 3/0482* (2013.01)
*H04N 5/77* (2006.01)
*G11B 27/30* (2006.01)

(56) References Cited

U.S. PATENT DOCUMENTS

| | | | | |
|---|---|---|---|---|
| 2005/0158015 | A1* | 7/2005 | Nakayama | G11B 27/034 386/241 |
| 2008/0068456 | A1* | 3/2008 | Fujii | G06F 17/3025 348/130 |
| 2009/0190804 | A1 | 7/2009 | Yokoi | |
| 2010/0104146 | A1* | 4/2010 | Momosaki | G06F 17/30781 382/118 |
| 2012/0206597 | A1* | 8/2012 | Komoto | G06T 7/215 348/135 |
| 2013/0055129 | A1* | 2/2013 | Lee | H04N 21/4312 715/769 |
| 2013/0081082 | A1* | 3/2013 | Riveiro Insua | H04N 21/8549 725/38 |
| 2013/0305286 | A1* | 11/2013 | Wassingbo | G06F 17/30849 725/41 |
| 2014/0146148 | A1* | 5/2014 | Maciocci | G06F 3/013 348/59 |
| 2014/0149376 | A1* | 5/2014 | Kutaragi | G06K 9/4676 707/706 |
| 2014/0218611 | A1* | 8/2014 | Park | G06F 3/0481 348/565 |
| 2014/0267618 | A1* | 9/2014 | Esteban | G06T 5/003 348/46 |
| 2015/0373257 | A1* | 12/2015 | Shirakawa | H04N 5/23216 348/333.12 |

FOREIGN PATENT DOCUMENTS

| | | |
|---|---|---|
| JP | 2010-93422 A | 4/2010 |
| JP | 2014-78826 A | 5/2014 |
| KR | 10-2010-0114419 A | 10/2010 |
| KR | 10-2011-0054196 A | 5/2011 |

\* cited by examiner

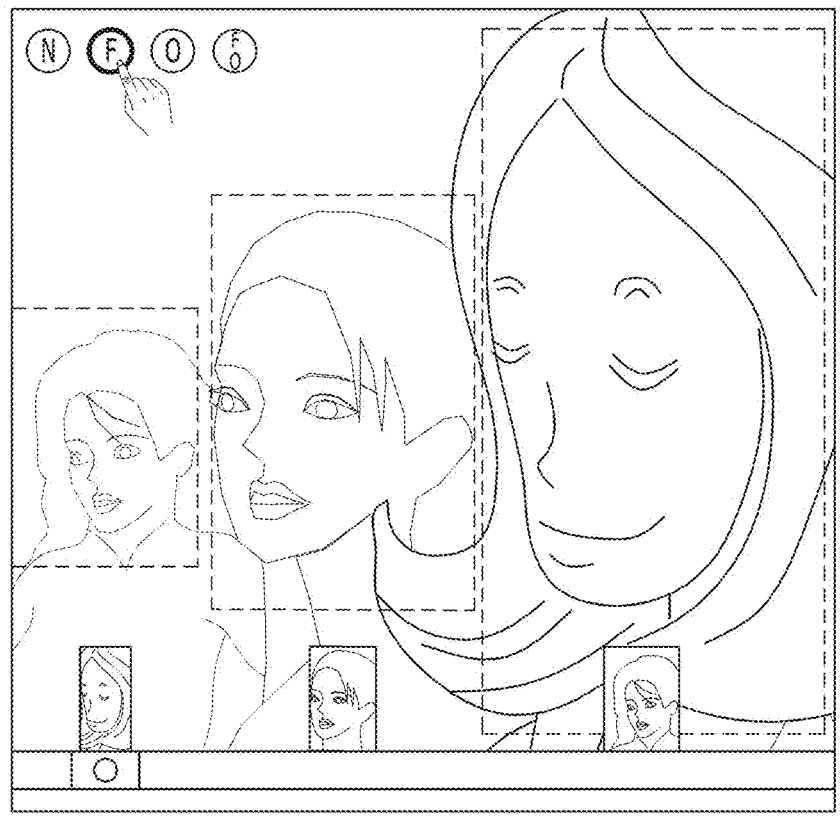

MOBILE TERMINAL AND CONTROLLING METHOD THEREOF FOR CONTINUOUSLY TRACKING OBJECT INCLUDED IN VIDEO

Pursuant to 35 U.S.C. § 119(a), this application claims the benefit of earlier filing date and right of priority to Korean Application Nos. 10-2014-0073421, filed on Jun. 17, 2014 and 10-2014-0073422, filed on Jun. 17, 2014, the contents of which are hereby incorporated by reference herein in their entirety.

BACKGROUND OF THE INVENTION

Field of the Invention

The present invention relates to a mobile terminal, and more particularly, to a mobile terminal and a method of controlling the mobile terminal.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Generally, terminals can be classified into mobile terminals and stationary terminals according to a presence or non-presence of mobility. And, the mobile terminals can be further classified into handheld terminals and vehicle mounted terminals.

Recently, a function of taking/making a photo/video and a function of correcting the photo/video are improved in a mobile terminal. However, it is actually difficult to provide various images due to the limitations put on a camera included in the mobile terminal. For instance, unlike a DSLR camera, the camera included in the mobile terminal is unable to change a focal position of an image or provide an out-of-focus function.

SUMMARY OF THE INVENTION

Accordingly, the present invention is directed to a mobile terminal that substantially obviates one or more problems due to limitations and disadvantages of the related art.

One object of the present invention is to provide a mobile terminal and controlling method thereof, by which a focus and a focal range can be changed after photographing an image.

Another object of the present invention is to provide a mobile terminal and controlling method thereof, by which a focus can be easily changed after photographing a photo or a video.

Further object of the present invention is to provide a mobile terminal and controlling method thereof, by which a photo or video can be played or edited using a face by recognizing the face included in the photo or video.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to an embodiment of the present invention may include a memory configured to store a plurality of videos, a touchscreen configured to display an image on a screen, a controller configured to, in response to receiving a selection of at least one object included in the image, search the videos for at least one video including an image of the selected at least one object, control the touchscreen to display a list including at least one item indicating the searched video, in response to receiving a selection of at least one item included in the list, play a video corresponding to the selected item.

In another aspect of the present invention, a method of controlling a mobile terminal according to an embodiment of the present invention may include the steps of displaying an image on a screen of a touchscreen, if at least one object included in the image is selected, searching previously saved videos for at least one video including an image of the selected object, displaying an image on a screen of a touchscreen, in response to receiving a selection of at least one object included in the image, searching previously stored videos for at least one video including an image of the selected at least one object, displaying a list including at least one item indicating the searched video, in response to receiving a selection of at least one item included in the list, playing a video corresponding to the selected item.

Effects and/or advantages obtainable from the present invention are non-limited the above mentioned effect. And, other unmentioned effects and/or advantages can be clearly understood from the following description by those having ordinary skill in the technical field to which the present invention pertains.

Both the foregoing general description and the following detailed description of the present invention are and explanatory and are intended to provide further explanation of the invention as claimed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures:

FIGS. 14A to 14C are diagrams to describe a post-focus image correcting method according to one embodiment of the present invention;

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
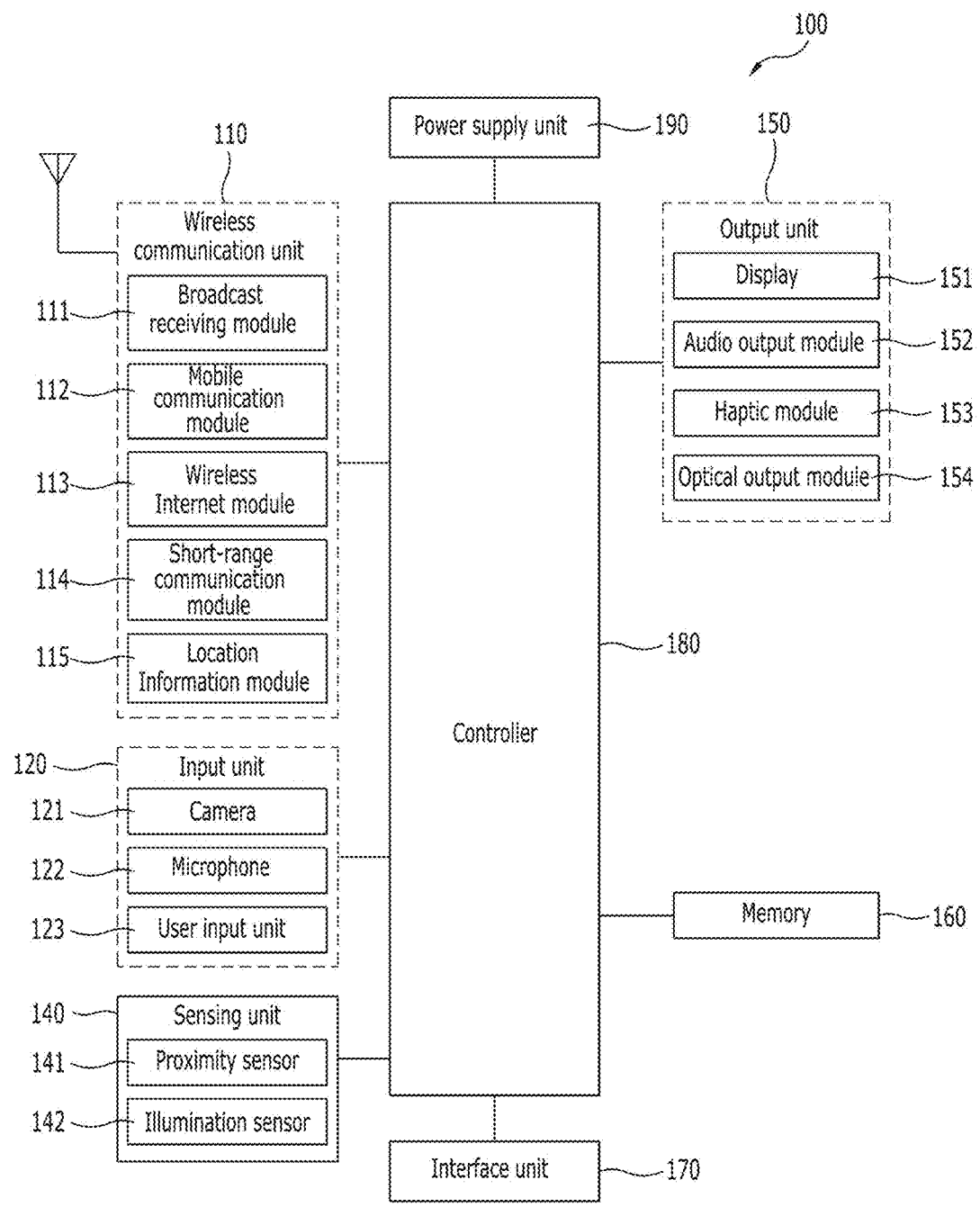
FIG. 1A is a block diagram of a mobile terminal in accordance with the present disclosure.
Figure 1B:
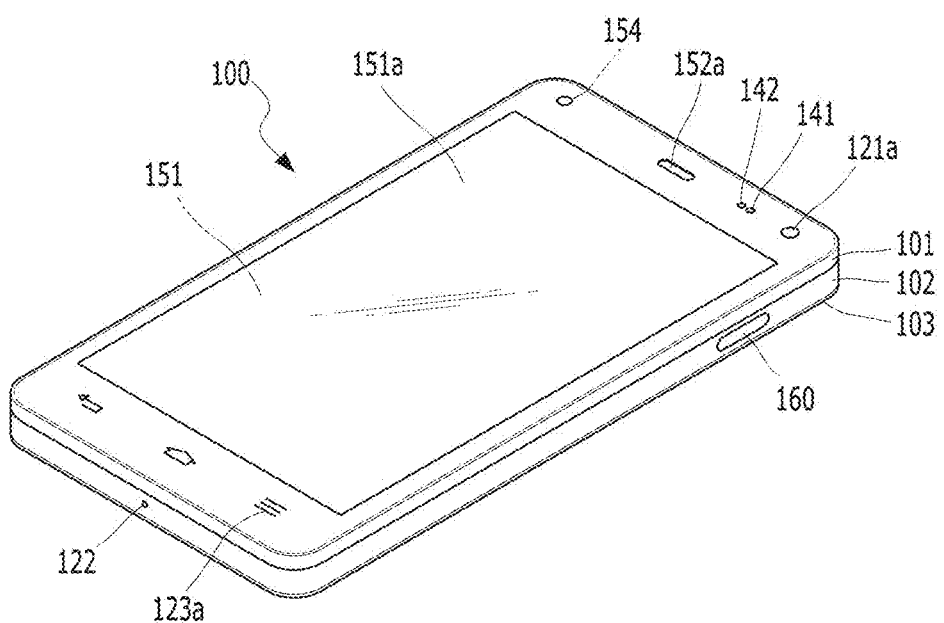
FIGS. 1B and 1C are conceptual views of one example of the mobile terminal, viewed from different directions.
Figure 1C:
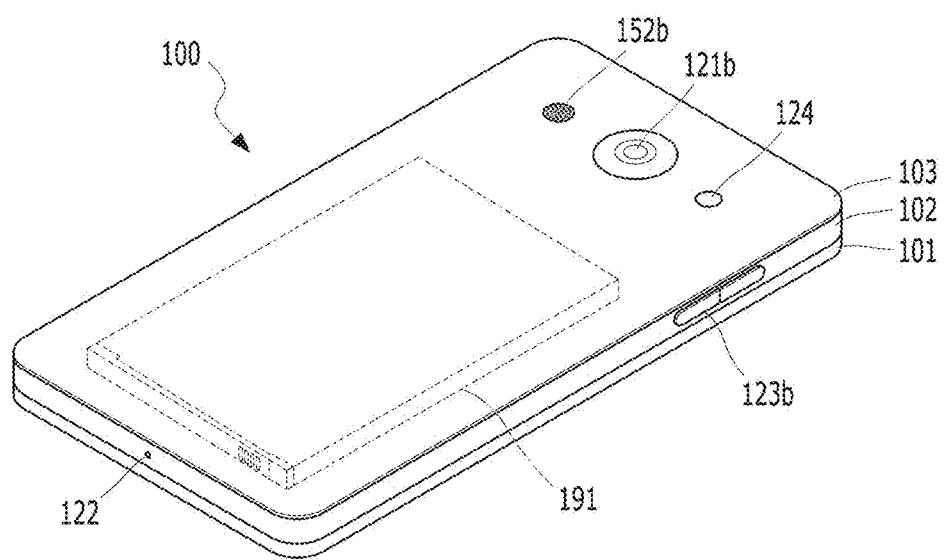

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 170, a memory 160, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 170 serves as an interface with various types of external devices that can be coupled to the mobile terminal 100. The interface unit 170, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 170.

The memory 160 is typically implemented to store data to support various functions or features of the mobile terminal 100. For instance, the memory 160 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 160, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 160. As one example, the controller 180 controls some or all of the components illustrated in FIGS. 1A-1C according to the execution of an application program that have been stored in the memory 160.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 160. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 160. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 170 serves as an interface for external devices to be connected with the mobile terminal 100. For example, the interface unit 170 can receive data transmitted from an external device, receive power to transfer to elements and components within the mobile terminal 100, or transmit internal data of the mobile terminal 100 to such external device. The interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 170.

When the mobile terminal 100 is connected with an external cradle, the interface unit 170 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 160 can store programs to support operations of the controller 180 and store input/output data (for example, phonebook, messages, still images, videos, etc.). The memory 160 may store data related to various patterns of vibrations and audio which are output in response to touch inputs on the touch screen. The memory 160 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 160 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 170 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 160. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 170 may serve as a path allowing the mobile terminal 100 to interface with external devices. For example, the interface unit 170 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 170 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 170. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Description will now be given in detail according to embodiments related to a control method implemented in the above-configured mobile terminal disclosed herein, with reference to the accompanying drawings. Various modifications and variations can be made in the present invention without departing from the spirit or scope of the inventions.

First of all, the controller 180 controls the camera 121 to photograph/record a post-focus image (e.g., a photo, a video, etc.). In this instance, the post-focus image may mean an image in which at least one of a focal position, a focal distance, a field depth and an out-of-focus is adjustable after photographing/recording.

In this instance, the post-focus image may be configured with a single file or a set of a multitude of files. The focal position means a position at which a focus is clearly captured in a photographed image. And, the focal distance means a spatial distance between a focused position (subject) and a camera. When a focused space is formed around a region/position at which a focus is clearly captured, the field depth means a range of the focused space. If the range of the focused space around the focused region/position is wide, the field depth is deep. If the range of the focused space around the focused region/position is narrow, the field depth is shallow.

The out-of-focus means a state or a photographing scheme for making the rest look blurred due to the shallow field depth except an object in focus. For instance, while other configurations and parameters (e.g., shutter speed, photography location, composition, illumination, ISO, photography time, etc.) are maintained equally in a general camera, if a photo is taken by setting a value of aperture (F) to a small value, it can obtain a photo of a shallow field depth (i.e., good out-of-focus). Further, if a photo is taken by setting a value of aperture (F) to a large value, it can obtain a photo of a deep field depth (i.e., poor out-of-focus).

Figure 2:
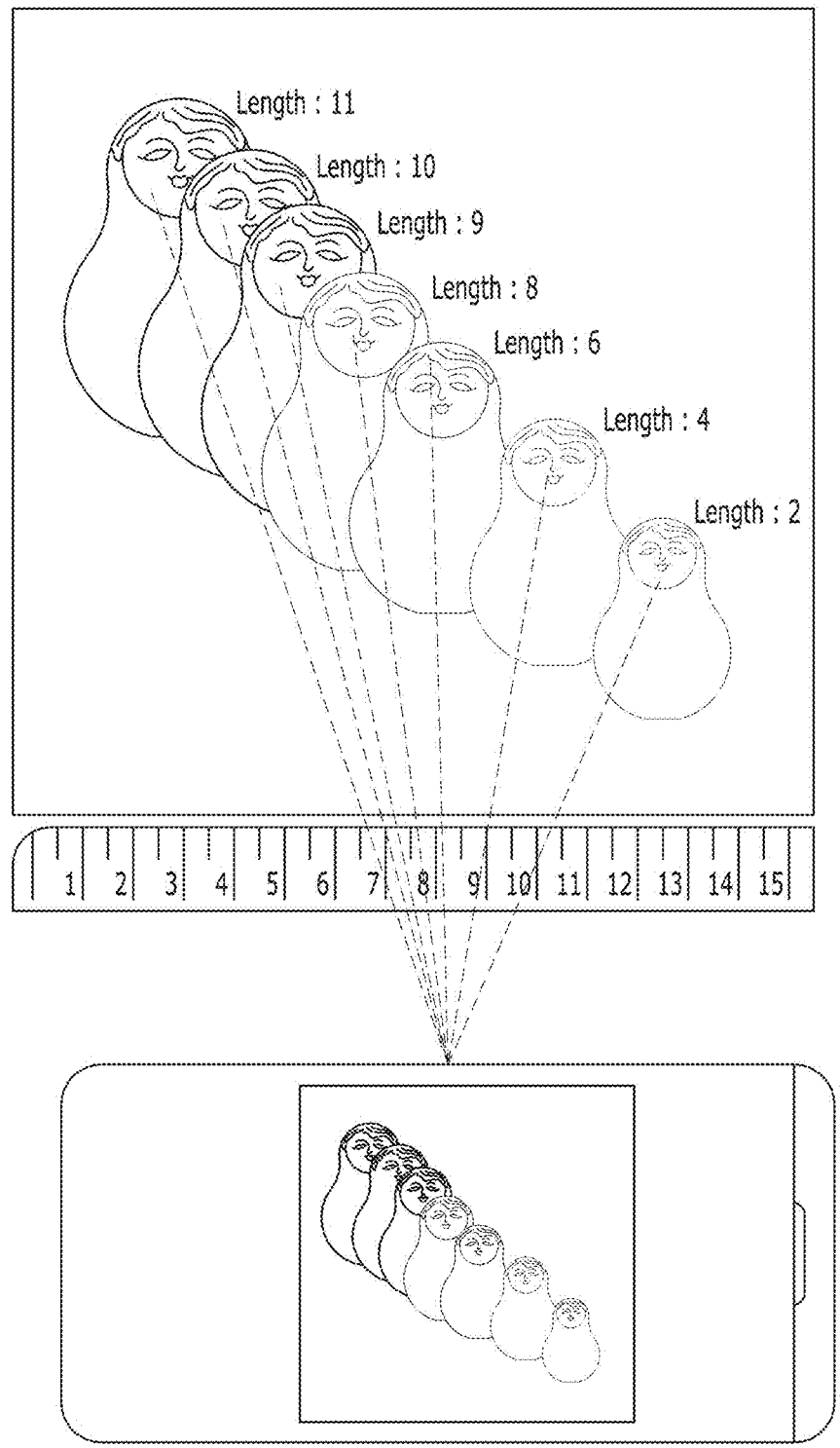
FIG. 2 is a diagram to describe one example of a post-focus image according to an embodiment of the present invention.

A method of photographing such a post-focus image is described in detail as follows as shown in FIG. 2. For instance, when a first method of photographing a post-focus image, the controller 180 controls the camera 121 to photograph a deep field depth image (i.e., an image of which whole region is clear). When the image is photographed, the controller 180 controls a distance information, which is related to each pixel included in the taken image, to be included in the photographed image or saved in the memory 160.

In this instance, the distance information indicates a real distance between a subject and the camera 121, includes a distance value between a subject corresponding to each pixel and the camera 121, and may further include a focal distance value between the subject and the camera 121. The distance information may be used as a result value of a function having a variable set to a real distance value that is not the real distance between the subject and the camera 121. The distance information may be used as a relative difference value from a value of neighbor pixel or a result value of a function having a variable set to the relative difference value. The distance information may be saved by pixel units. And, the distance information can be saved for each subject, as shown in FIG. 2.

When a second method of photographing a post-focus image, the controller 180 controls the camera 121 to photograph a multitude of images differing from each other in a focal position or a focal distance by maintaining an aperture value identically and also controls the camera 121 to photograph a multitude of images differing from each other in an aperture value per focal position or focal distance. By combining the photographed images together, it can obtain a post-focus image having a multitude of focal positions/distances and a multitude of aperture values.

After the post-focus image has been obtained, the controller 180 displays the photographed image on the display unit 151 and provides a UX/UI (user experience/user interface) for correcting the photographed image, in response to a user's request for correcting an image. Subsequently, the controller 180 corrects the post-focus image displayed on the display unit 151 in response to a user's touch input and can then save the corrected image in the memory 160.

Figure 3:
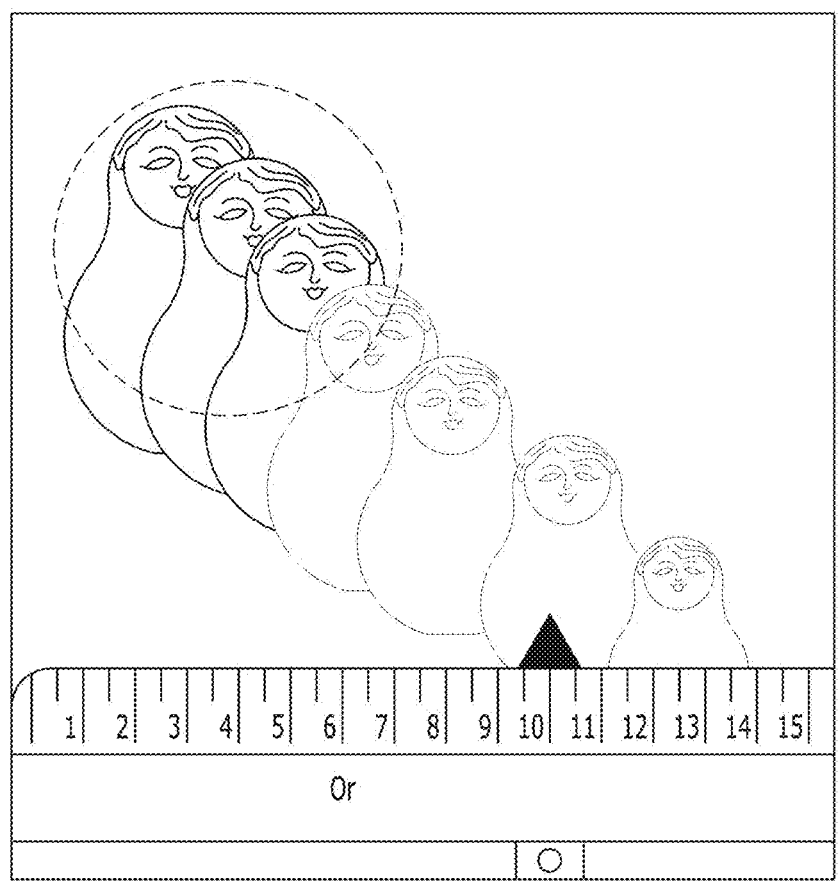
FIG. 3 is a diagram to describe a post-focus image correcting method according to one embodiment of the present invention.

Examples of correcting a post-focus image are described in detail as follows. In particular, FIG. 3 is a diagram to describe one example of correcting a post-focus image. Referring to FIG. 3, the controller 180 provides at least one of a scale plate and a slide bar to the display unit 151 in response to a user's request. The scale plate or the slide bar is preferably displayed on one side of the display unit 151, e.g., a bottom edge of the display unit 151, not to block an image as far as it can, by which a displayed position on the scale plate or the slide bar is non-limited. In this instance, the scale plate indicates a focal distance corresponding to a distance between a focused position (e.g., subject) and a camera.

If a user selects a desired position from the scale bar or the slide bar through a touch input (e.g., a touch, a drag, etc.), the controller 180 shifts a pointer on the scale plate or the slide bar to the position designated by the user and also adjusts a focal distance of a photographed image into a value (e.g., 10) indicated by the pointer. Hence, a subject (i.e., sixth doll) located at the focal distance 10 is in focus and the rest of subjects are displayed as blurred. Thus, in order to change a focal distance/position, the controller 180 controls a subject in a user designated focal distance to be represented clearly only using a per-pixel distance information of a photographed image or can display an image corresponding to a focal distance designated by a user in a post-focus image having a multitude of focal distances/positions only.

Figure 4A:
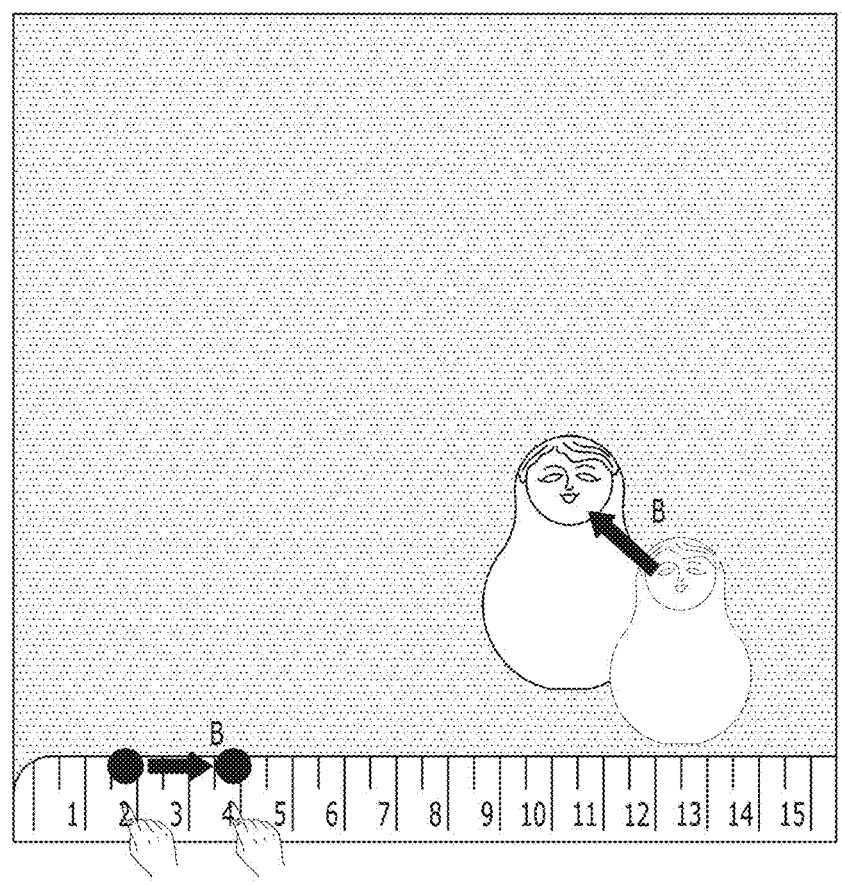
FIG. 4A and FIG. 4B are diagrams to describe a post-focus image correcting method according to one embodiment of the present invention.
Figure 4B:
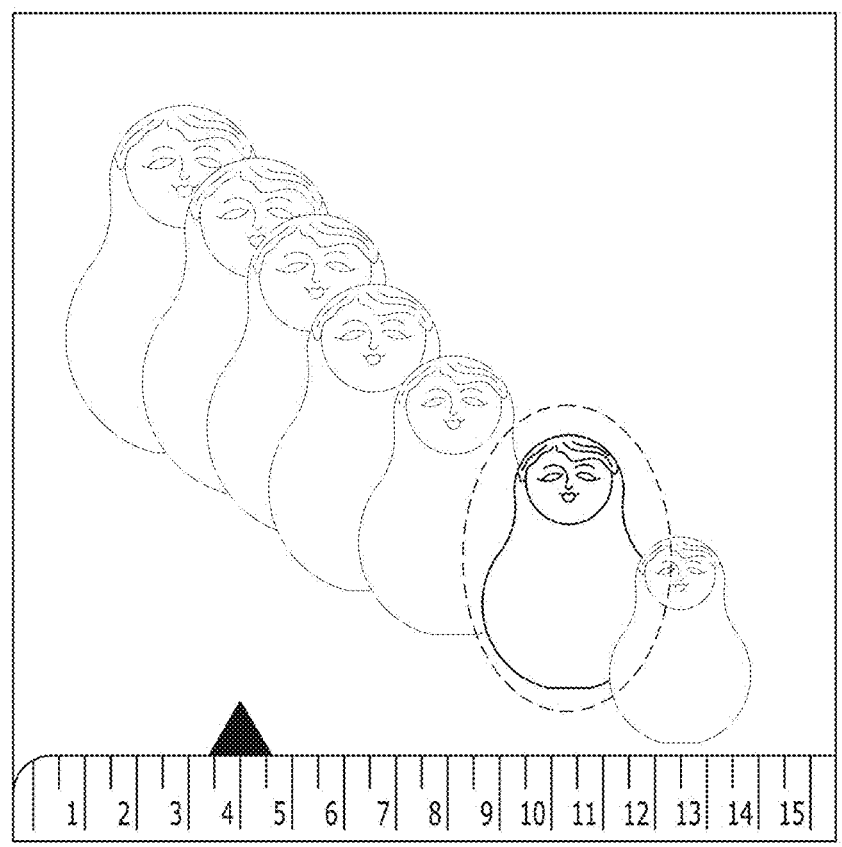

FIG. 4A and FIG. 4B are diagrams to describe a post-focus image correcting method according to one embodiment of the present invention. Referring to FIG. 4A and FIG. 4B, the controller 180 provides at least one of a scale plate and a slide bar to the display unit 151 in response to a user's request. The scale plate or the slide bar is preferably displayed on one side of the display unit 151, e.g., a bottom edge of the display unit 151, not to block an image as far as it can, by which a displayed position on the scale plate or the slide bar is non-limited. In this instance, the scale plate indicates a focal distance corresponding to a distance between a focused position (e.g., subject) and a camera.

If a user shifts a pointer displayed on the scale plate or the slide bar to a desired position through a touch input (e.g., a touch, a drag, etc.), the controller 180 adjusts a focal distance of the image in response to the user's touch input. For instance, referring to FIG. 4B, if a user shifts a pointer on a scale plate to 4 from 2 in a horizontal direction through a drag, the controller 180 adjusts a focal distance of an image into 4 from 2. Hence, a subject (e.g., a second doll) located at the focal distance 4 is in focus and the rest of subjects are represented as blurred.

Moreover, referring to FIG. 4A, while a user's touch input is being applied (e.g., while a user's touch input is moving by contacting a scale plate or a slide bar), the controller 180 controls the display unit 151 to selectively display a subject corresponding to a focal distance indicated by a pointer only. In particular, the controller 180 controls the display unit 151 to display only the subjects located at the focal distances 2 to 4 in order but controls the display unit 151 not to display the rest of subjects. The reason for the subject corresponding to the adjusted focal distance to be selectively displayed only is to enable a user to easily recognize a focused region from a currently corrected image.

If the user's touch input is ended (i.e., if the user's contact is released from the scale plate or the slide bar), referring to FIG. 4B, a whole image focused on the subject located at the selected focal distance 4 is displayed on the display unit 151. Thus, in order to change a focal distance/position, the controller 180 controls a subject in a user designated focal distance to be represented clearly only using a per-pixel distance information of a photographed image or can display an image corresponding to a focal distance designated by a user in a post-focus image having a multitude of focal distances/positions only.

Figure 5A:
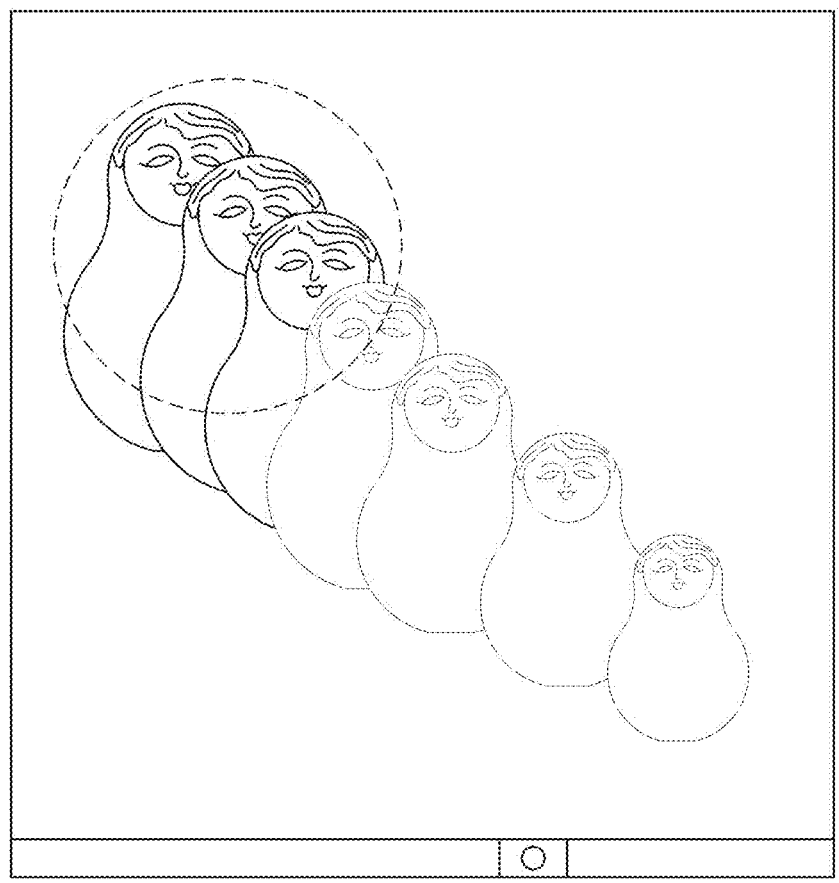
FIG. 5A and FIG. 5B are diagrams to describe a post-focus image correcting method according to one embodiment of the present invention.
Figure 5B:
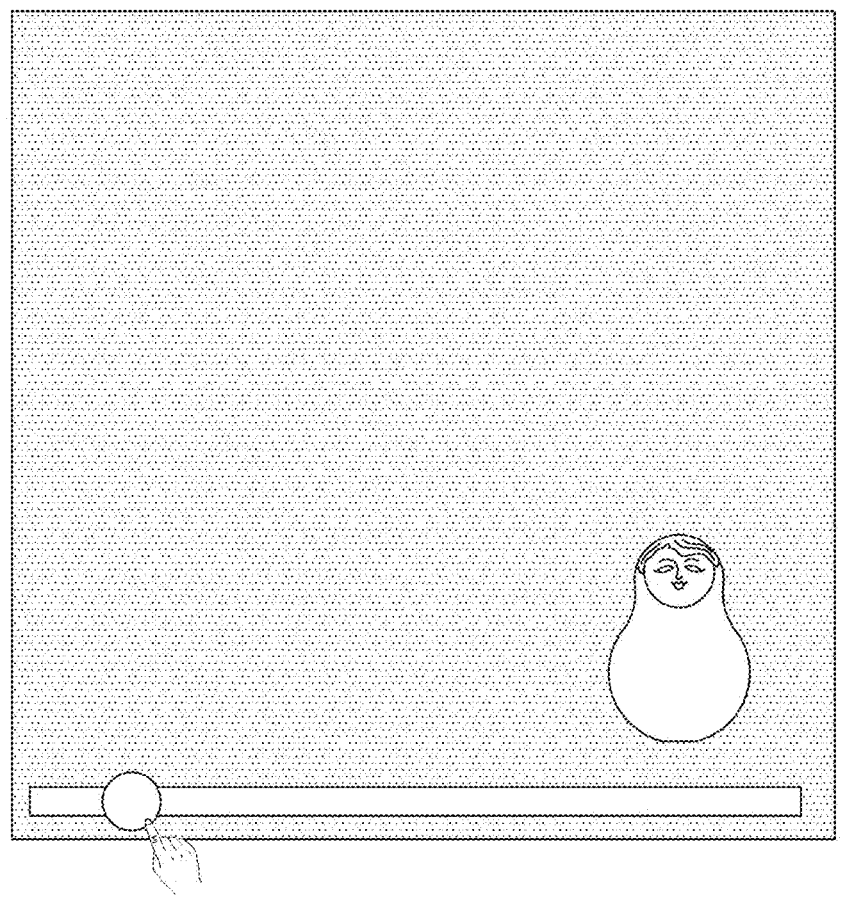

FIG. 5A and FIG. 5B are diagrams to describe another example of correcting a post-focus image. Referring to FIG. 5A, the controller 180 provides at least one of a scale plate and a slide bar to the display unit 151 in response to a user's request. In this instance, a pointer displayed on the displayed scale plate or the displayed slide bar indicates a current focal distance. The scale plate or the slide bar is preferably displayed on one side of the display unit 151, e.g., a bottom edge of the display unit 151, not to block an image as far as it can, by which a displayed position on the scale plate or the slide bar is non-limited.

If a user shifts the pointer displayed on the scale plate or the slide bar to a desired position through a touch input (e.g., a touch, a drag, etc.), the controller 180 adjusts a focal distance of the image in response to the user's touch input. For instance, referring to FIG. 5B, if a user shifts a pointer on a slide bar to 2 from 10 through a touch, the controller 180 adjusts a focal distance of a photographed image into 2 from 10 in accordance with a changed position of the pointer. Hence, a subject (e.g., a first doll) located at the focal distance 2 is in focus and the rest of subjects are represented as blurred.

Moreover, referring to FIG. 5B, while a user's touch input is being applied (e.g., while a user's touch input is contacting the slide bar), the controller 180 controls the display unit 151 to selectively display a subject corresponding to a focal distance indicated by the pointer only. In particular, the controller 180 controls the display unit 151 to display only the subject located at the focal distance 2 but controls the display unit 151 not to display the rest of subjects. The reason for the subject corresponding to the adjusted focal distance to be selectively displayed only is to enable a user to easily recognize a focused region from a currently corrected image.

If the user's touch input is ended (i.e., if the user's contact is released from the scale plate or the slide bar), a whole image focused on the subject (i.e., the first doll) located at the selected focal distance 2 is displayed on the display unit 151. Thus, in order to change a focal distance/position, the controller 180 controls a subject in a user designated focal distance to be represented clearly only using a per-pixel distance information of a photographed image or can display an image corresponding to a focal distance designated by a user in a post-focus image having a multitude of focal distances/positions only.

Figure 6:
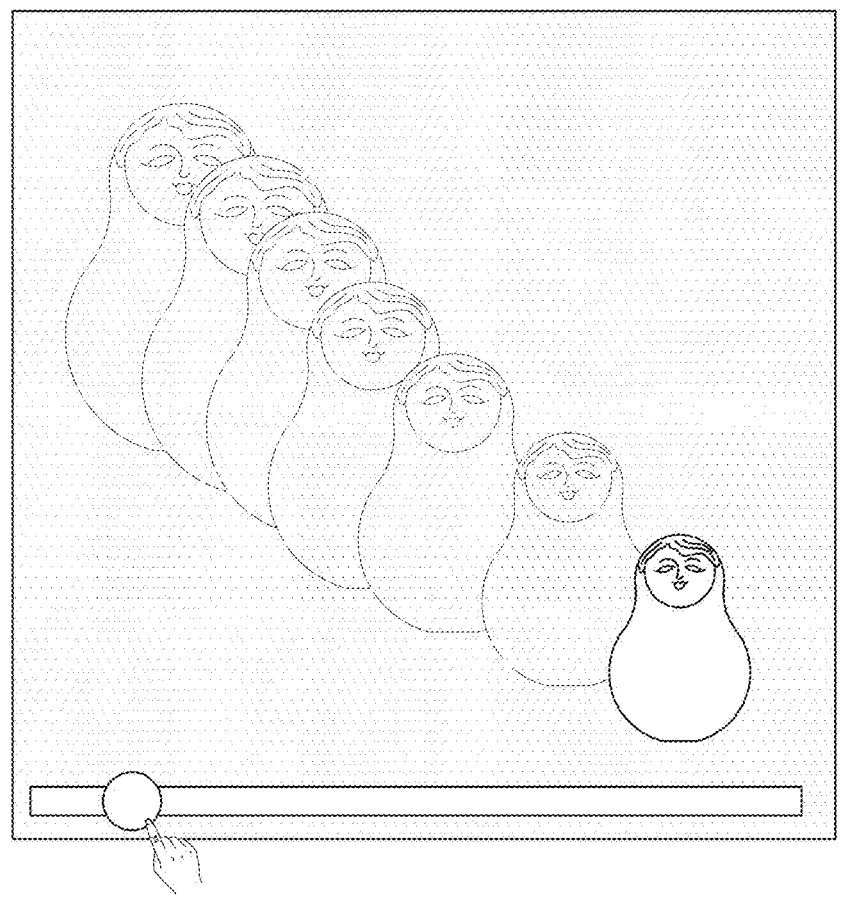
FIGS. 6 to 10B are diagrams illustrating examples of a method for selectively displaying a subject corresponding to a selected focal distance.

FIGS. 6 to 10B are diagrams illustrating examples of selectively displaying a subject corresponding to a selected focal distance during a user's touch input. The selective displaying methods shown in FIGS. 6 to 10 are applicable to all embodiments. Referring to FIG. 6, while a user's touch input is being applied, the controller 180 controls a subject corresponding to a selected focal distance (e.g., 2) to be displayed brightly only and also controls the rest of subjects to be represented darkly or in specific color.

Figure 7:
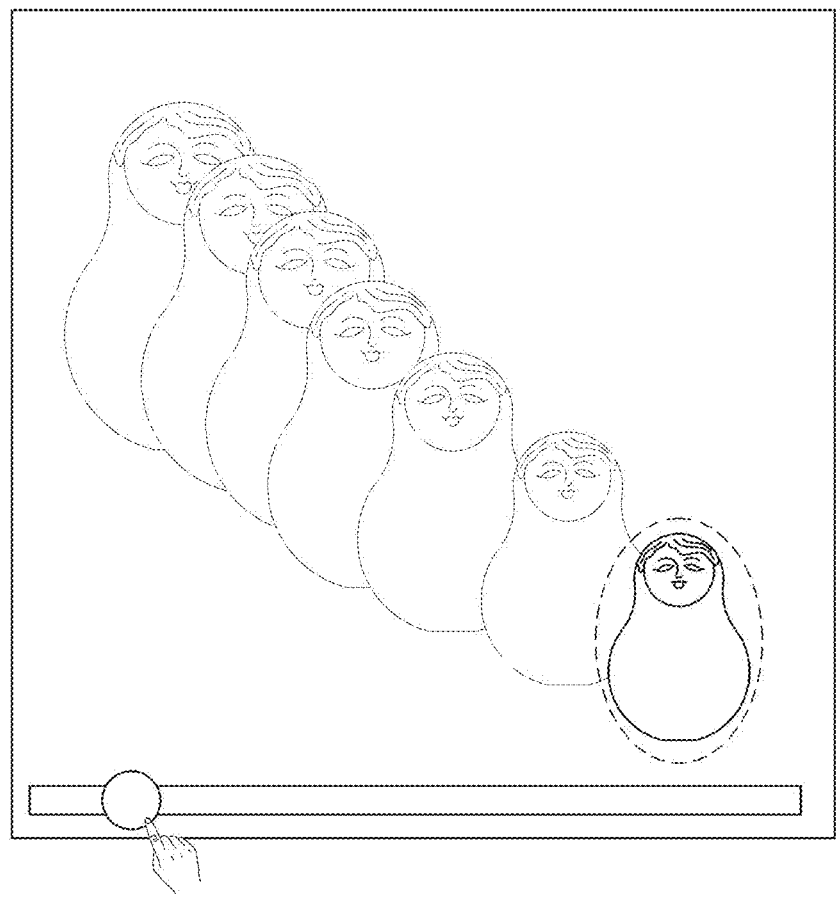

Referring to FIG. 7, while a user's touch input is being applied, the controller 180 controls a diagram (e.g., a circle), which is provided to identify a subject corresponding to a selected focal distance, to be displayed on the corresponding subject or may control the corresponding subject to be displayed in semitransparent color.

Figure 8:
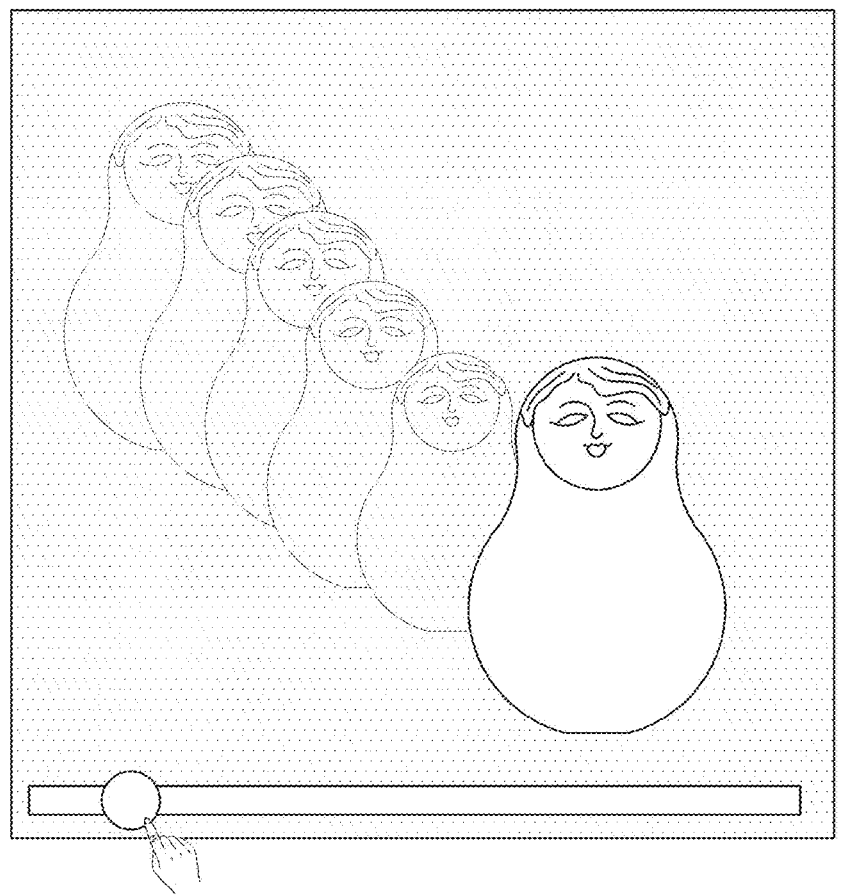

Referring to FIG. 8, while a user's touch input is being applied, the controller 180 controls a subject corresponding to a selected focal distance to be displayed by being enlarged, controls the corresponding subject to be displayed brightly, and also controls the rest of subjects to be represented darkly or in specific color.

Figure 9:
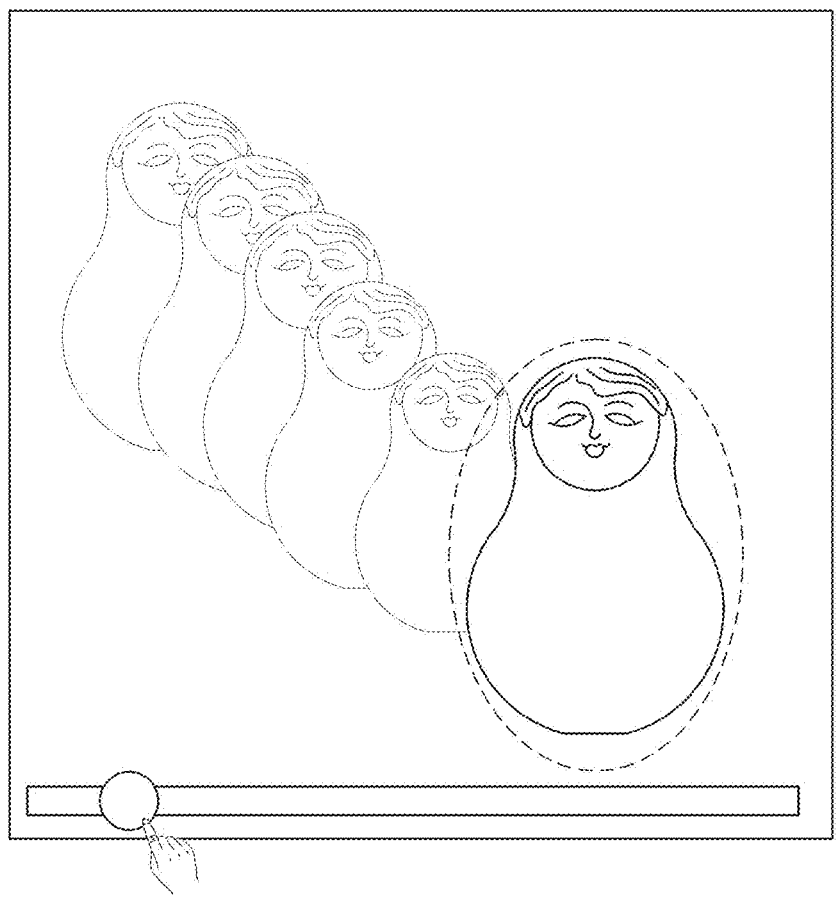

Referring to FIG. 9, while a user's touch input is being applied, the controller 180 controls a subject corresponding to a selected focal distance to be displayed by being enlarged and also controls a diagram (e.g., a circle), which is provided to identify a subject corresponding to a selected focal distance, to be displayed on the corresponding subject, or may control the corresponding subject to be displayed in semitransparent color.

Figure 10A:
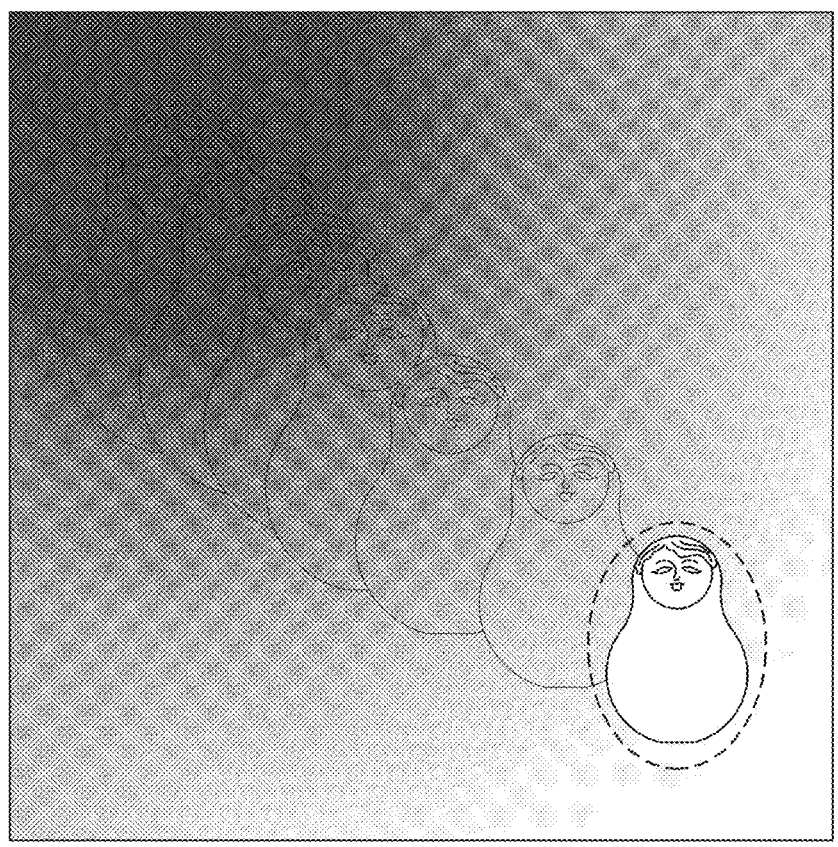
Figure 10B:
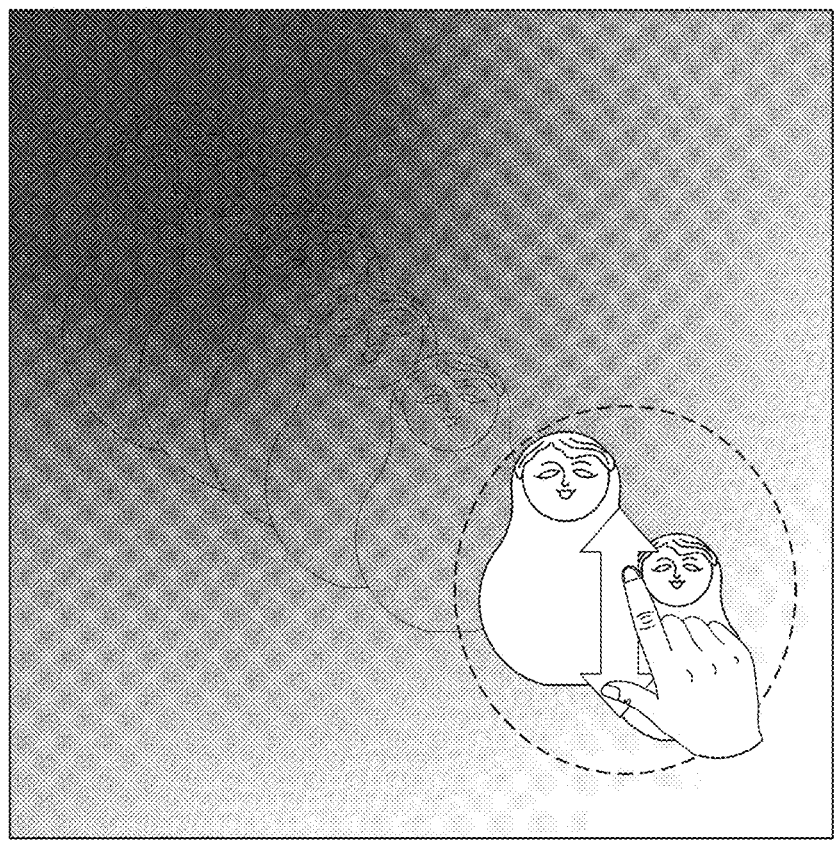

Referring to FIG. 10A and FIG. 10B, while a user's touch input is being applied, the controller 180 controls a subject corresponding to a selected focal distance to be displayed brightly and also controls the rest of subjects to be represented by gradation. Further, in order to illustrate a focus difference per region in an image, the clearer the focus gets, the lower the thickness/non-transparency of gradation gets in the corresponding region. The unclearer the focus gets, the higher the thickness/non-transparency of gradation gets in the corresponding region. Particularly, referring to FIG. 10B, while a user clicks a subject, the user can change a focus gauge by applying a drag up and down. Hence, the controller 180 can adjust the thickness/non-transparency of the gradation. Further, the controller 180 displays the gradation only if a user is applying a touch. If the touch is released, the controller 180 can display an image, of which focus/field depth is adjusted, without gradation.

Figure 11A:
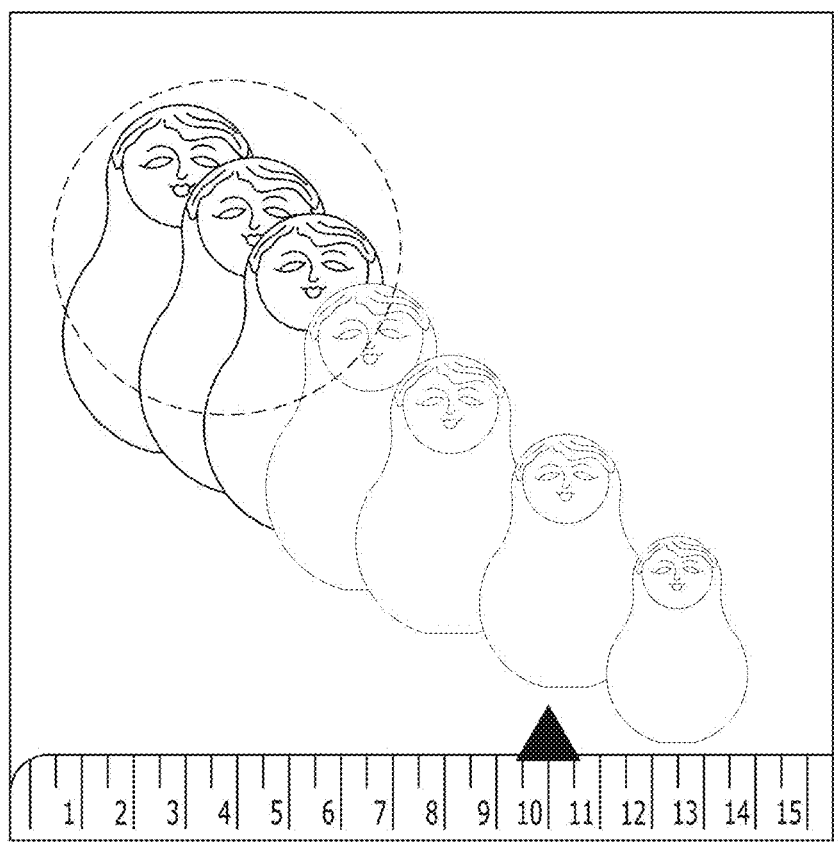
FIGS. 11A to 11D are diagrams to describe a post-focus image correcting method according to one embodiment of the present invention.

FIGS. 11A to 11D are diagrams to describe another example of correcting a post-focus image according to one embodiment of the present invention. Referring to FIG. 11A, the controller 180 provides at least one of a scale plate and a slide bar to the display unit 151 in response to a user's request. The scale plate or the slide bar is preferably displayed on one side of the display unit 151, e.g., a bottom edge of the display unit 151, not to block an image as far as it can, by which a displayed position on the scale plate or the slide bar is non-limited.

If a user shifts a pointer displayed on the scale plate or the slide bar to a desired position through a first touch input (e.g., a touch A, a drag A, etc.), the controller 180 adjusts a focal distance of the image in response to the first touch input. For instance, referring to FIG. 11B, if a user shifts a pointer on the slide bar to 2 from 10 through a touch, the controller 180 adjusts a focal distance of an image into 2 from 10 in accordance with a changed position of the pointer. Hence, a subject (e.g., a first doll) located at the focal distance 2 is in focus and the rest of subjects are represented as blurred. Thus, in order to change a focal distance/position, the controller 180 controls a subject in a user designated focal distance to be represented clearly only using a per-pixel distance information of a photographed image or can display an image corresponding to a focal distance designated by a user in a post-focus image having a multitude of focal distances/positions only.

Figure 11B:
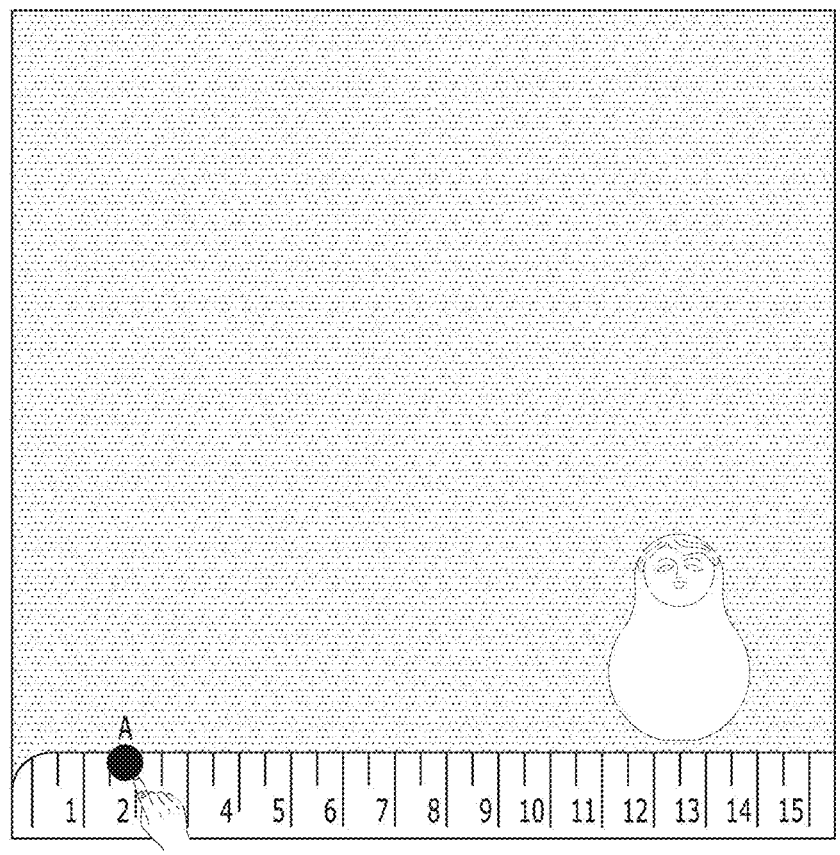

Moreover, referring to FIG. 11B, while the user's first touch input is being applied (e.g., while the user's first touch input is contacting a slide bar), the controller 180 controls the display unit 151 to selectively display a subject corresponding to a focal distance indicated by a pointer only. In particular, the controller 180 controls the display unit 151 to display only the subject (i.e., first doll) located at the selected focal distance 2 but controls the display unit 151 not to display the rest of subjects. The reason for the subject corresponding to the adjusted focal distance to be selectively displayed only is to enable a user to easily recognize a focused region from a currently corrected image.

Thereafter, while the first touch input is still contacting the last position, if the user shifts a second touch input (i.e., a drag C) in a specific direction (e.g., a vertical direction toward a top side of the scale plate or the slide bar), the controller 180 adjusts a range (i.e., a focal range) of a focused region with reference to a subject located in the selected focal distance 2. In this instance, the focal range may mean a planar range of an image. Preferably, the focal range means a spatial range of a focus around a subject in an image. In particular, adjustment of a focal range can inclusively indicate all the effects of adjusting a size of a focused region in a corresponding image. For instance, an image focused on two points may have a focal range wider than that of an image focused on a single point. In another instance, a case of a deep field depth may have a focal range wider than a case of a shallow field depth. So to speak, the adjustment of the focal range can inclusively indicate all methods of adjusting a size of a clearly seen part of an image and a size of an unclearly seen part of the image. And, a size adjustment of a focused region can inclusively indicate size adjustments of other regions and/or an adjustment of clarity.

Figure 11C:
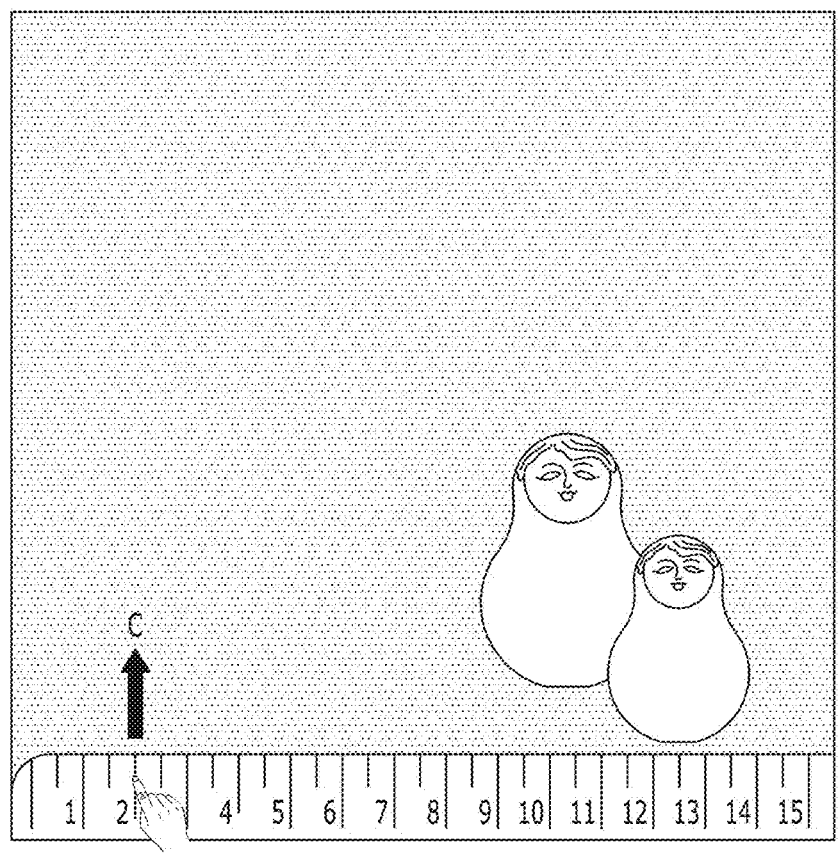

Referring to FIG. 11C, the controller 180 adjusts a focal range in response to the second touch input moving in a vertical direction. Further, the longer the second touch input gets in the vertical direction, the wider the focal range is adjusted. Moreover, the controller 180 controls the display unit 151 to selectively display the focal range only while the user's second touch input is applied.

Figure 11D:
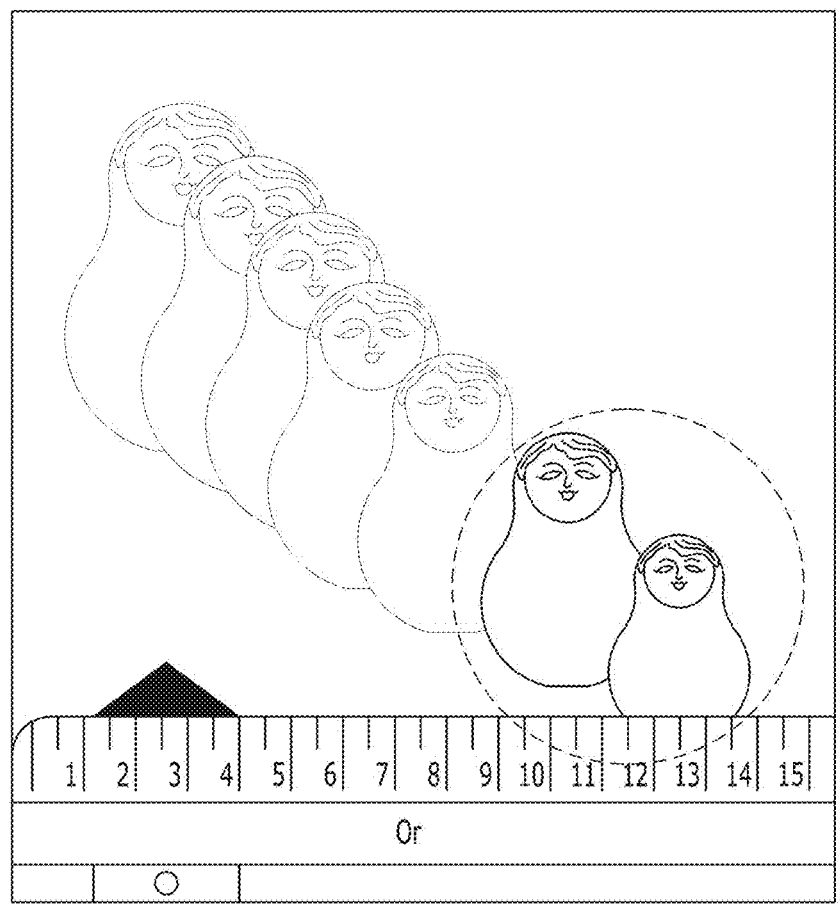

Referring to FIG. 11D, if the user's second touch input is ended (i.e., if the user's contact is released), a whole image focused on the extended range (i.e., first and second dolls) is displayed on the display unit 151. Moreover, the controller 180 can control the display unit 151 to display the pointer enlarged by an extended portion of the focal range. In particular, the size of the focal range is proportional to the size of the pointer in the image.

Figure 12A:
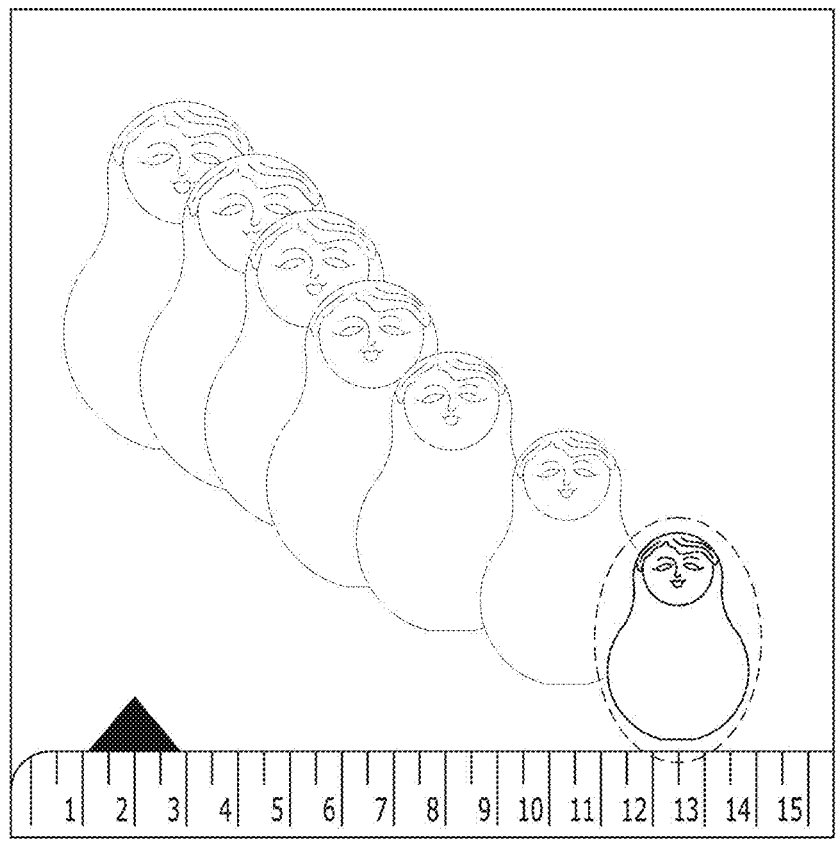
FIGS. 12A to 12D are diagrams to describe a post-focus image correcting method according to one embodiment of the present invention.

FIGS. 12A to 12D are diagrams to describe another example of correcting a post-focus image according to one embodiment of the present invention. Referring to FIG. 12A, the controller 180 provides at least one of a scale plate and a slide bar to the display unit 151 in response to a user's request. The scale plate or the slide bar is preferably displayed on one side of the display unit 151, e.g., a bottom edge of the display unit 151, not to block an image as far as it can, by which a displayed position on the scale plate or the slide bar is non-limited.

If a user shifts a pointer displayed on the scale plate or the slide bar to a desired position through a first touch input (e.g., a touch, a drag, etc.), the controller 180 adjusts a focal distance of an image in response to the first touch input. For instance, the controller 180 adjusts a focal distance of an image into 2 in accordance with a changed position of the pointer. Hence, a subject (e.g., a first doll) located at the focal distance 2 is in focus and the rest of subjects are represented as blurred. Thus, in order to change a focal distance/position, the controller 180 controls a subject in a user designated focal distance to be represented clearly only using a per-pixel distance information of a photographed image or can display an image corresponding to a focal distance designated by a user in a post-focus image having a multitude of focal distances/positions only.

Moreover, while the user's first touch input is being applied (e.g., while the user's first touch input is contacting the slide bar), the controller 180 controls the display unit 151 to selectively display a subject corresponding to a focal distance indicated by the pointer only. For instance, the controller 180 controls the display unit 151 to display only the subject (i.e., first doll) located at the selected focal distance 2 but controls the display unit 151 not to display the rest of subjects. The reason for the subject corresponding to the adjusted focal distance to be selectively displayed only is to enable a user to easily recognize a focused region from a currently corrected image.

Thereafter, while the first touch input is still contacting the last position, if the user shifts a second touch input (i.e., a drag C) in a specific direction (e.g., a vertical direction toward a top side of the scale plate or the slide bar), the controller 180 adjusts a range (i.e., a focal range) of a focused region with reference to a subject located in the selected focal distance 2. In this instance, the focal range may mean a planar range of an image. Preferably, the focal range means a spatial range of a focus around a subject in an image. In particular, adjustment of a focal range can inclusively indicate all the effects of adjusting a size of a focused region in a corresponding image. For instance, an image focused on two points may have a focal range wider than that of an image focused on a single point. In another instance, a case of a deep field depth may have a focal range wider than a case of a shallow field depth. So to speak, the adjustment of the focal range can inclusively indicate all methods of adjusting a size of a clearly seen part of an image and a size of an unclearly seen part of the image. And, a size adjustment of a focused region can inclusively indicate size adjustments of other regions and/or an adjustment of clarity.

Figure 12B:
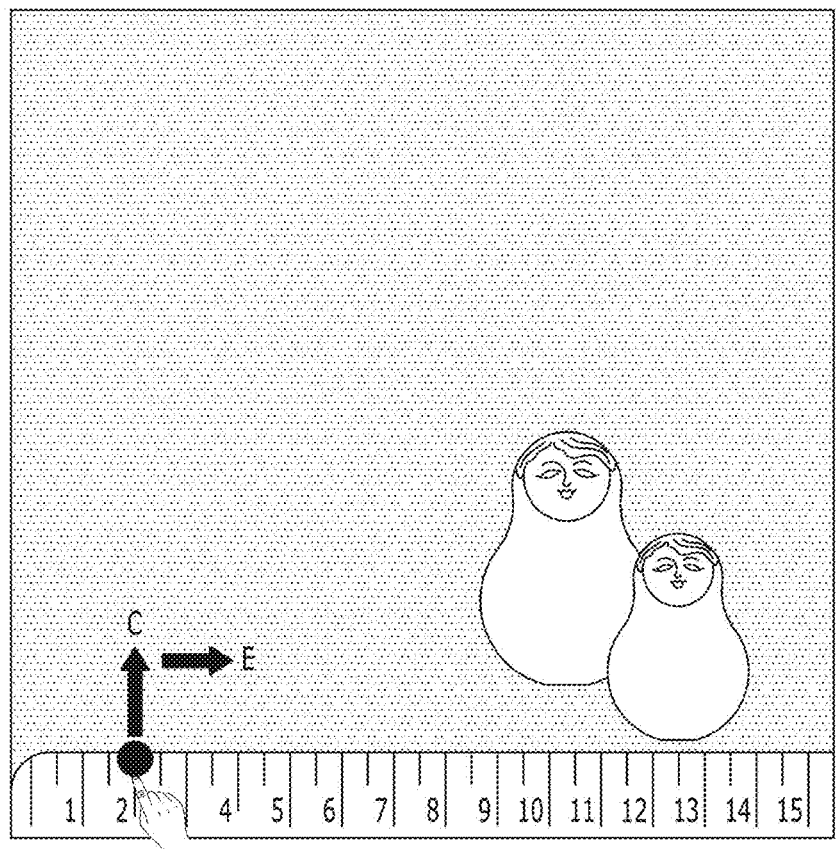
Figure 12C:
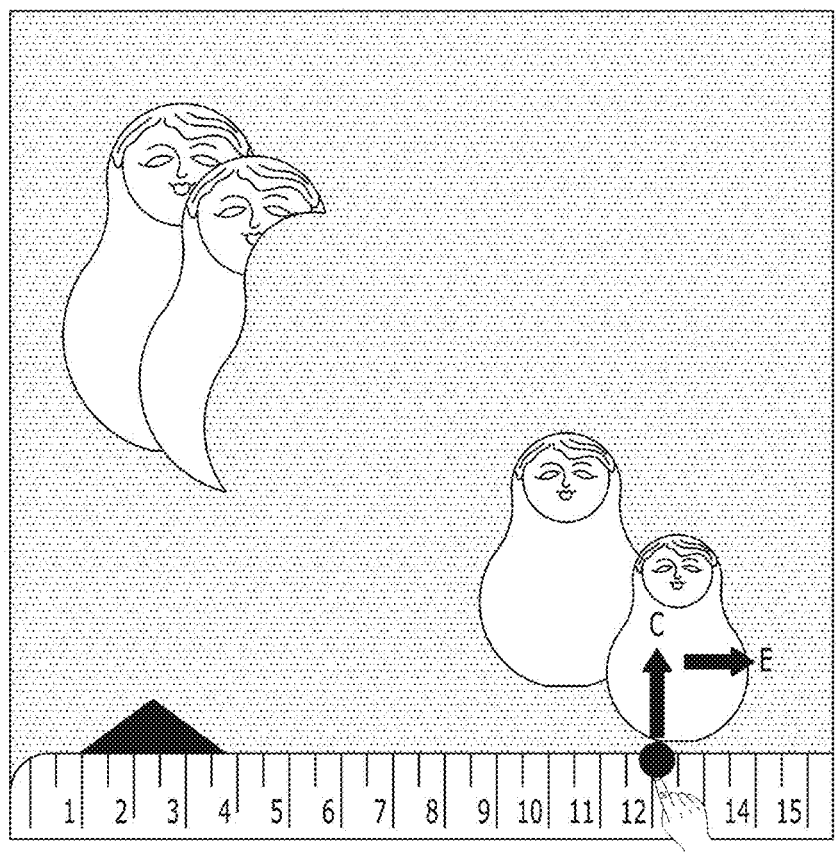

Referring to FIG. 12B, the controller 180 adjusts a focal range in response to the second touch input moving in a vertical direction. Further, the longer the second touch input gets in the vertical direction, the wider the focal range is adjusted. Moreover, the controller 180 controls the display unit 151 to selectively display the focal range only while the user's second touch input is applied.

Thereafter, while the second touch input still contacts the last position, the user applies a third touch input (e.g., a drag E) in a direction different from that of the second touch input (e.g., a direction in parallel with the scale plate or the slide bar). Subsequently, if the third touch input is ended (i.e., if the user's contact is released), the controller 180 fixes the adjusted focal distance/position and the adjusted focal range. The reason for the focal distance/position and the focal range to be fixed is to additionally set a different focal distance/position and a corresponding focal range. In particular, referring to FIG. 12C, it can additionally set at least one of the different focal distance/position and the corresponding focal range by repeating the above-mentioned steps C and E. Hence, a multi-focus can be applied to a single image.

Figure 12D:
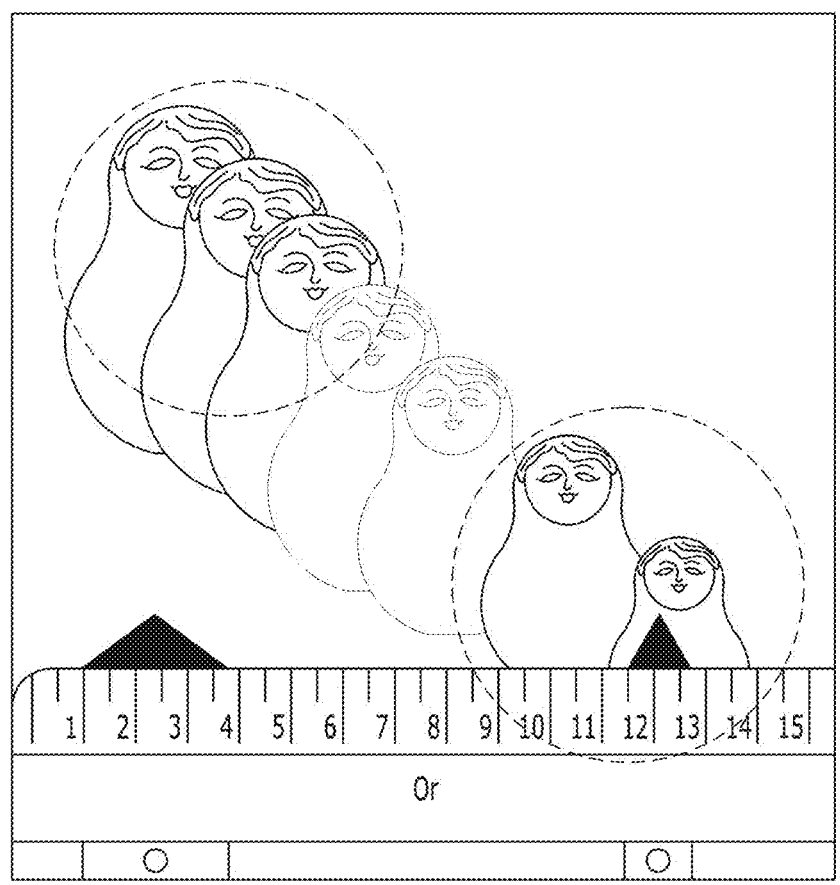

If the user's touch input is finally ended, referring to FIG. 12D, a whole multi-focused image is displayed on the display unit 151. Moreover, the controller 180 can control the display unit 151 to display the pointer enlarged by an extended portion of the focal range. In particular, the size of the focal range is proportional to the size of the pointer in the image.

Figure 13:
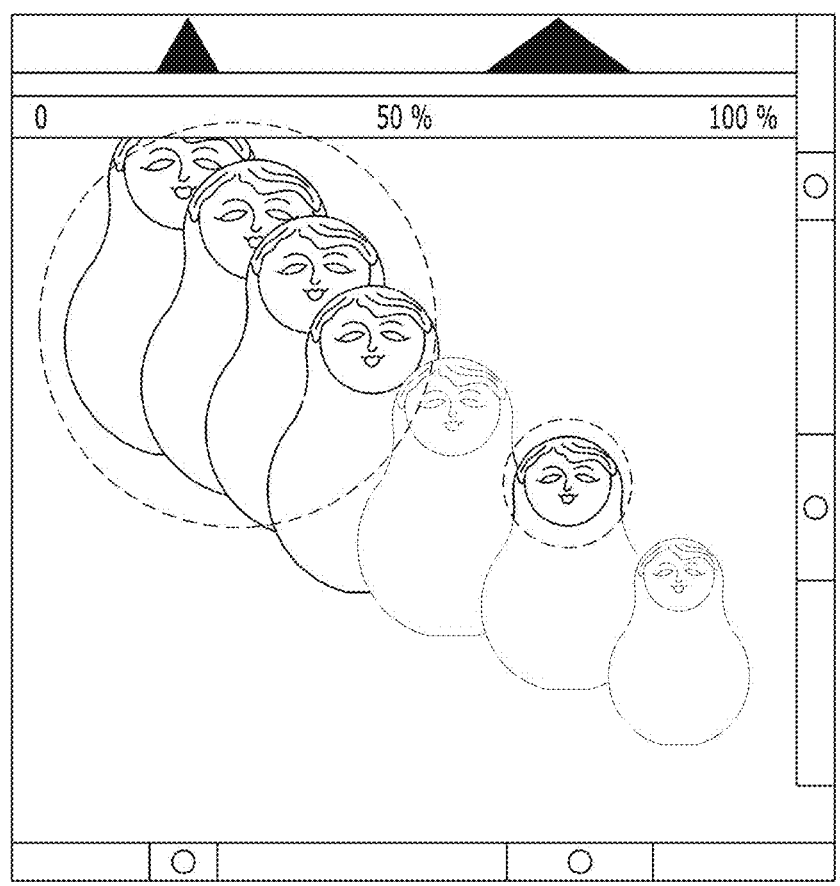
FIG. 13 is a diagram illustrating one example of a slide bar indicating a multi-focus and focal range.

FIG. 13 is a diagram illustrating one example of a slide bar indicating a multi-focus and a focal range. Referring to FIG. 13, a slide bar can indicate a distance of a subject per focal distance (cm or m), per section (1-10), or per rate (%). And, the slide bar can also represent a multi-focus and a focal range. Moreover, a slide bar or a scale plate may be disposed vertically.

Figure 14A:
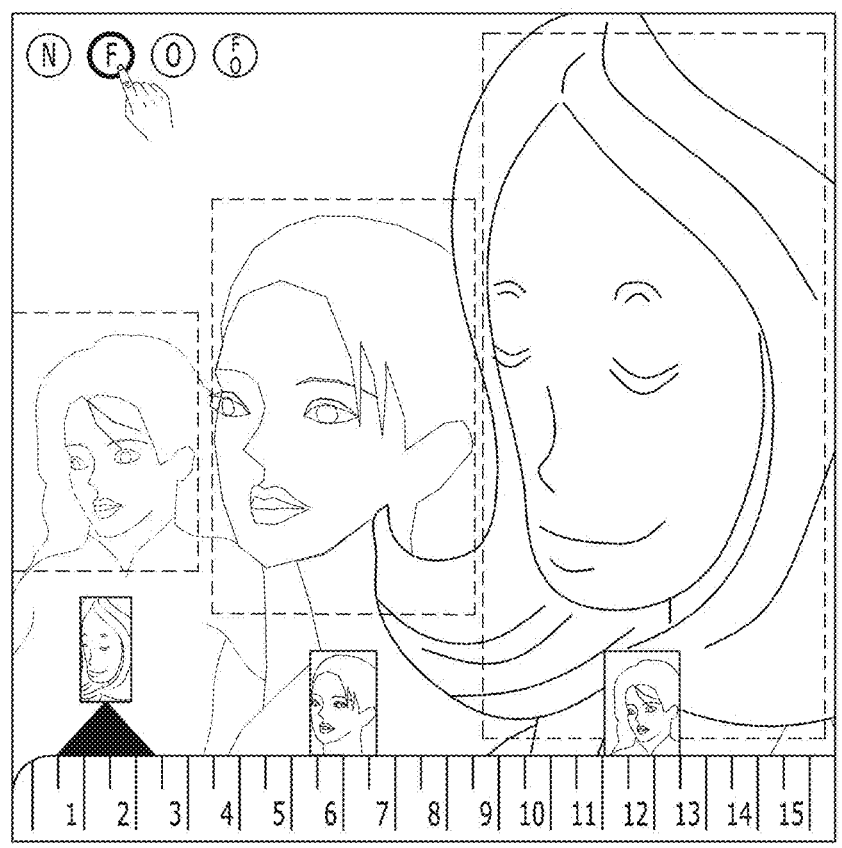

FIGS. 14A to 14C are diagrams to describe another example of correcting a post-focus image according to one embodiment of the present invention. FIG. 14A shows a case of using a scale plate, while FIG. 14B shows a case of using a slide bar. Thus, the controller 180 provides a scale plate or a slide bar to the display unit 151 in response to a user's request. The scale plate or the slide bar is preferably displayed on one side of the display unit 151, e.g., a bottom edge of the display unit 151, not to block an image as far as it can, by which a displayed position on the scale plate or the slide bar is non-limited.

If a prescribed mode is selected from the modes shown in FIG. 14C to correct a post-focus image, the controller 180 can provide the scale plate or the slide bar in response to the selected mode. For instance, if a face tracking mode is selected, referring to FIG. 14A and FIG. 14B, the controller 180 checks a focal distance per face through a face tracking function and can then display a thumbnail of the corresponding face at a position corresponding to a focal distance on the scale plate or the slide bar. In this instance, the controller 180 can check the focal distance per face based on a distance information included in an image.

Figure 15:
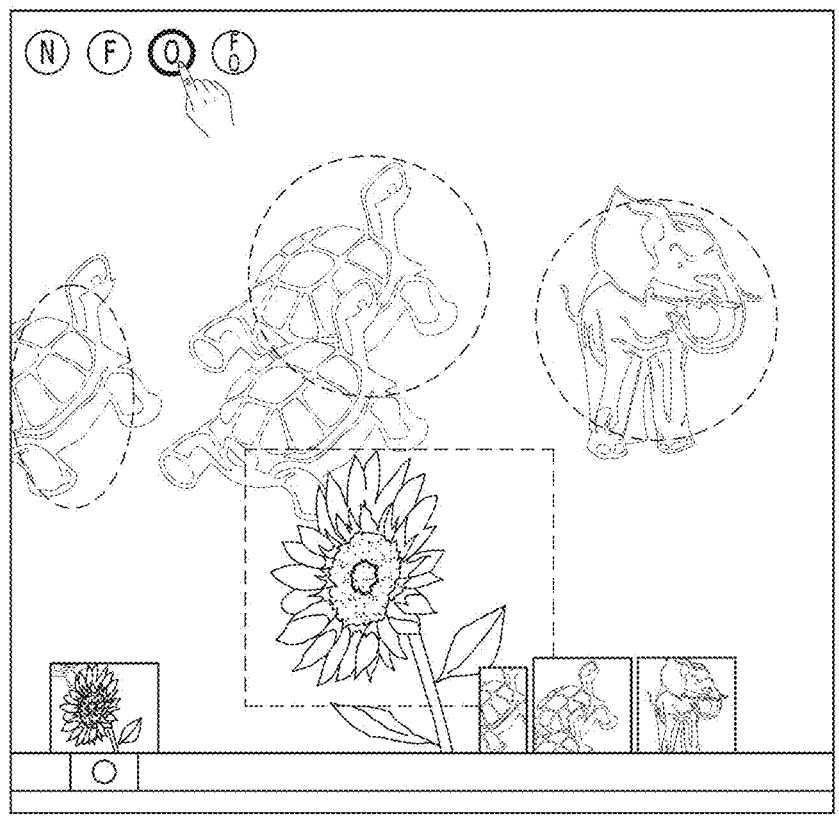
FIG. 15 is a diagram to describe a post-focus image correcting method according to one embodiment of the present invention.

Moreover, in response to a user's touch input, the controller 180 can adjust a focal distance per face or a focal range using the correcting methods described with reference to FIG. 3, FIG. 4A, FIG. 4B, FIG. 5A, FIG. 5B, FIGS. 11A to 11D, and FIGS. 12A to 12D. The controller 180 can control the display unit 151 to display information on at least one subject included in an image on a region adjacent to a scale plate or a slide bar using a different mode. For instance, referring to FIG. 15, if an object tracking mode is selected, the controller 180 tracks objects included in an image and can then determine focal distances of the corresponding objects. The controller 180 can also display thumbnails and focal distances of the objects on the scale plate or the slide bar. Likewise, in response to a user's touch input, the controller 180 can adjust a focal distance per object or a focal range using the correcting methods described with reference to FIG. 3, FIG. 4A, FIG. 4B, FIG. 5A, FIG. 5B, FIGS. 11A to 11D, and FIGS. 12A to 12D.

Figure 16A:
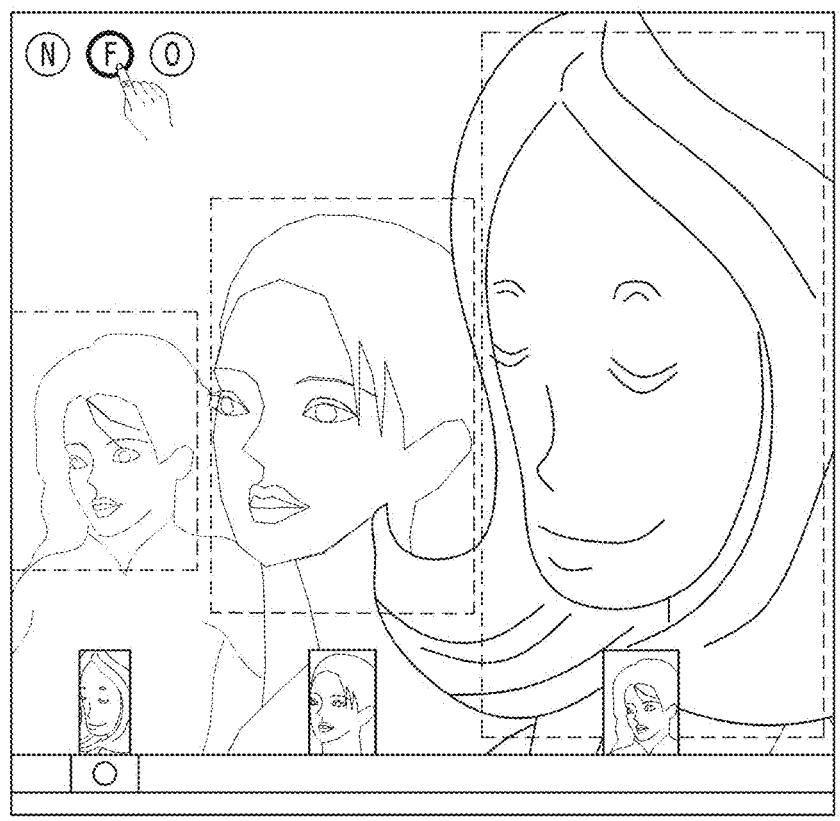
FIGS. 16A to 16C are diagrams to describe a post-focus image correcting method according to one embodiment of the present invention.
Figure 16B:
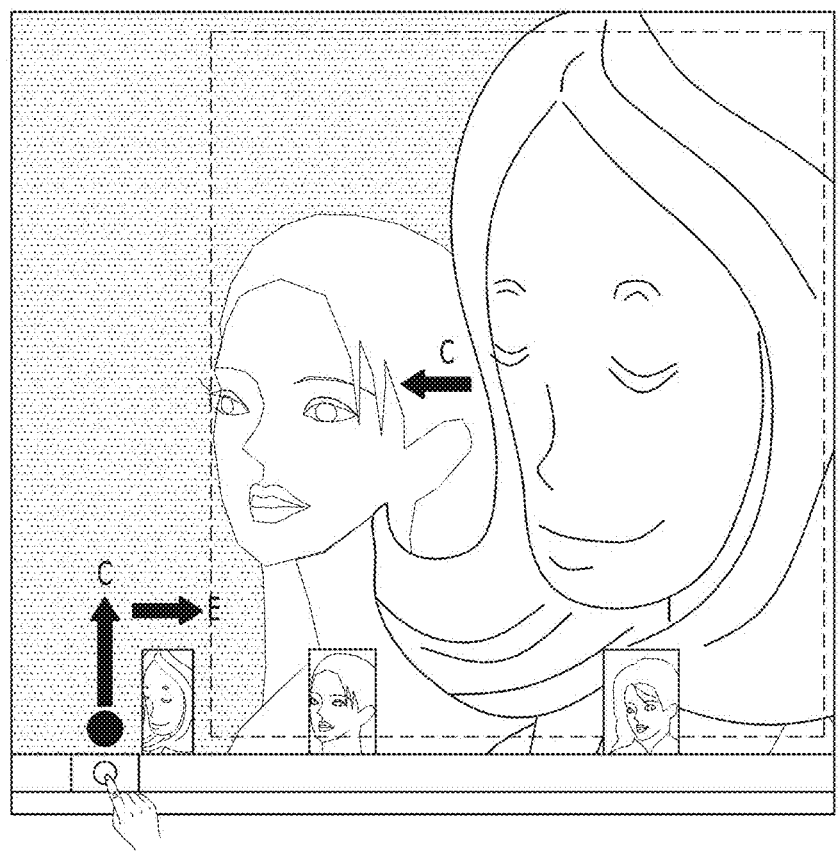
Figure 16C:
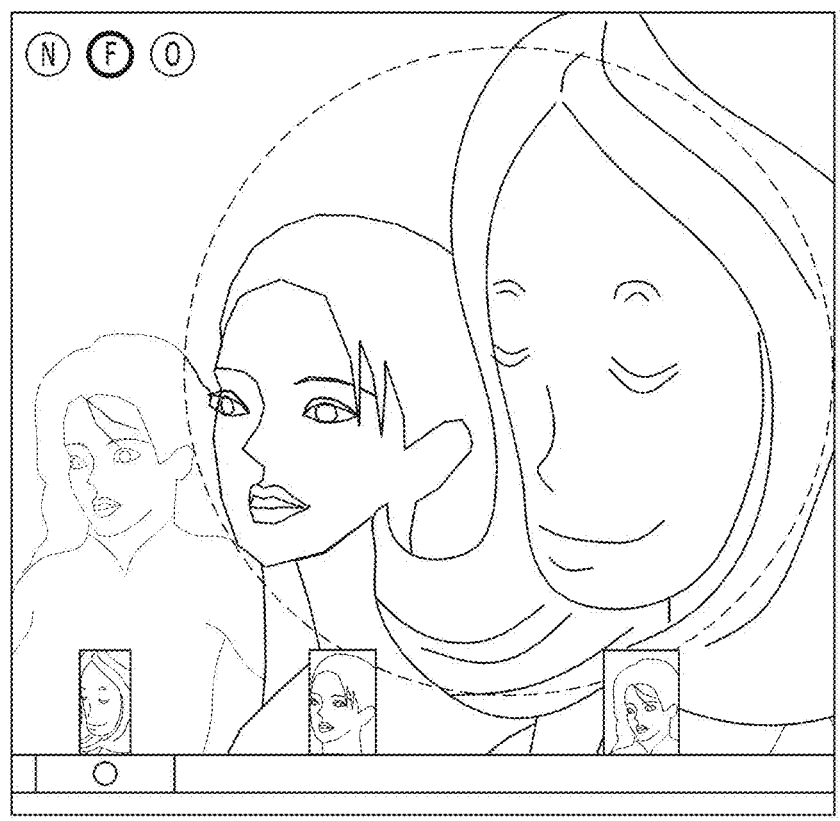

FIGS. 16A to 16C are diagrams to describe another example of correcting a post-focus image according to one embodiment of the present invention. Referring to FIG. 16A, the controller 180 provides at least one of a scale plate and a slide bar to the display unit 151 in response to a user's request. The scale plate or the slide bar is preferably displayed on one side of the display unit 151, e.g., a bottom edge of the display unit 151, not to block an image as far as it can, by which a displayed position on the scale plate or the slide bar is non-limited.

If a prescribed mode is selected from the modes, the controller 180 can provide the scale plate or the slide bar in response to the selected mode. For instance, if a face tracking mode is selected, the controller 180 checks a focal distance per face through a face tracking function and can then display a thumbnail of the corresponding face at a position corresponding to a focal distance on the scale plate or the slide bar. In this instance, the controller 180 can check the focal distance per face based on a distance information included in an image.

Thereafter, if a user shifts a pointer displayed on the scale plate or the slide bar to a desired position through a first touch input (e.g., a touch, a drag, etc.), the controller 180 adjusts a focal distance of the image in response to the first touch input. For instance, the controller 180 sets a focal distance of an image to a face of a first female in accordance with a changed position of the pointer. Hence, the face of the first female is in focus and the rest of subjects are represented as blurred. Thus, in order to change a focal distance/position, the controller 180 controls a face in a user designated focal distance to be represented clearly only using a per-pixel distance information of a photographed image or can display an image corresponding to a focal distance designated by a user in a post-focus image having a multitude of focal distances/positions only.

Moreover, while the user's first touch input is being applied (e.g., while the user's first touch input is contacting the slide bar), the controller 180 controls the display unit 151 to selectively display the face corresponding to the focal distance indicated by the pointer only. For instance, the controller 180 controls the display unit 151 to display only the face of the first female located in the selected focal distance but controls the display unit 151 not to display the rest of subjects. The reason for the face corresponding to the selected focal distance to be selectively displayed only is to enable a user to easily recognize a focused region from a currently corrected image.

Thereafter, while the first touch input is still contacting the last position, if the user shifts a second touch input (i.e., a drag C) in a specific direction (e.g., a vertical direction toward a top side of the scale plate or the slide bar), the controller 180 adjusts a range (i.e., a focal range) of a focused region with reference to the face located in the selected focal distance. In this instance, the focal range may mean a planar range of an image. Preferably, the focal range means a spatial range of a focus around a subject in an image. In particular, adjustment of a focal range can inclusively indicate all the effects of adjusting a size of a focused region in a corresponding image. For instance, an image focused on two points may have a focal range wider than that of an image focused on a single point. In another instance, a case of a deep field depth may have a focal range wider than a case of a shallow field depth. So to speak, the adjustment of the focal range can inclusively indicate all methods of adjusting a size of a clearly seen part of an image and a size of an unclearly seen part of the image. And, a size adjustment of a focused region can inclusively indicate size adjustments of other regions and/or an adjustment of clarity.

Referring to FIG. 16B, the controller 180 adjusts a focal range in response to the second touch input moving in a vertical direction. Further, the longer the second touch input gets in the vertical direction, the wider the focal range is adjusted. Moreover, the controller 180 controls the display unit 151 to selectively display the focal range only while the user's second touch input is applied.

Thereafter, while the second touch input still contacts the last position, the user may apply a third touch input (e.g., a drag E) in a direction different from that of the second touch input (e.g., a direction in parallel with the scale plate or the slide bar). Subsequently, if the third touch input is ended (i.e., if the user's contact is released), the controller 180 fixes the adjusted focal distance/position and the adjusted focal range. The reason for the focal distance/position and the focal range to be fixed is to additionally set a different focal distance/position and a corresponding focal range. In particular, it can additionally set at least one of the different focal distance/position and the corresponding focal range by repeating the above-mentioned steps. Hence, a multi-focus can be applied to a single image.

If the user's touch input is finally ended, referring to FIG. 16C, a whole focused image is displayed on the display unit 151. Moreover, the controller 180 can control the display unit 151 to display the pointer enlarged by an extended portion of the focal range. In particular, the size of the focal range is proportional to the size of the pointer in the image.

Figure 17A:
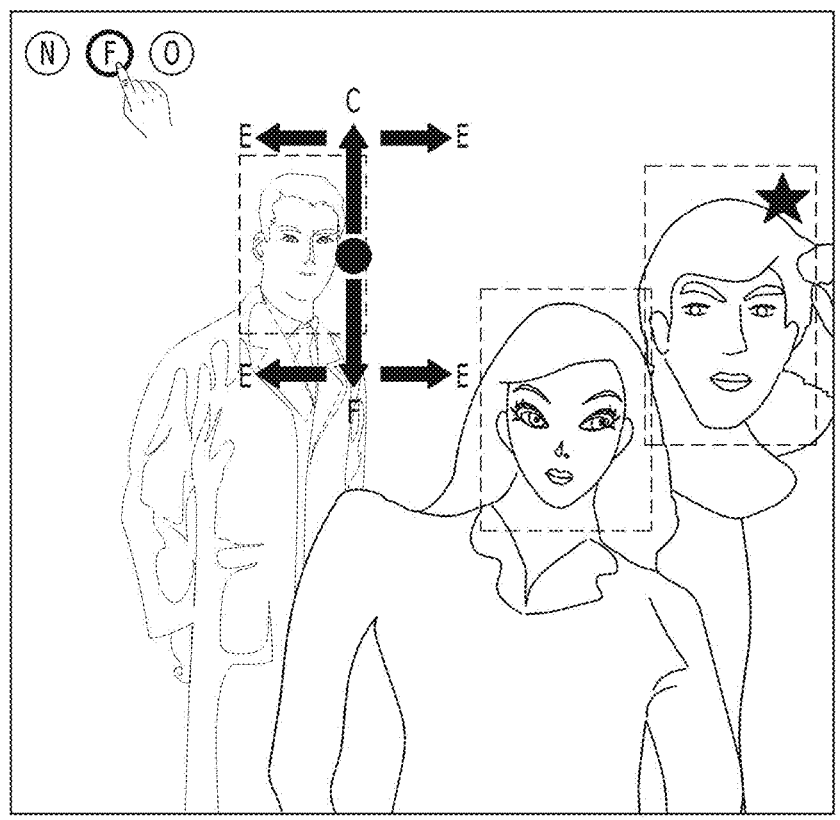
FIG. 17A and FIG. 17B are diagrams to describe a post-focus image correcting method according to one embodiment of the present invention.
Figure 17B:
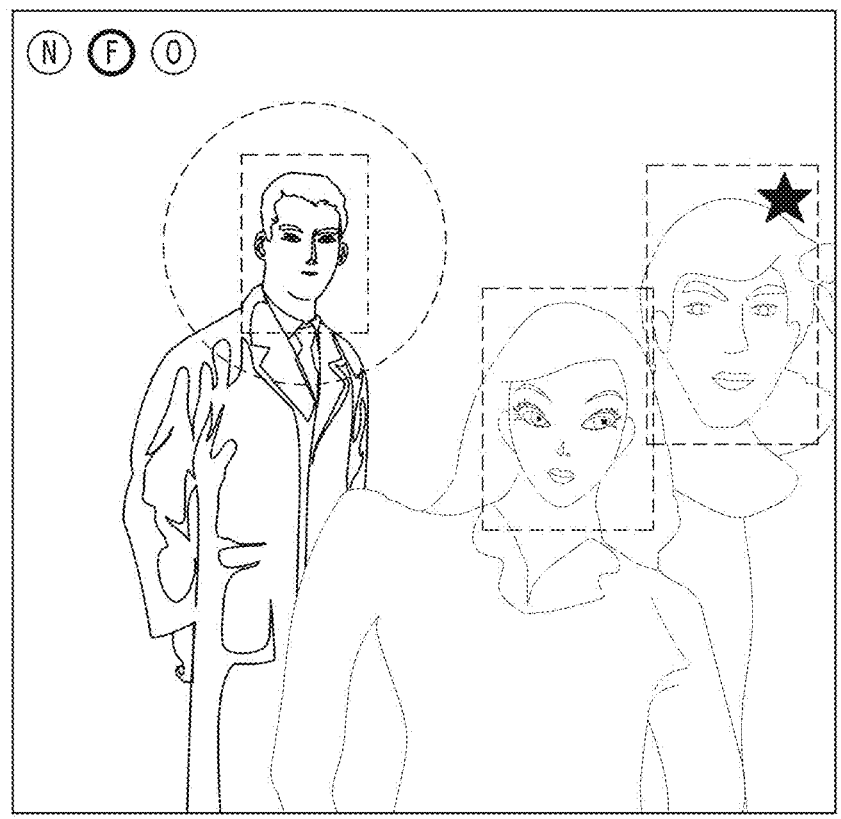

FIG. 17A and FIG. 17B are diagrams to describe another example of correcting a post-focus image according to one embodiment of the present invention. Referring to FIG. 17A and FIG. 17B, if one of the correction modes is selected, the controller 180 checks a per-subject focal distance in accordance with the selected mode and controls the display unit 151 to display a diagram illustrating identifying a corresponding subject. For instance, if a face tracking mode is selected, referring to FIG. 17A, the controller 180 checks a focal distance per face through a face tracking function and can then display a diagram illustrating distinguishing each face. In this instance, the controller 180 can check the focal distance per face based on a distance information included in an image.

Thereafter, if one of the faces displayed on the display unit 151 is selected through a user's first touch input (e.g., a touch) applied to a subject or diagram displayed on the display unit 151, the controller 180 sets a focal distance of an image to the selected face. Hence, the selected face is in focus and the rest of subjects are represented as blurred. Thus, in order to change a focal distance/position, the controller 180 controls a user-selected face to be represented clearly only using a per-pixel distance information of a photographed image or can display an image having a user-selected face displayed clearly thereon in a post-focus image having a multitude of focal distances/positions only.

Subsequently, if the user shifts a second touch input (i.e., a drag C or a drag F) in a specific direction (e.g., a vertical direction toward a top or bottom side) in continuation with the first touch input, the controller 180 adjusts a range (i.e., a focal range) of a focused region with reference to the face located in the selected focal distance. In this instance, the focal range may mean a planar range of an image. Preferably, the focal range means a spatial range of a focus around a subject in an image. In particular, adjustment of a focal range can inclusively indicate all the effects of adjusting a size of a focused region in a corresponding image. For instance, an image focused on two points may have a focal range wider than that of an image focused on a single point. In another instance, a case of a deep field depth may have a focal range wider than a case of a shallow field depth. So to speak, the adjustment of the focal range can inclusively indicate all methods of adjusting a size of a clearly seen part of an image and a size of an unclearly seen part of the image. And, a size adjustment of a focused region can inclusively indicate size adjustments of other regions and/or an adjustment of clarity.

The controller 180 adjusts a focal range in response to the second touch input moving in a vertical direction. Further, the longer the second touch input (i.e., the drag C) gets in the top direction, the wider the focal range is adjusted. The longer the second touch input (i.e., the drag F) gets in the bottom direction, the narrower the focal range is adjusted.

Thereafter, for the multi-focus setting, while the second touch input still contacts the last position, the user may additionally apply a third touch input (e.g., a drag E) in a direction different from that of the second touch input (e.g., a horizontal direction). Subsequently, if the third touch input is ended (i.e., if the user's contact is released), the controller 180 fixes the adjusted focal distance/position and the adjusted focal range. The reason for the focal distance/position and the focal range to be fixed is to additionally set a different focal distance/position and a corresponding focal range. In particular, it can additionally set at least one of the different focal distance/position and the corresponding focal range by repeating the above-mentioned steps. Hence, a multi-focus can be applied to a single image. If the user's touch input is finally ended, referring to FIG. 17B, an image focused on the selected face is displayed on the display unit 151.

Figure 18:
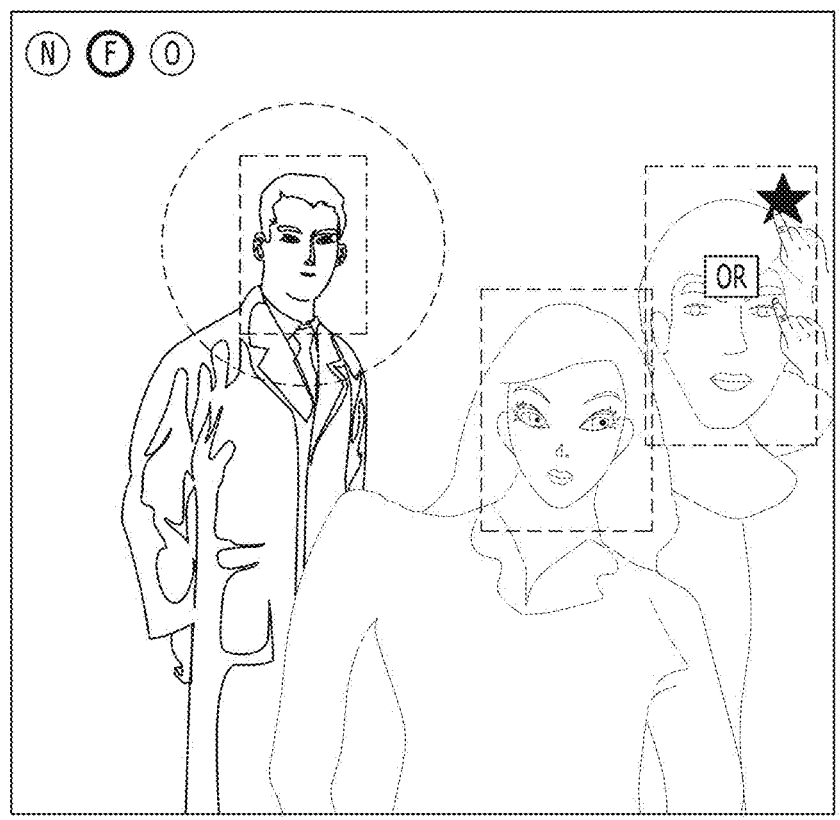
FIG. 18 and FIG. 19 are diagrams to describe an additional function using a post-focus image.
Figure 19:
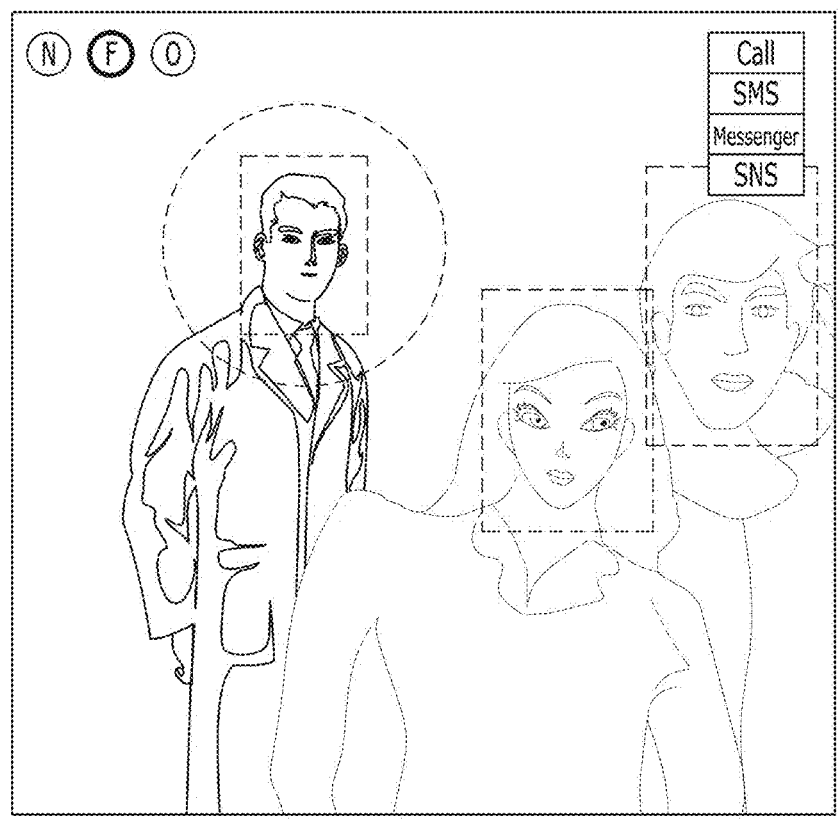

FIG. 18 and FIG. 19 are diagrams to describe an additional function using a post-focus image. Referring to FIG. 18 and FIG. 19, the controller 180 tracks a face included in a photographed image and then determines whether the tracked face exists in an address book saved in the memory 160. If the tracked face exists in the address book, the controller 180 can control a personal information related to a character corresponding to the tracked face to be displayed on the image or can control an identification information (e.g., a symbol of a star shape, etc.), which is provided to indicate the existence in the address book, to be displayed on the image. For instance, referring to FIG. 18, at least one of a name, a phone number and an email address of the tracked face can be displayed on the face of the corresponding character. Subsequently, if the user touches the personal information or the face displayed on the image, the controller 180 can send the image to the mobile terminal of the corresponding character or the email address of the corresponding character. Moreover, referring to FIG. 19, one of Call, SMS (short message service), mobile messenger service and SNS (social networking service) is selected from a menu displayed on the face of the corresponding character and a post-focus image can be then shared with the character in the image.

Figure 20A:
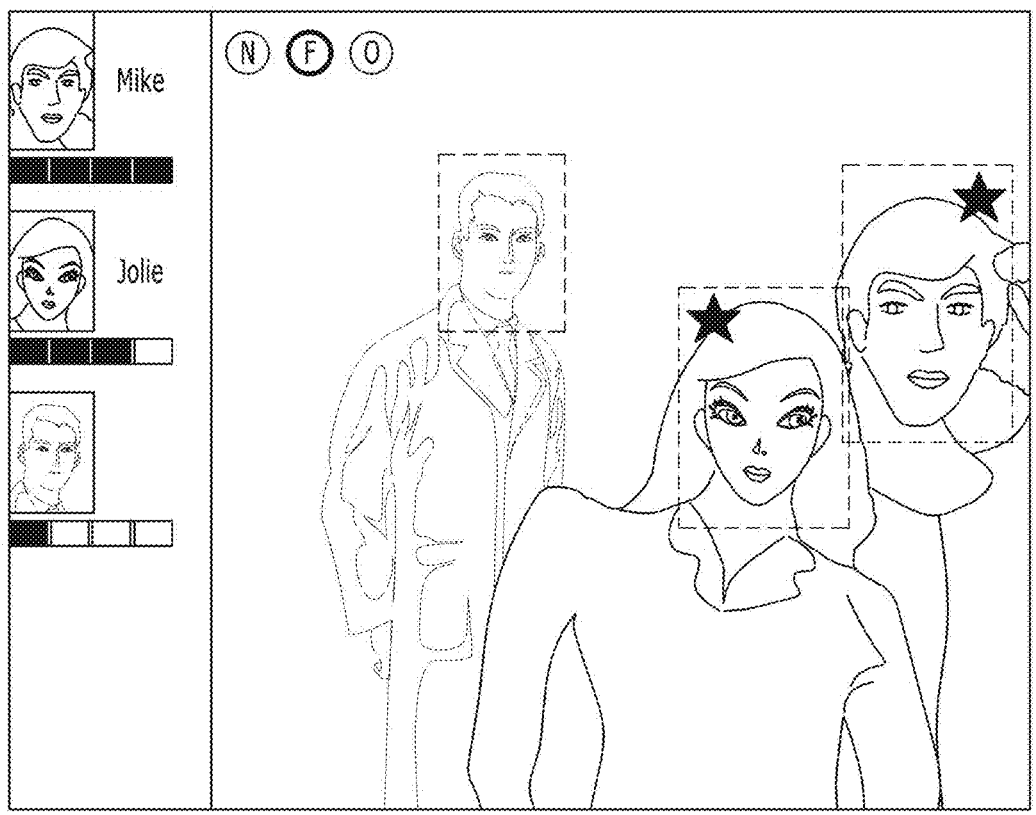
FIG. 20A and FIG. 20B are diagrams to describe a post-focus image correcting method according to one embodiment of the present invention.
Figure 20B:
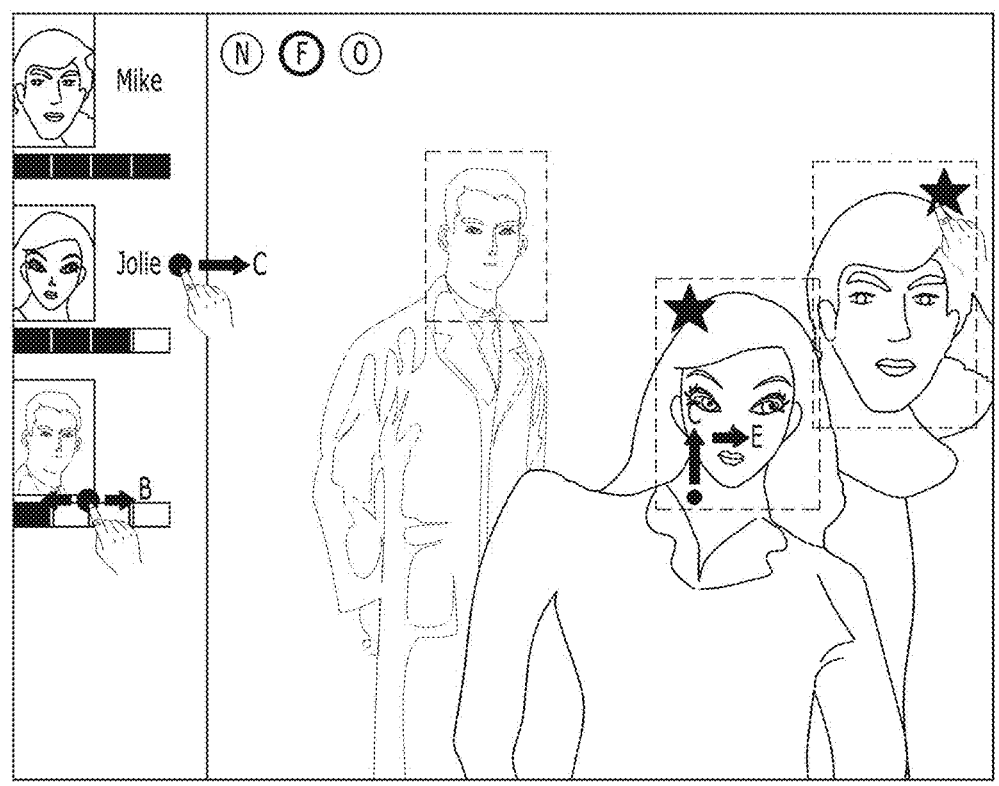

FIG. 20A and FIG. 20B are diagrams to describe another example of correcting a post-focus image according to one embodiment of the present invention. Referring to FIG. 20A and FIG. 20B, if one of the correction modes is selected, the controller 180 checks a per-subject focal distance in accordance with the selected mode and controls the display unit 151 to display a diagram illustrating identifying a corresponding subject. For instance, if a face tracking mode is selected, referring to FIG. 20A, the controller 180 checks a focal distance per face through a face tracking function and can then display a diagram illustrating distinguishing each face. In this instance, the controller 180 can check the focal distance per face based on a distance information included in an image.

Moreover, the controller 180 displays a progress bar, which indicates a thumbnail and focus gauge/state of each of faces included in a post-focus image, on one side of the display unit 151, e.g., a left edge of the display unit 151. Further, the controller 180 can sort the thumbnails in order of accuracy of a focus. For instance, a thumbnail corresponding to a face having a most accurate focus is displayed on a top side.

Besides, the controller 180 tracks a face included in a photographed image and then determines whether the tracked face exists in an address book saved in the memory 160. If the tracked face exists in the address book, the controller 180 can control a personal information related to a character corresponding to the tracked face to be displayed on the image or can control an identification information (e.g., a symbol of a star shape, etc.), which is provided to indicate the existence in the address book, to be displayed on the image. For instance, at least one of a name, a phone number and an email address of the tracked face can be displayed on the face of the corresponding character or around the thumbnail of the corresponding character.

Thereafter, if one of the faces displayed on the display unit 151 is selected through a user's first touch input (e.g., a touch) applied to a subject or diagram displayed on the display unit 151, the controller 180 sets a focal distance of an image to the selected face. Hence, the selected face is in focus and the rest of subjects are represented as blurred. Thus, in order to change a focal distance/position, the controller 180 controls a user-selected face to be represented clearly only using a per-pixel distance information of a photographed image or can display an image having a user-selected face displayed clearly thereon in a post-focus image having a multitude of focal distances/positions only.

Subsequently, if the user shifts a second touch input (i.e., a drag C) in a specific direction (e.g., a vertical direction toward a top or bottom side) in continuation with the first touch input, the controller 180 adjusts a range (i.e., a focal range) of a focused region with reference to the face located in the selected focal distance. In this instance, the focal range may mean a planar range of an image. Preferably, the focal range means a spatial range of a focus around a subject in an image. In particular, adjustment of a focal range can inclusively indicate all the effects of adjusting a size of a focused region in a corresponding image. For instance, an image focused on two points may have a focal range wider than that of an image focused on a single point. In another instance, a case of a deep field depth may have a focal range wider than a case of a shallow field depth. So to speak, the adjustment of the focal range can inclusively indicate all methods of adjusting a size of a clearly seen part of an image and a size of an unclearly seen part of the image. And, a size adjustment of a focused region can inclusively indicate size adjustments of other regions and/or an adjustment of clarity.

The controller 180 adjusts a focal range in response to the second touch input moving in a vertical direction. Further, the longer the second touch input gets in the top direction, the wider the focal range is adjusted. The longer the second touch input gets in the bottom direction, the narrower the focal range is adjusted.

Thereafter, for the multi-focus setting, the user may additionally set a different focal distance/position using the progress bar. For instance, referring to FIG. 20B, if the user touches or drags (B) a far right block among 4 blocks included in the progress bar related to the last thumbnail, the controller 180 corrects the image to be focused on the face corresponding to the last thumbnail as well. Further, if the user touches or drags (B) a far left block among 4 blocks included in the progress bar, the controller 180 can control the face corresponding to the last thumbnail to be represented as blurred.

Figure 21A:
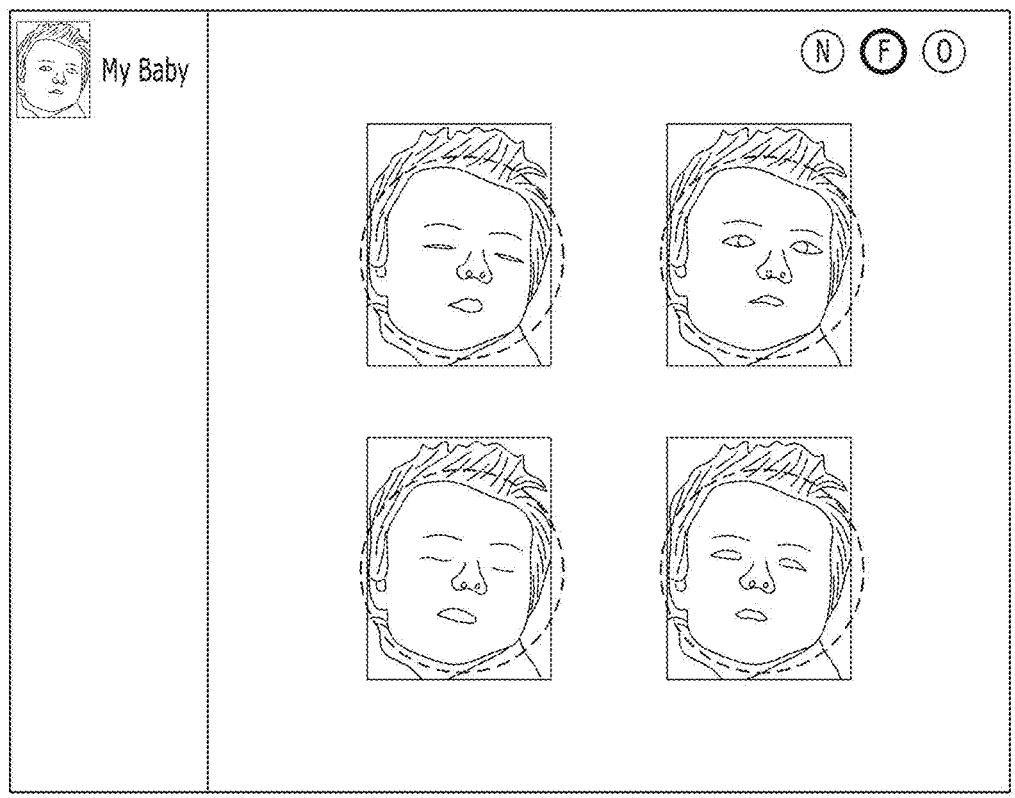
FIG. 21A and FIG. 21B are diagrams to describe a post-focus image correcting method according to one embodiment of the present invention.
Figure 21B:
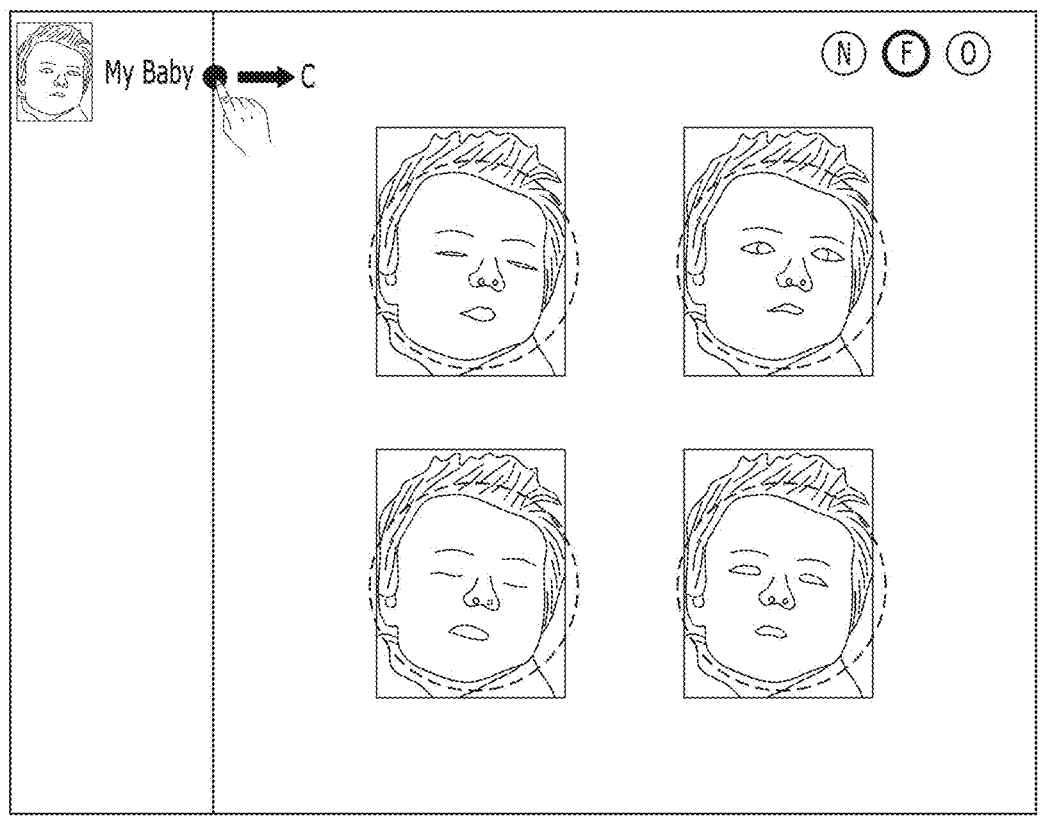

FIG. 21A and FIG. 21B are diagrams to describe one example of correcting a multitude of post-focus images according to one embodiment of the present invention. Referring to FIG. 21A, if the controller 180 displays thumbnails and personal information of faces included in a multitude of images (e.g., consecutively photographed images) on one side of the display unit 151, a user can change focal distances/positions and focal ranges of the consecutively photographed images collectively using the thumbnails. For instance, referring to FIG. 21B, if the user touches a specific thumbnail or a region around the specific thumbnail, the controller 180 corrects a multitude of the images so that the face corresponding to the selected thumbnail can be in focus. If the selected thumbnail is dragged in a specific direction (C), the controller 180 can adjust the focal range with reference to a character selected from a multitude of the images in response to the drag.

Figure 22A:
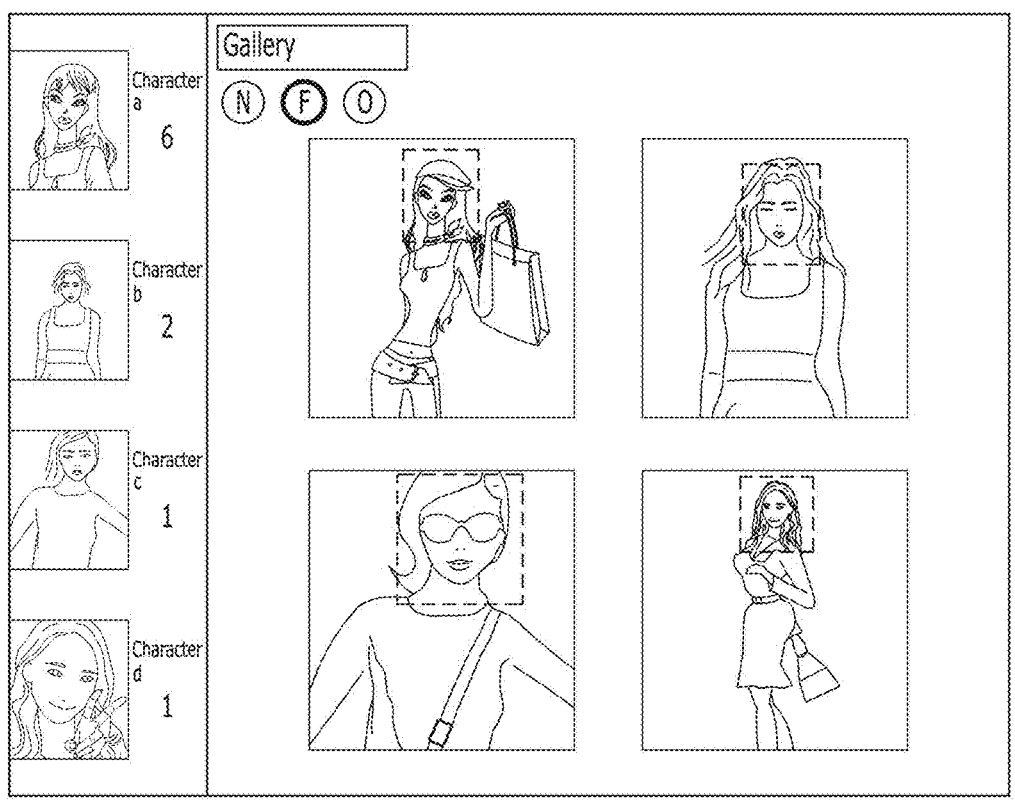
FIG. 22A and FIG. 22B are diagrams to describe a post-focus image correcting method according to one embodiment of the present invention.
Figure 22B:
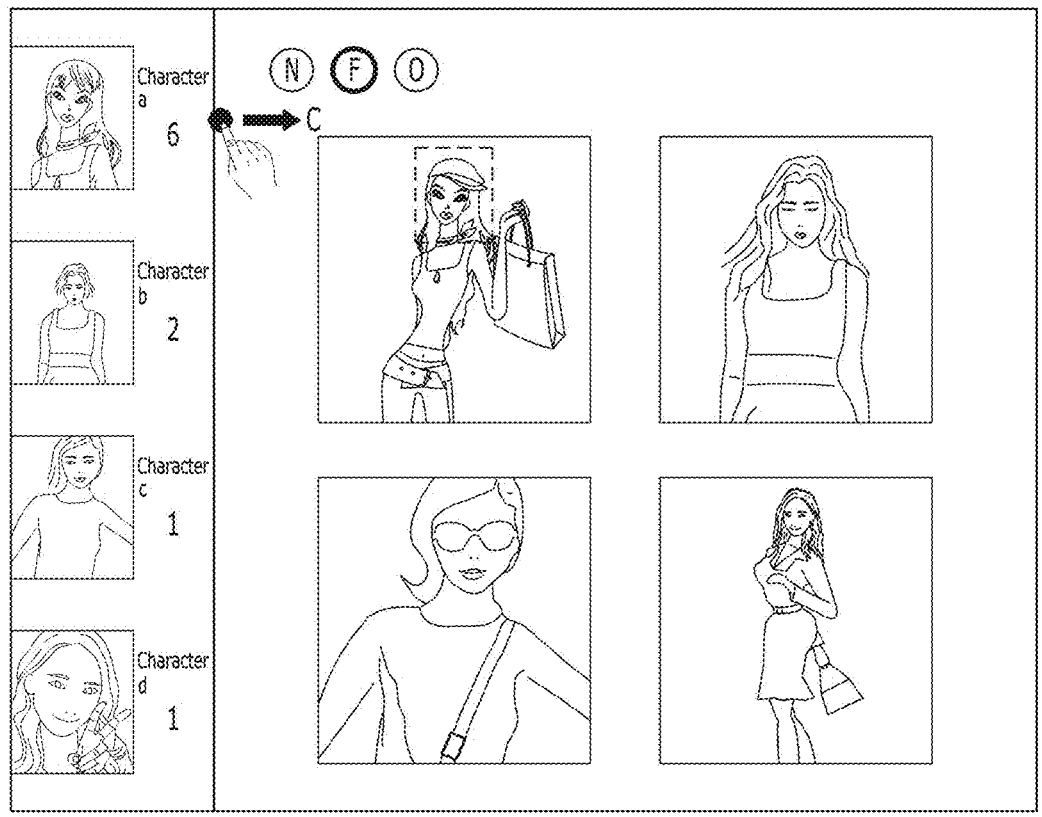

FIG. 22A and FIG. 22B are diagrams to describe another example of correcting a multitude of post-focus images according to one embodiment of the present invention. Referring to FIG. 22A, the controller 180 can display a multitude of images on the display unit 151 per folder, date, or time slot. Subsequently, if the controller 180 displays thumbnails and personal information of faces included in a multitude of the images on one side of the display unit 151, a user can change focal distances/positions and focal ranges of the consecutively photographed images collectively using the thumbnails. For instance, referring to FIG. 22B, if the user touches a specific thumbnail or a region around the specific thumbnail, the controller 180 corrects a multitude of the images so that the face corresponding to the selected thumbnail can be in focus. If the selected thumbnail is dragged in a specific direction (C), the controller 180 can adjust the focal range with reference to a character selected from a multitude of the images in response to the drag.

Figure 23:
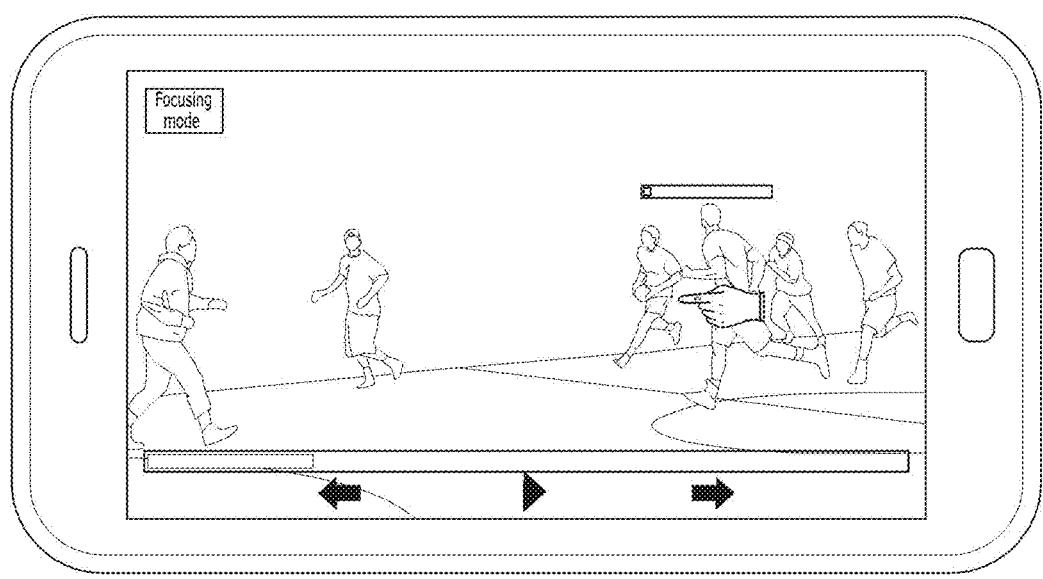
FIGS. 23 to 53 are diagrams to describe various examples of correcting a post-focus video according to an embodiment of the present invention.

FIG. 23 is a diagram to describe one example of correcting a post-focus video. First of all, the controller 180 plays a post-focus video saved in the memory 160 or a post-focus video received from an external device and displays the played video on the display unit 151.

Referring to FIG. 23, if a focusing mode for adjusting a focus during playback of a video is selected by a user and a user's first touch input (e.g., a touch) for selecting at least one subject (e.g., an object, a person, etc.) is applied, the controller 180 determines whether the selected subject is a moving body. In order to determine whether the selected subject is the moving body, the controller 180 compares consecutive video frames (e.g., a video frame right before applying the first touch input, a video frame at the timing point of applying the first touch input, and a video frame after applying the first touch input) to one another. Further, based on a variation of a position or size of a subject selected from the three video frames, the controller 180 can determine whether the selected subject is the moving body. For instance, if the variation of the selected subject is greater than a variation of another subject included in the three video frames or a variation of a background, the controller 180 recognizes the selected subject as the moving body.

If the selected subject is determined as the moving body, the controller 180 adjusts a focus in a video frame after applying the first touch input in order to enable the selected subject to be focused on. Thereafter, the controller 180 corrects the video in order to enable the selected subject to keep being focused on by tracking subjects selected from the consecutive video frames. Thus, in order to enable a selected subject to be focused on, the controller 180 clearly represents all regions, which are located in the same focal distance of the selected subject, using per-pixel distance information in a video or may clearly represent the selected subject only.

Moreover, the controller 180 adjusts a focus gauge of a selected subject in accordance with an applied time of the first touch input. For instance, the longer the applied time of the first touch input becomes, the clearer the focus of the selected subject gets. Further, the controller 180 can display a focus gauge of the selected subject on the display unit 151 using a gauge bar and the like. Of course, after the first touch input has been applied, the controller 180 can additionally adjust the focus gauge of the selected subject in response to a second touch input (e.g., a touch, a drag, etc.) applied to the selected subject or the gauge bar.

Thereafter, the controller 180 can control the corrected video to be saved in the memory 160 or sent to an external device. When the corrected video is played, it is played when the focus and the focus gauge are changed.

Figure 24:
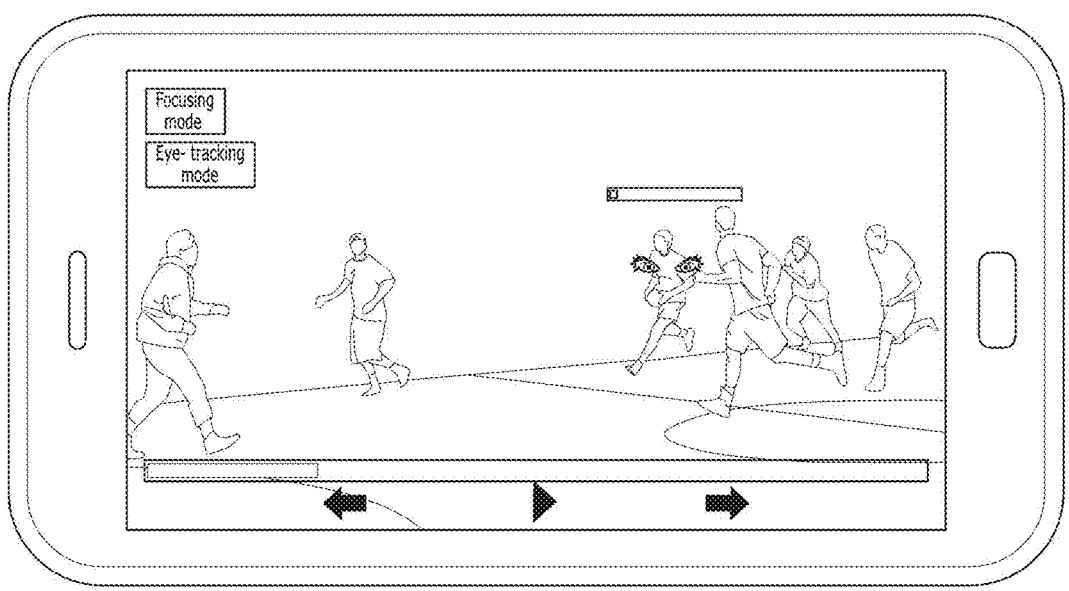

FIG. 24 is a diagram to describe another example of correcting a post-focus video. First of all, the controller 180 plays a post-focus video saved in the memory 160 or a post-focus video received from an external device and displays the played video on the display unit 151.

Referring to FIG. 24, if a focusing mode for adjusting a focus during playback of a video and an eye-tracking mode are selected by a user, the controller 180 identifies a subject selected by the user in response to a position/motion of user eyes detected through the camera 121. For instance, the controller 180 determines a position on the display unit 151 watched by the user based on the position of the user eyes and then recognizes a subject at the corresponding position as a selected subject.

And, the controller 180 determines whether the selected subject is a moving body. In order to determine whether the selected subject is the moving body, the controller 180 compares consecutive video frames to one another. Further, based on a variation of a position or size of a subject selected from the video frames, the controller 180 can determine whether the selected subject is the moving body. For instance, if the variation of the selected subject is greater than a variation of another subject included in the video frames or a variation of a background, the controller 180 recognizes the selected subject as the moving body.

If the selected subject is determined as the moving body, the controller 180 adjusts a focus in a video frame at a specific timing point in order to enable the selected subject to be focused on. Thereafter, the controller 180 corrects the video in order to enable the selected subject to keep being focused on by tracking subjects selected from the consecutive video frames. Thus, in order to enable a selected subject to be focused on, the controller 180 clearly represents all regions, which are located in the same focal distance of the selected subject, using per-pixel distance information in a video or may clearly represent the selected subject only.

Moreover, the controller 180 adjusts a focus gauge of a selected subject in accordance with a time for the user to watch the selected subject. For instance, the longer the time for the user to watch the selected subject becomes, the clearer the focus of the selected subject gets. Further, the controller 180 can display a focus gauge of the selected subject on the display unit 151 using a gauge bar and the like. Of course, the controller 180 can additionally adjust the focus gauge of the selected subject in response to a second touch input (e.g., a touch, a drag, etc.) applied to the selected subject or the gauge bar.

Thereafter, the controller 180 can control the corrected video to be saved in the memory 160 or sent to an external device. When the corrected video is played, it is played when the focus and the focus gauge are changed.

Figure 25:
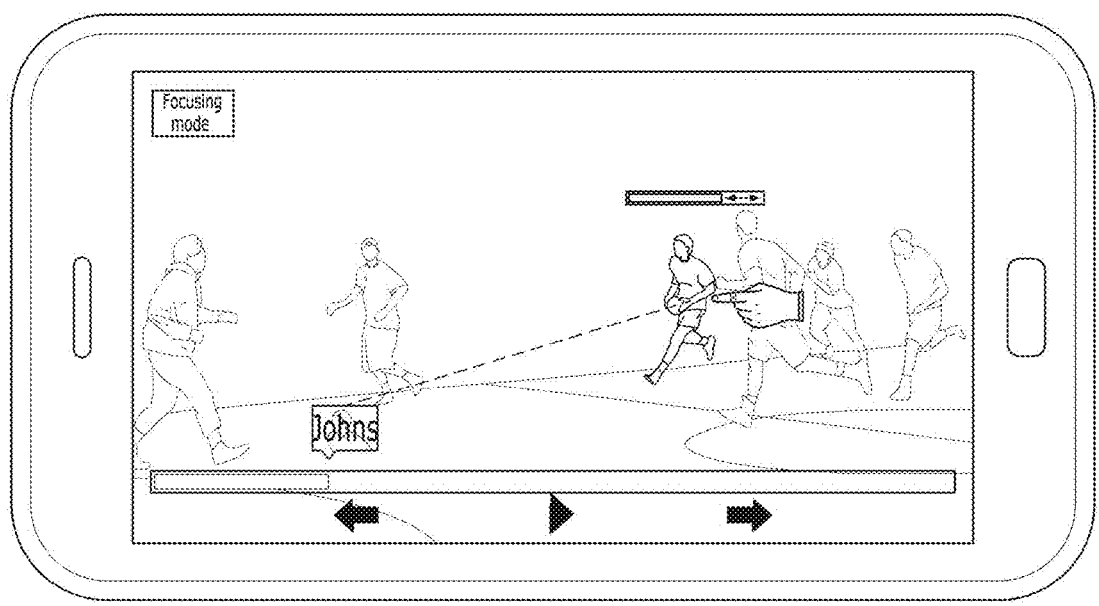

FIG. 25 is a diagram to describe another example of correcting a post-focus video. Like the former example shown in FIG. 23 or FIG. 24, while a video is displayed, if a subject is selected, the controller 180 adjusts a focus and a focus gauge of the selected subject. Moreover, the controller 180 displays an information on the selected subject on a playtime bar. For instance, referring to FIG. 25, the controller 180 detects a face of a selected character from the video, reads information (e.g., a name, a phone number, an address, a photo, etc.) on a matched character by searching an address book in the memory 160, an interworking social network service, a messenger and the like based on the detected face, and then displays the read information on the playtime bar. Hence, it is set to display the detailed information on a currently focused target, i.e., a selected target.

Thereafter, the controller 180 can control the corrected video to be saved in the memory 160 or sent to an external device. When the corrected video is played, it is played when the focus and the focus gauge are changed.

Figure 26:
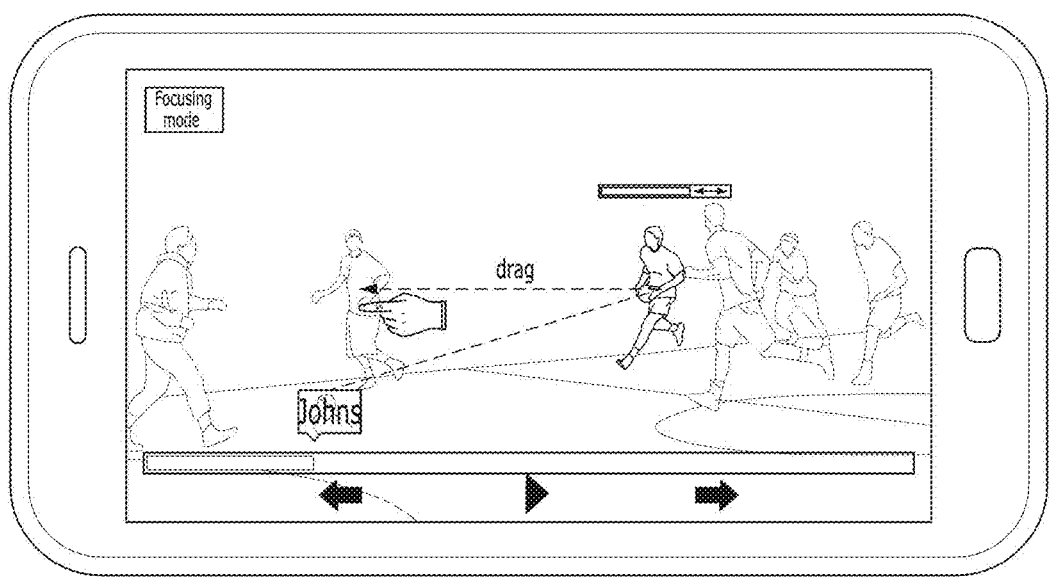

FIG. 26 is a diagram to describe another example of correcting a post-focus video. Referring to FIG. 26, in order to change a focused target in a displayed video, if a user shifts a first touch input (e.g., a drag) to a new target from a previous target and then releases the first touch input, the controller 180 determines whether the new target is a moving body.

If the new target is determined as the moving body, the controller 180 adjusts a focus in each video frame in order to enable the new target to be focused on. Thus, in order to enable the new target to be focused on, the controller 180 clearly represents all regions, which are located in the same focal distance of the new target, using per-pixel distance information in the video or may clearly represent the new target only.

Moreover, the controller 180 adjusts a focus gauge of a new target in accordance with an applied time of the first touch input maintained on the new target. For instance, the longer the applied time becomes, the clearer the focus of the new target gets. Further, the controller 180 can display a focus gauge of the new target on the display unit 151 using a gauge bar and the like. Of course, the controller 180 can additionally adjust the focus gauge of the new target in response to a second touch input (e.g., a touch, a drag, etc.) applied to the new target or the gauge bar after the first touch input.

Moreover, if a new target is a person, the controller 180 can display information (e.g., a name, a phone number, an address, a photo, etc.) on the person. Thereafter, the controller 180 can control the corrected video to be saved in the memory 160 or sent to an external device. When the corrected video is played, it is played when the focus and the focus gauge are changed.

According to the description with reference to FIG. 26, the first touch input includes the drag. Yet, it is also possible to change a focus by touching a new target from a previous target simultaneously instead of applying the drag. Thus, when there are two touch points, the controller 180 determines that the point corresponding to the new target is the target to be in focus rather than the previous target.

Figure 27:
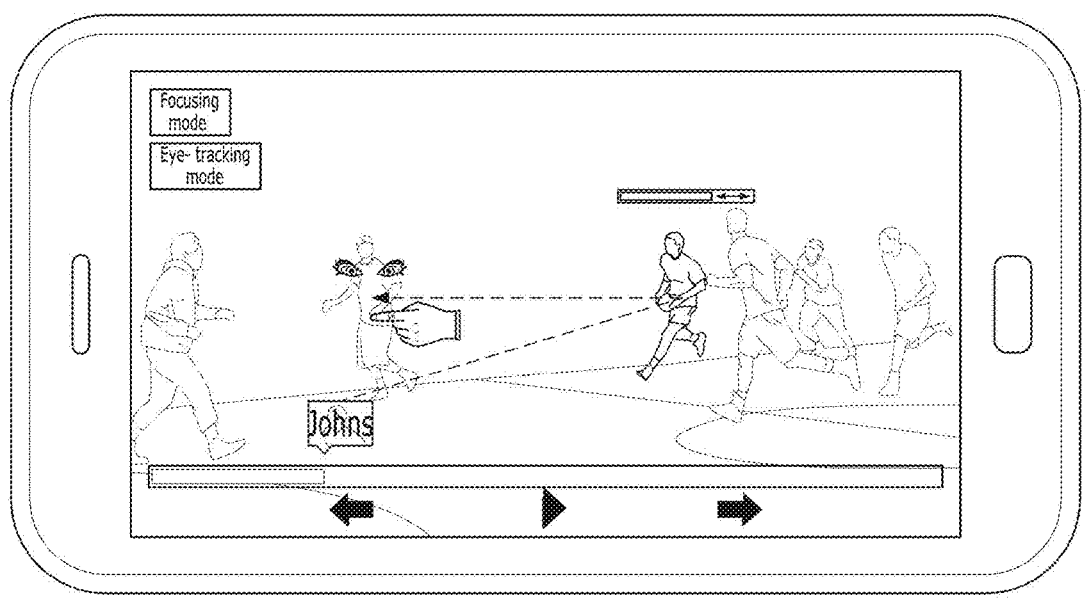

FIG. 27 is a diagram to describe another example of correcting a post-focus video. Referring to FIG. 27, if a focusing mode for adjusting a focus during playback of a video and an eye-tracking mode are selected by a user and the user moves eyes to a new target from a previous target to change a focused target in the displayed video, the controller 180 identifies the new target changed by the user in response to a position/motion of user eyes detected through the camera 121. For instance, the controller 180 determines a position on the display unit 151 watched by the user based on the position of the user eyes and then recognizes a subject at the corresponding position as a new target to focus on.

And, the controller 180 determines whether the new target is a moving body. In order to determine whether the new target is the moving body, the controller 180 compares consecutive video frames to one another. Further, based on a variation of a position or size of the new target in the video frames, the controller 180 can determine whether the new target is the moving body. For instance, if the variation of the new target is greater than a variation of another subject included in the video frames or a variation of a background, the controller 180 recognizes the new target as the moving body.

If the new target is determined as the moving body, the controller 180 adjusts a focus in a video frame at a specific timing point in order to enable the new target to be focused on. Thereafter, the controller 180 corrects the video in order to enable the new target to keep being focused on by tracking new targets in the consecutive video frames. Thus, in order to enable a new target to be focused on, the controller 180 clearly represents all regions, which are located in the same focal distance of the new target, using per-pixel distance information in a video or may clearly represent the new target only.

Moreover, the controller 180 adjusts a focus gauge of a selected subject in accordance with a time for the user watch the new target. For instance, the longer the time for the user to watch the new target becomes, the clearer the focus of the new target gets. Further, the controller 180 can display a focus gauge of the new target on the display unit 151 using a gauge bar and the like. Of course, the controller 180 can additionally adjust the focus gauge of the new target in response to a user's touch input (e.g., a touch, a drag, etc.) applied to the new target or the gauge bar. Moreover, the controller 180 can display information on the new target on the playtime bar. If the new target is a person, the controller 180 can display information (e.g., a name, a phone number, an address, a photo, etc.) on the person.

Once the new target is focused on and the focus gauge is determined, the controller 180 can correct the video in a manner that the focus gauge of the previous target is decreased gradually. Yet, while the user's eyes are moving, the controller 180 does not decrease the focus gauge of the previous target. The reason for this is to prevent a focus from being moved unintentionally when the user moves eyes to another spot temporarily.

Thereafter, the controller 180 can control the corrected video to be saved in the memory 160 or sent to an external device. When the corrected video is played, it is played when the focus and the focus gauge are changed.

FIGS. 28 to 31 are diagrams to describe other examples of correcting a post-focus video. Like the former example shown in FIG. 26 or FIG. 27, while a video is displayed, if a new target to which a focus will be moved is selected, the controller 180 adjusts a focus and a focus gauge of the selected new target. If the new target is focused on and the focus gauge is determined, the controller 180 can correct the video in a manner that a focus gauge of a previous target is decreased gradually.

Figure 28:
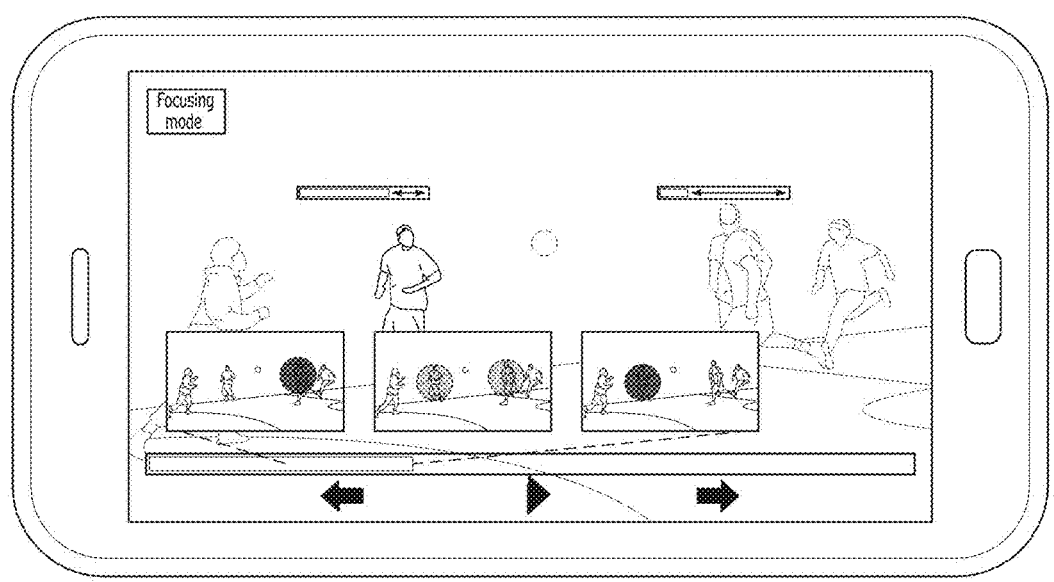

Referring to FIG. 28, the controller 180 can control a timing point of changing a focus and video frames before and after the timing point to be displayed as thumbnails on a playtime bar and can then enlarge the video frame selected by a user's input on a full screen of the display unit 151.

Figure 29:
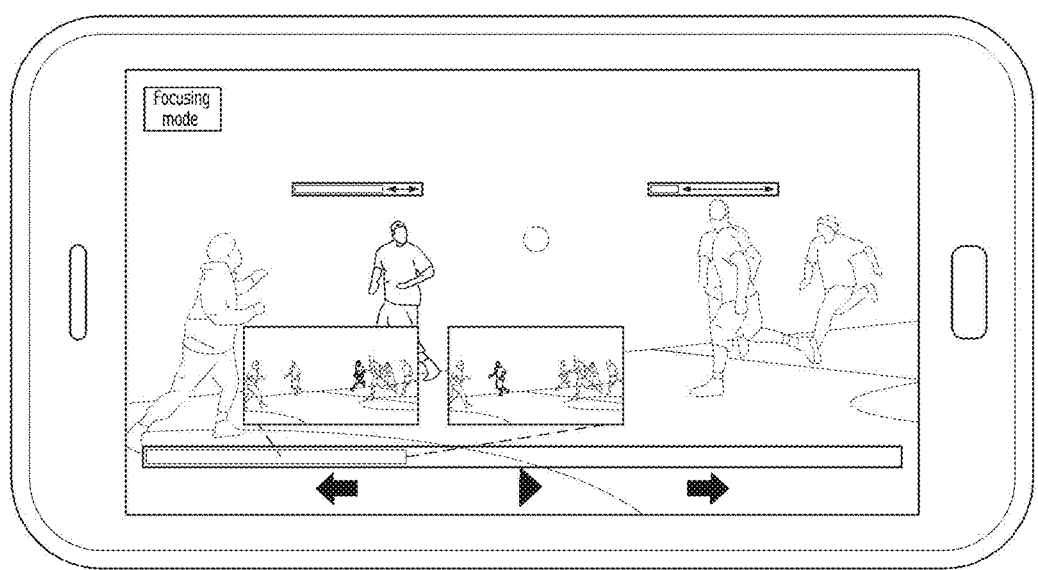
Figure 30:
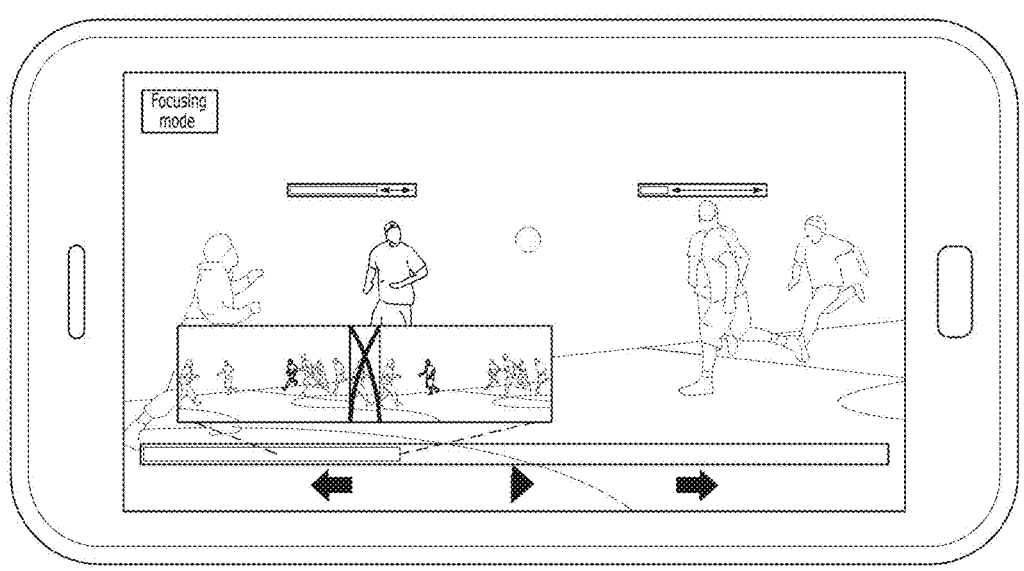
Figure 31:
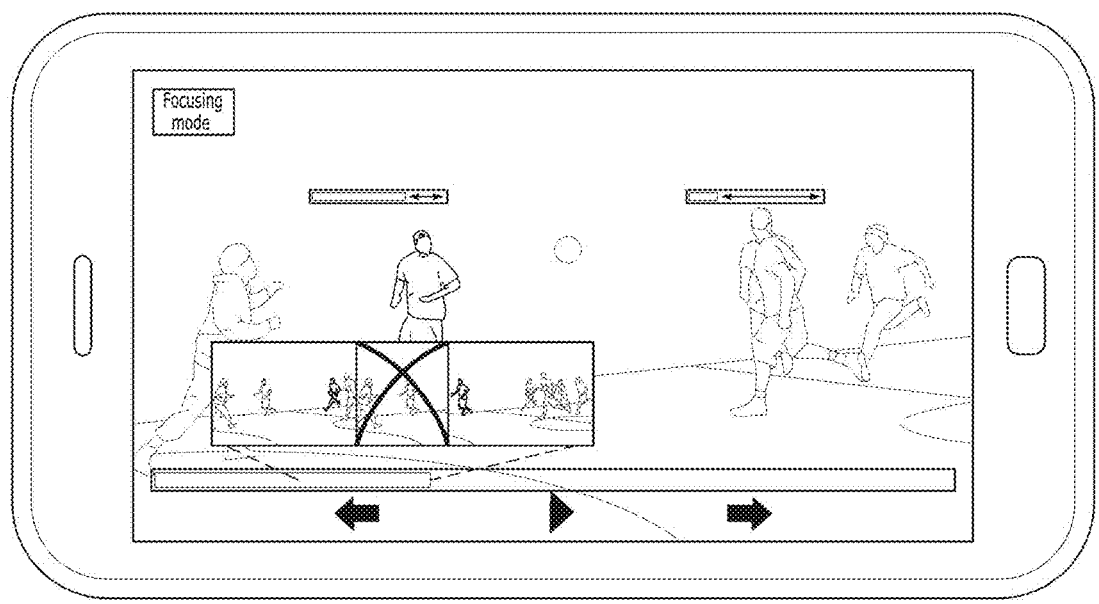

Referring to FIG. 29, the controller 180 displays the video frames before and after the change, i.e., a video frame before changing a focus and a video frame after changing the focus, on the display unit 151 in order and can then adjust or set up a time taken for a focus change in accordance with a distance between the two video frames, which is adjusted by a user's touch input. For instance, referring to FIG. 30, if the distance between the two video frames gets short, the controller 180 adjusts/sets the time taken to move the focus into/to a short time. Further, referring to FIG. 31, if the distance between the two video frames gets long, the controller 180 adjusts/sets the time taken to move the focus into/to a long time. Moreover, a user can adjust/set stiffness and gentleness of a focus variation (i.e., slope) of a previous target and a new target using two curves between the two video frames. In particular, in accordance with a slope of a curve changed by a user's touch input, the controller 180 can adjust/set focus variations of the previous and new targets. Thereafter, the controller 180 can control the corrected video to be saved in the memory 160 or sent to an external device. When the corrected video is played, it is played when the focus and the focus gauge are changed.

Figure 32:
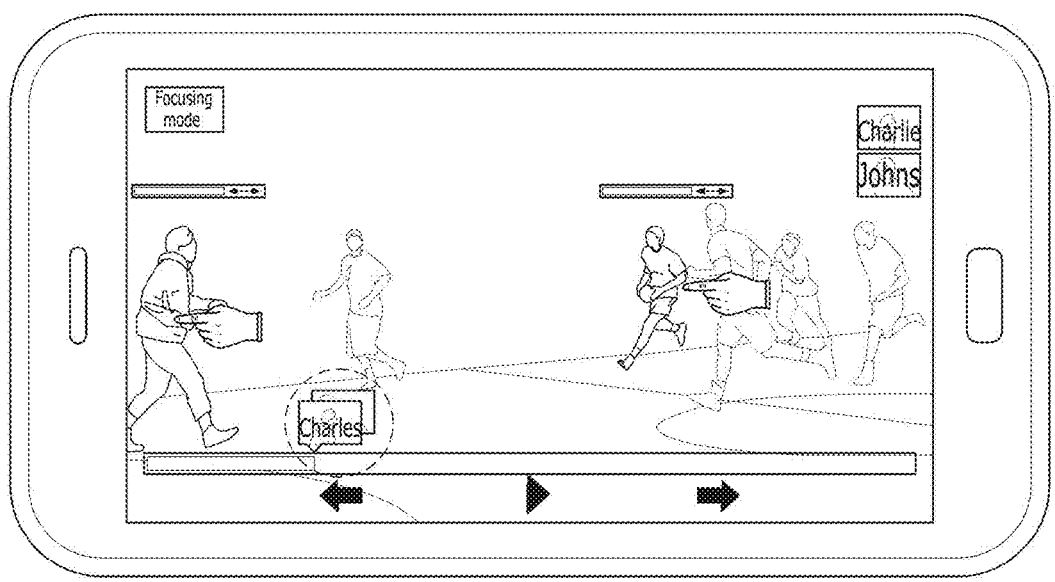

FIG. 32 is a diagram to describe another example of correcting a post-focus video. First of all, the controller 180 plays a post-focus video saved in the memory 160 or a post-focus video received from an external device and displays the played video on the display unit 151. Referring to FIG. 32, if a focusing mode for adjusting a focus during playback of a video is selected by a user and a user's multi-touch input (e.g., a touch) for selecting at least two subjects (e.g., objects, persons, etc.) is applied, the controller 180 determines whether the selected subjects are moving bodies. In order to determine whether the selected subjects are the moving bodies, the controller 180 compares consecutive video frames (e.g., a video frame right before applying the touch input, a video frame at the timing point of applying the touch input, and a video frame right after applying the touch input), to one another. Further, based on a variation of a position or size of each of the subjects selected from the three video frames, the controller 180 can determine whether the selected subjects are the moving bodies, respectively. For instance, if the variation of the selected subject is greater than a variation of another subject included in each of the three video frames or a variation of a background, the controller 180 recognizes the selected subjects as the moving bodies.

If the selected subjects are determined as the moving bodies, the controller 180 adjusts a focus in the video frame after applying the touch input in order to enable the selected subjects to be focused on. Thereafter, the controller 180 corrects the video in order to enable the selected subjects to keep being focused on by tracking subjects selected from the consecutive video frames. Thus, in order to enable the selected subjects to be focused on, the controller 180 clearly represents all regions, which are located in the same focal distance of the selected subjects, using per-pixel distance information in the video or may clearly represent the selected subjects only.

The controller 180 adjusts a focus gauge of each of the selected subjects in accordance with an applied time of the touch input. For instance, the longer the applied time of the touch input becomes, the clearer the focus of each of the selected subjects gets. Further, the controller 180 can display a focus gauge of each of the selected subjects on the display unit 151 using a gauge bar and the like. Of course, the controller 180 can additionally adjust the focus gauge of each of the selected subjects in response to a different touch input (e.g., a touch, a drag, etc.) applied to each of the selected subjects or the corresponding gauge bar.

The controller 180 can control information on each of the selected subjects to be displayed on a playtime bar. For instance, if the selected subject is a person, the controller 180 can display information (e.g., a name, a phone number, an address, a photo, etc.) on the corresponding person. If the number of the selected subjects increases, there are many information displayed on the playtime bar. Further, the controller 180 can sort the information in order in response to a user's touch input.

Before or after adjusting the focus and the focus gauge, a user can group the subjects corresponding to the information touched by a user through a long touch input. The controller 180 can then display a list information of the grouped subjects on a portion (e.g., a right top end) of a screen in response to a user's touch input. This function is useful if the user intends to watch how a single team moves in a sports game of a team unit. Thereafter, the controller 180 can control the corrected video to be saved in the memory 160 or sent to an external device. When the corrected video is played, it is played when the focus and the focus gauge are changed while various information are displayed.

Figure 33:
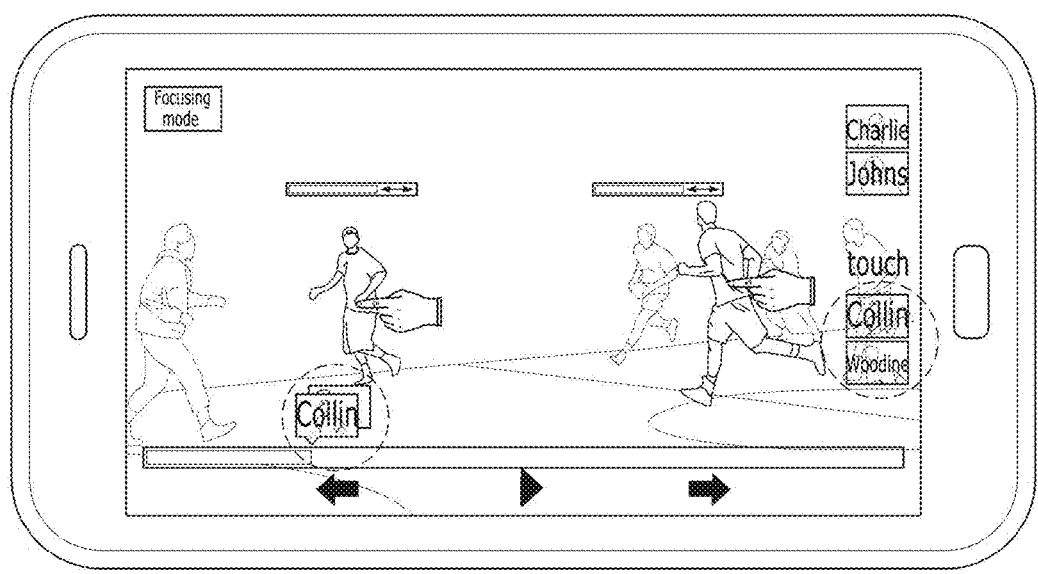

FIG. 33 is a diagram to describe another example of correcting a post-focus video. Like the former example described with reference to FIG. 32, the controller 180 groups the selected subjects before or after adjusting focuses and focus gauges of the selected subjects. Referring to FIG. 33, the controller 180 can additionally group other subjects before or after adjusting focuses and focus gauges of other subjects.

The controller 180 displays list/information of the grouped subjects on a portion of a screen (e.g., a right side of the screen) in response to a user's touch input. Further, if a user selects a prescribed group by a touch input, the controller 180 controls the focuses of the selected group to get clear and also controls the focuses of the rest to be blurred. This function is useful if a user intends to watch a motion of a team unit in a sports game in which two teams compete with each other.

Thereafter, the controller 180 can control the corrected video to be saved in the memory 160 or sent to an external device. When the corrected video is played, it is played when the focus and the focus gauge are changed while various information are displayed.

FIGS. 34 to 37 are diagrams to describe another example of correcting a post-focus video. First of all, the controller 180 plays a post-focus video saved in the memory 160 or a post-focus video received from an external device and displays the played video on the display unit 151.

Figure 34:
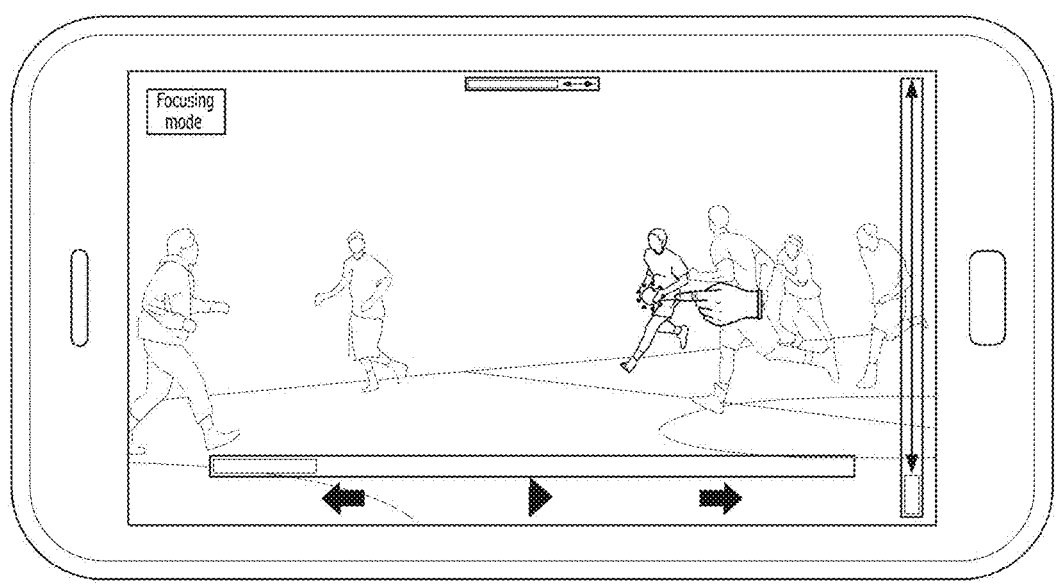

Referring to FIG. 34, if a focusing mode for adjusting a focus during playback of a video and a user's touch input (e.g., a touch) for selecting a subject (e.g., a basketball) as an auto-focus medium is applied, the controller 180 adjusts a focus and a focus gauge of the selected subject (e.g., basketball). Subsequently, the controller 180 determines whether a subject currently contacting the selected subject is a moving body. In order to determine whether the contacting subject is the moving body, the controller 180 compares consecutive video frames to one another. Further, based on a variation of a position or size of a subject selected from the video frames, the controller 180 can determine whether the contacting subject is the moving body. For instance, if the variation of the contacting subject is greater than a variation of another subject included in the consecutive video frames or a variation of a background, the controller 180 recognizes the contacting subject as the moving body.

If the contacting subject is determined as the moving body, the controller 180 corrects the video in a manner that the focus and the focus gauge of the contacting subject match those of the selected subject (i.e., basketball). Thus, in order to enable the selected subject and the contacting subject to be focused on, the controller 180 clearly represents all regions, which are located in the same focal distance of the selected subject and the contacting subject using per-pixel distance information in the video or may clearly represent the selected subject and the contacting subject only.

Figure 35:
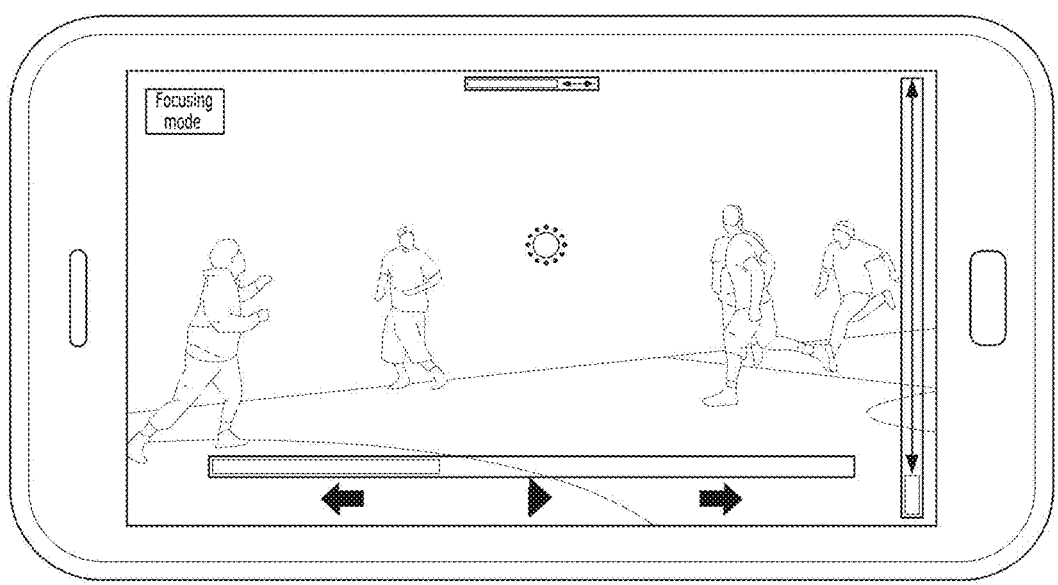

Subsequently, referring to FIG. 35, if the selected subject moves away from the contacting subject, the controller 180 corrects the video by controlling the focus gauge of the contacting subject to get lowered gradually.

Figure 36:
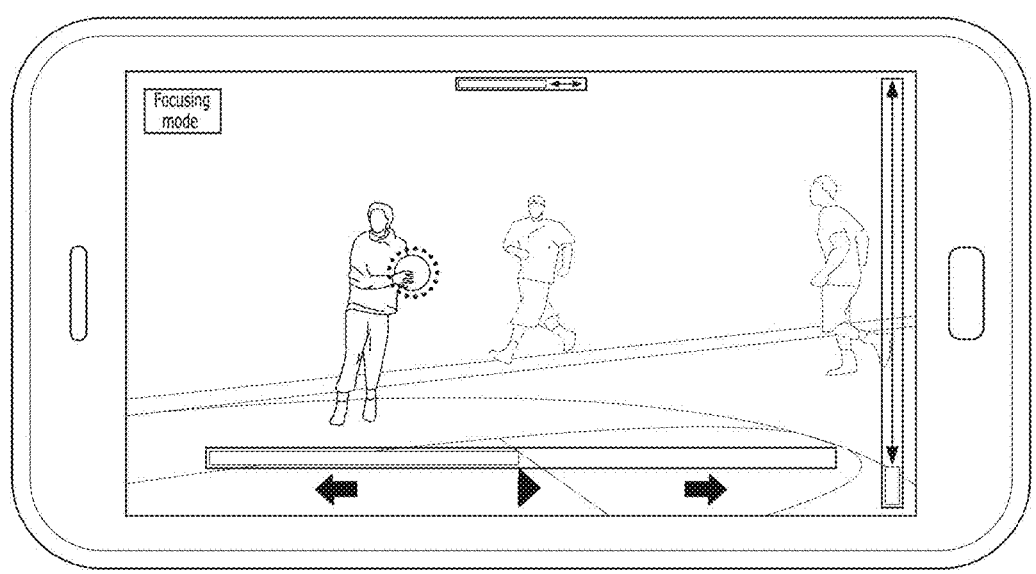
Figure 37:
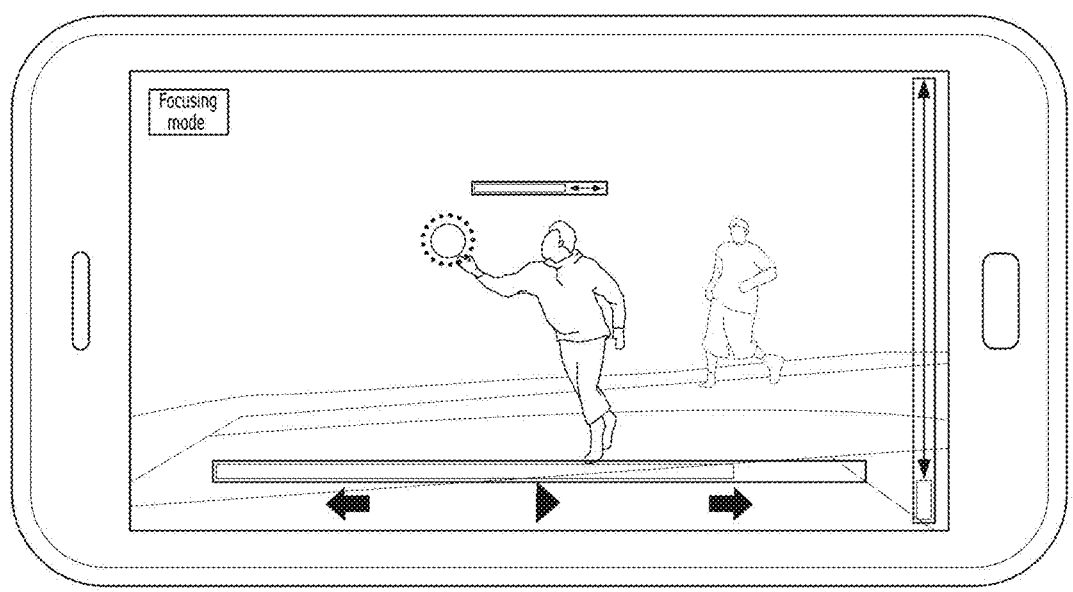

Moreover, the controller 180 predicts a moving path of the selected subject (i.e., the basketball) and can then adjust the focus of the video by focusing on at least one different subject located on the predicted moving path. In order to predict the moving path of the selected subject, the controller 180 determines a right-to-left movement (i.e., a 2-dimensional motion) of the selected subject using the consecutive video frames and can also additionally determine a 3-dimensional motion of the selected subject using a per-pixel distance information (e.g., a camera-to-subject distance information, etc.). Hence, if the selected subject (i.e., the basketball) approaches a new subject, the controller 180 predicts the new subject approached by the selected subject and then increases a focus gauge of the new subject gradually. Referring to FIG. 36 and FIG. 37, if the selected subject contacts the new subject, the controller 180 corrects the video in a manner that the focus and the focus gauge of the new subject match those of the basketball.

Moreover, in response to another touch input (e.g., a touch, a drag, etc.) applied to the new subject or the gauge bar, the controller 180 can also additionally adjust the focus gauge of the selected subject. Thereafter, the controller 180 can control the corrected video to be saved in the memory 160 or sent to an external device. When the corrected video is played, it is played when the focus and the focus gauge are changed.

Figure 38:
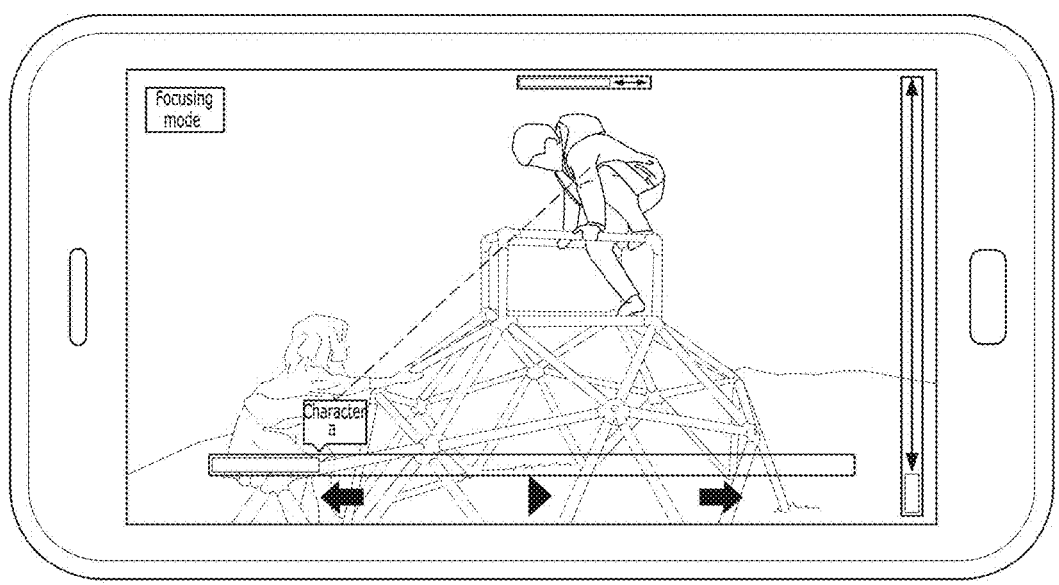
Figure 39:
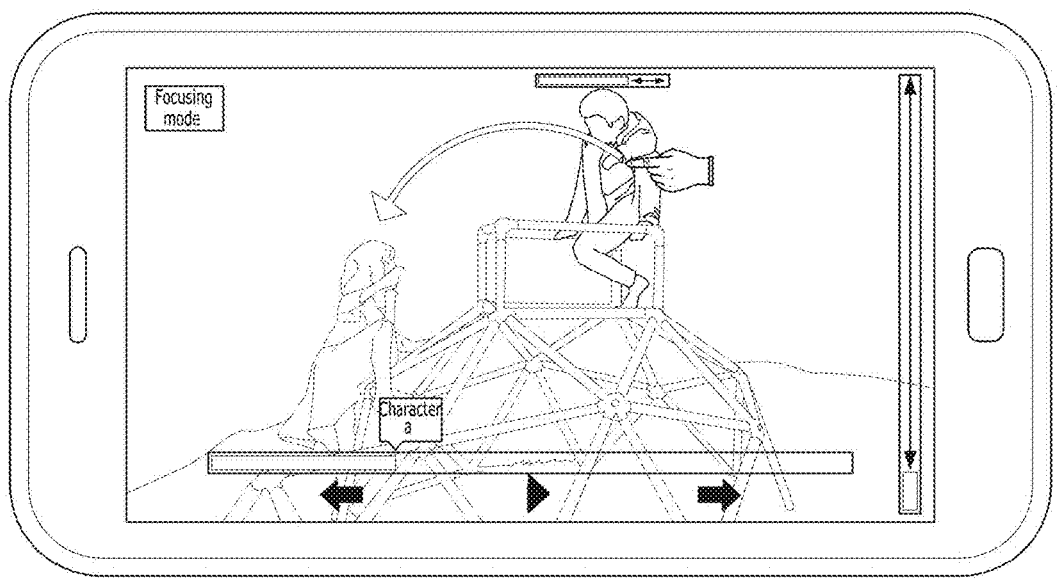
Figure 40:
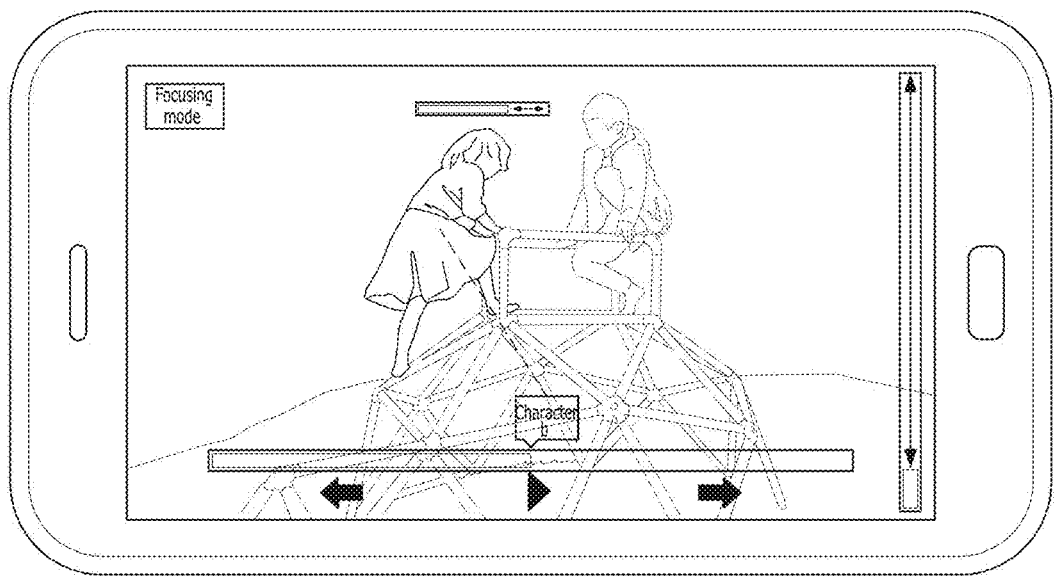

FIGS. 38 to 41 are diagrams to describe another example of correcting a post-focus video. Referring to FIG. 38, the controller 180 can control information on a focused subject in a video to be displayed on a playtime bar. For instance, if the focused subject is a person, the controller 180 recognizes a face included in the video and then determines whether the recognized face exists in the address book saved in the memory 160. If the recognized face exists in the address book, the controller 180 can control information (e.g., a name, a phone number, an address, a photo, etc.) on the corresponding person to be displayed on the playtime bar.

Subsequently, in order to change a focused target in the displayed video, if the user moves the touch input (e.g., a drag) to a new target (Character b) from a previous target (Character a) and then releases the touch input (FIG. 39), the controller 180 adjusts a focus in each video frame to enable the new target (Character b) to be focused on. Thus, in order to enable the new target to be focused on, the controller 180 clearly represents all regions, which are located in the same focal distance of the new target, using per-pixel distance information in the video or may clearly represent the new target only.

The controller 180 can adjust a focus gauge of a new target in accordance with an applied time of the touch input maintained on the new target. For instance, the longer the applied time becomes, the clearer the focus of the new target gets. Further, the controller 180 can display a focus gauge of the new target on the display unit 151 using a gauge bar and the like. Of course, the controller 180 can additionally adjust the focus gauge of the new target in response to a different touch input (e.g., a touch, a drag, etc.) applied to the new target or the gauge bar. Moreover, if a new target is a person, the controller 180 can display information (e.g., a name, a phone number, an address, a photo, etc.) on the person.

Figure 41:
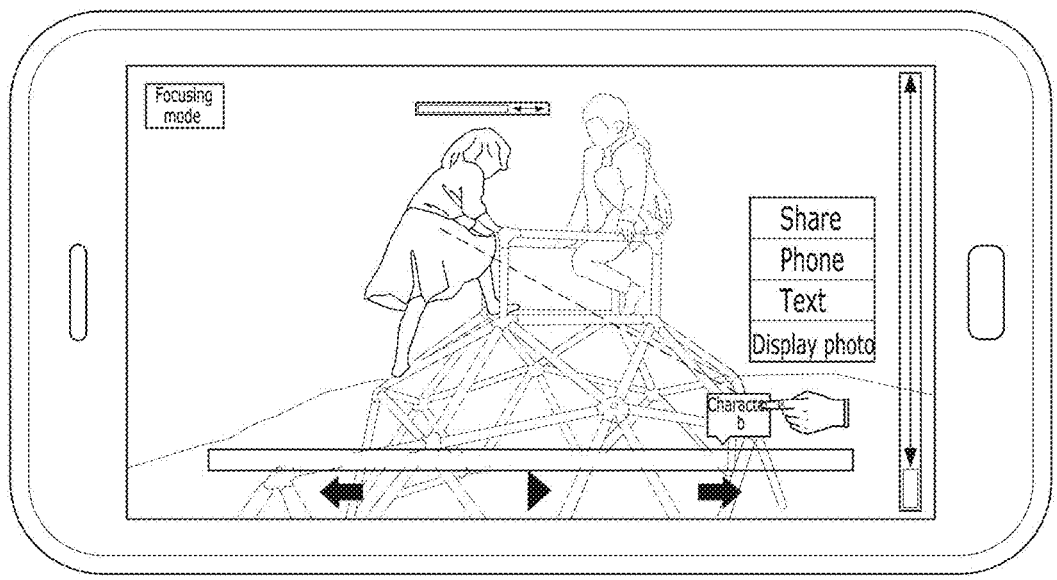

Moreover, referring to FIG. 41, if the user touches the personal information or the face displayed on the playtime bar, the controller 180 displays a menu for sharing the corresponding video on the display unit 151. If the user selects one of options including 'Share', 'Phone', 'Text', 'Photo' and the like, the controller 180 executes a function corresponding to the selected option. And, the controller 180 can share the video with a character in the video through one of Call, SMS (short message service), mobile messenger service and SNS (social networking service). Thereafter, the controller 180 can control the corrected video to be saved in the memory 160 or sent to an external device. When the corrected video is played, it is played when the focus and the focus gauge are changed while information on the new target is displayed.

FIGS. 42 to 45 are diagrams to describe another example of correcting a post-focus video. First of all, the controller 180 can control information on a focused subject (Character a) in a video to be displayed on a playtime bar. For instance, if the focused subject is a person, the controller 180 recognizes a face included in the video and then determines whether the recognized face exists in the address book saved in the memory 160. If the recognized face exists in the address book, the controller 180 can control information (e.g., a name, a phone number, an address, a photo, etc.) on the corresponding person to be displayed on the playtime bar.

Figure 42:
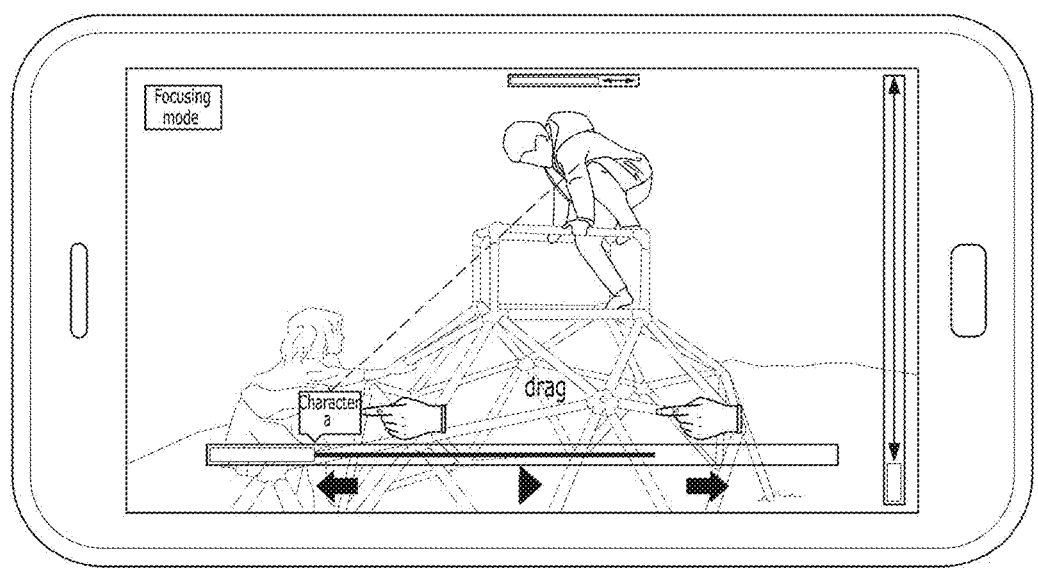
Figure 43:
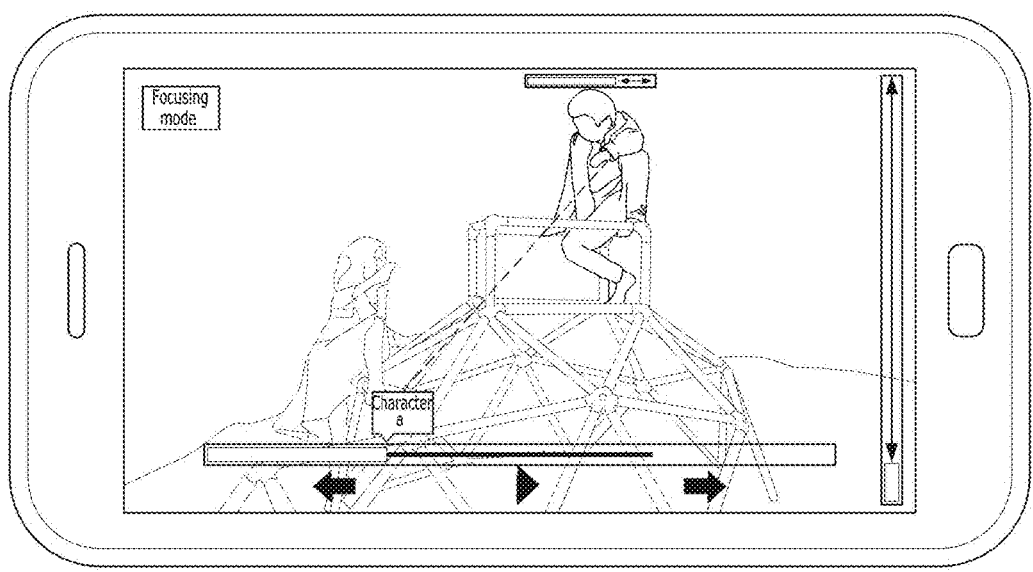

Subsequently, referring to FIG. 42, if a user drags to move the personal information displayed on the playtime bar, the controller 180 sets a focus maintained time for the corresponding subject in order to maintain the focus of the corresponding subject (Character a) up to the location to which the personal information is moved. Subsequently, referring to FIG. 43, the controller 180 controls the focus of the corresponding subject (Character a) to be maintained during the set focus maintained time.

Figure 44:
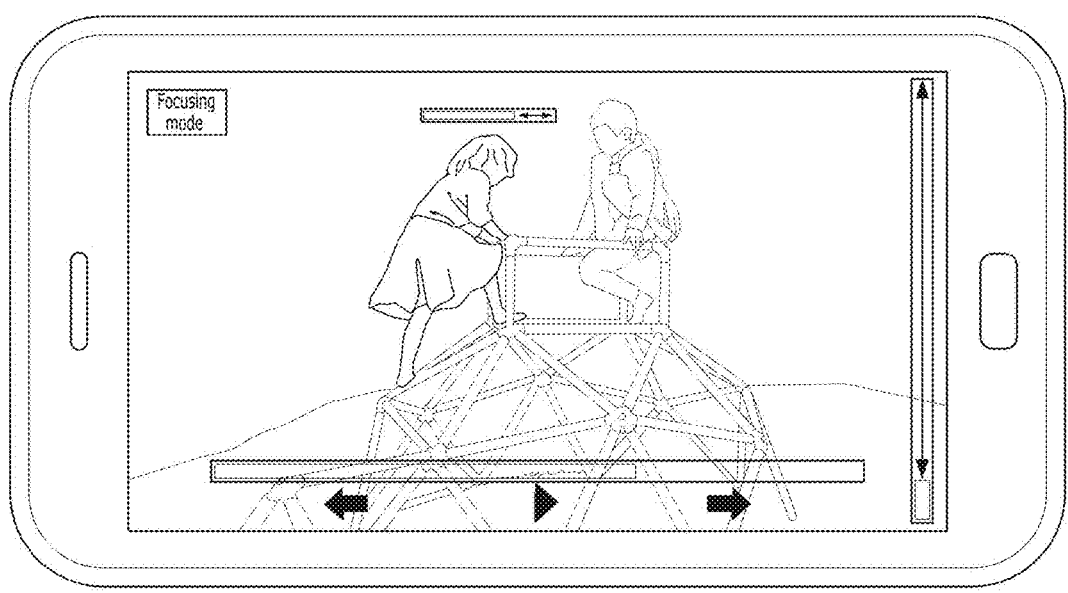
Figure 45:
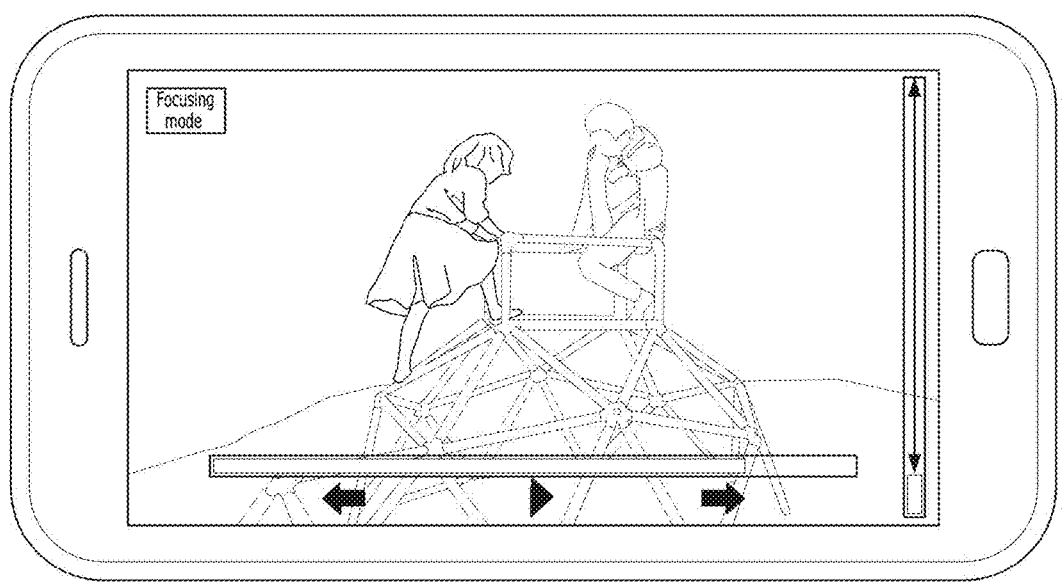

If the set focus maintained time expires, referring to FIG. 44 and FIG. 45, the controller 180 corrects the video in a manner that the focus of the corresponding subject (Character a) is blurred or that a full screen gets clear. Thereafter, the controller 180 can control the corrected video to be saved in the memory 160 or sent to an external device. When the corrected video is played, it is played when the focus and the focus gauge are changed.

Figure 46:
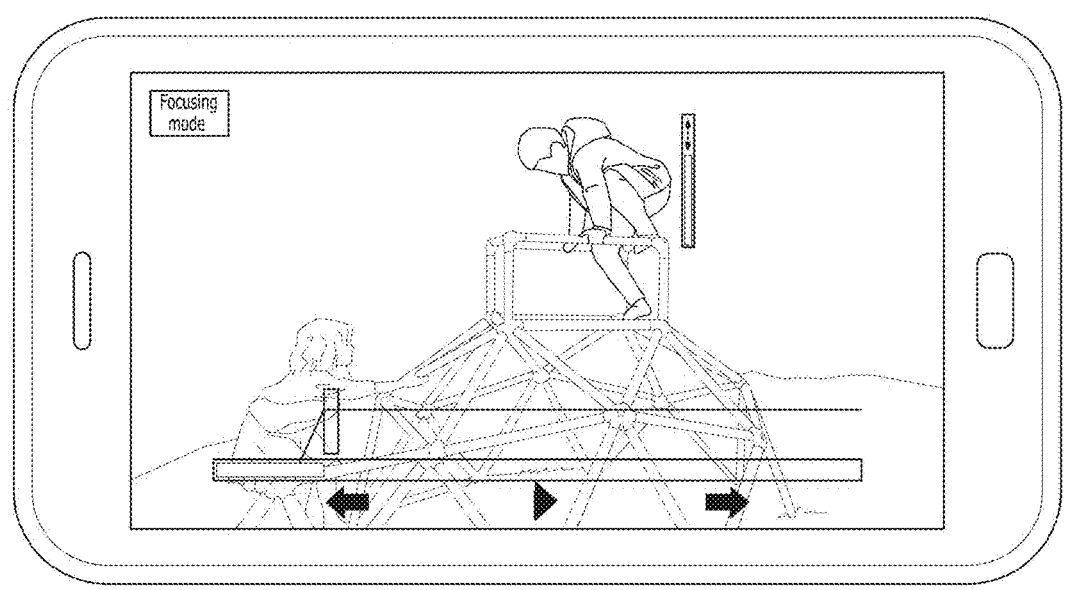

FIGS. 46 to 53 are diagrams to describe another example of correcting a post-focus video. Referring to FIG. 46, if a subject (Character a) selected form a video is focused on, the controller 180 displays a graph, which indicates a focus gauge/clarity of the selected subject (Character a), on a playtime bar. Moreover, the controller 180 can additionally display a gauge bar, which indicates the focus gauge/clarity of the selected subject (Character a), and the like around the selected subject.

Figure 47:
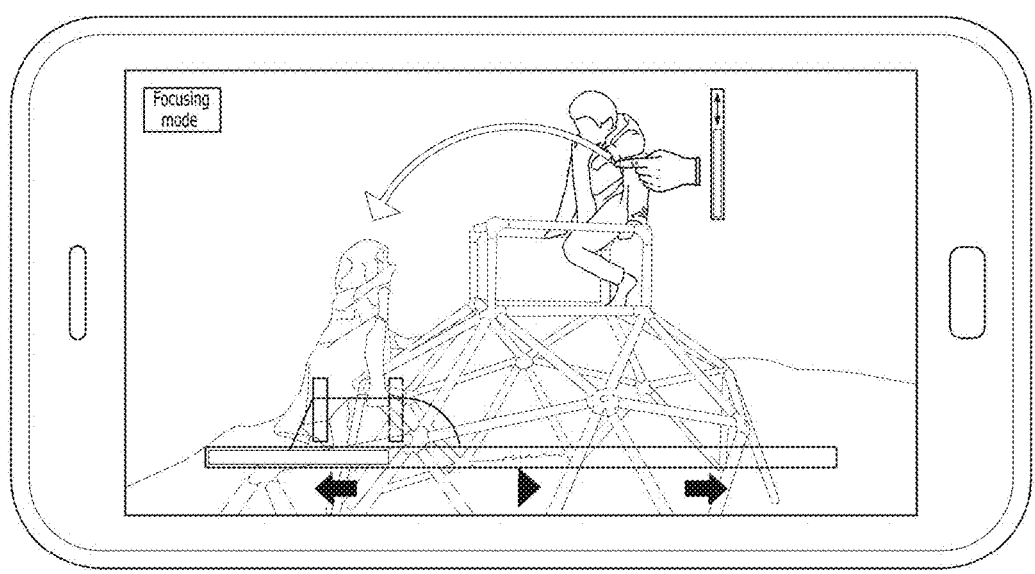

Subsequently, referring to FIG. 47, in order to change a focused target in the displayed video, if the user moves the touch input (e.g., a drag) to a new target (Character b) from a previous target (Character a) and then releases the touch input, the controller 180 additionally displays a graph, which indicates a focus gauge/clarity of the new target (Character b), on the playtime bar.

Figure 48:
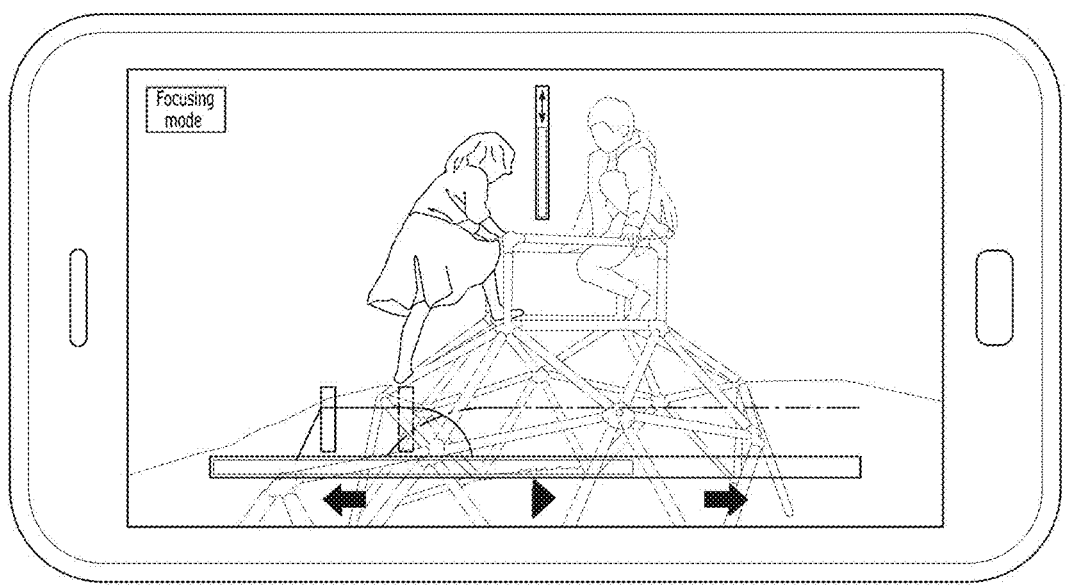

Referring to FIG. 48, the controller 180 adjusts a focus in each video frame to enable the new target (Character b) to be focused on. Thus, in order to enable the new target (Character b) to be focused on, the controller 180 clearly represents all regions, which are located in the same focal distance of the new target (Character b), using per-pixel distance information in the video or may clearly represent the new target (Character b) only.

Moreover, the controller 180 can adjust a focus gauge of the new target (Character b) in accordance with an applied time of the touch input maintained on the new target (Character b). For instance, the longer the applied time becomes, the clearer the focus of the new target (Character b) gets. Further, the controller 180 can display a focus gauge of the new target (Character b) on the display unit 151 using a gauge bar and the like. Of course, the controller 180 can additionally adjust the focus gauge of the new target (Character b) in response to a different touch input (e.g., a touch, a drag, etc.) applied to the new target (Character b) or the gauge bar.

Figure 49:
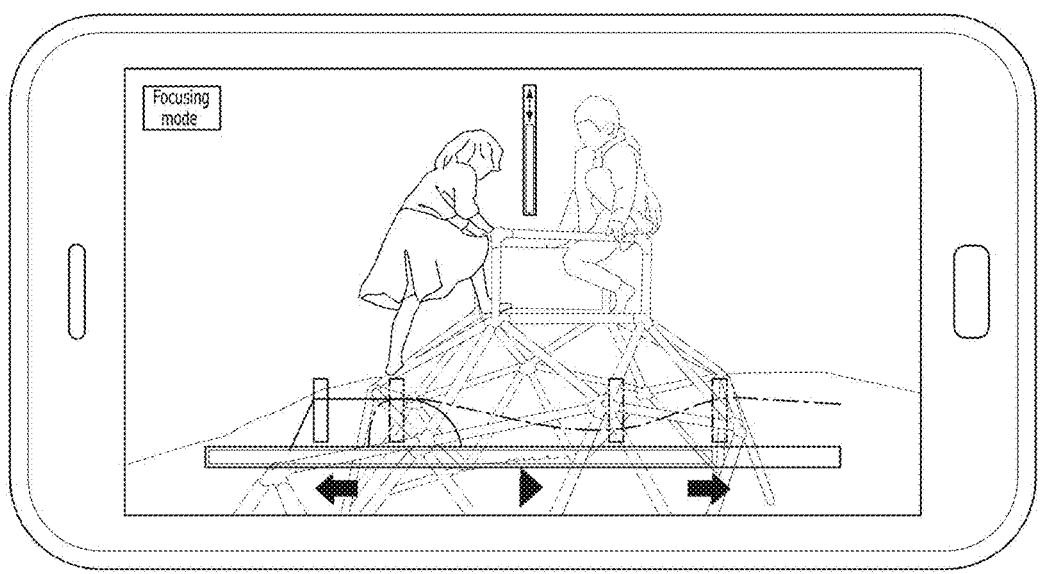
Figure 50:
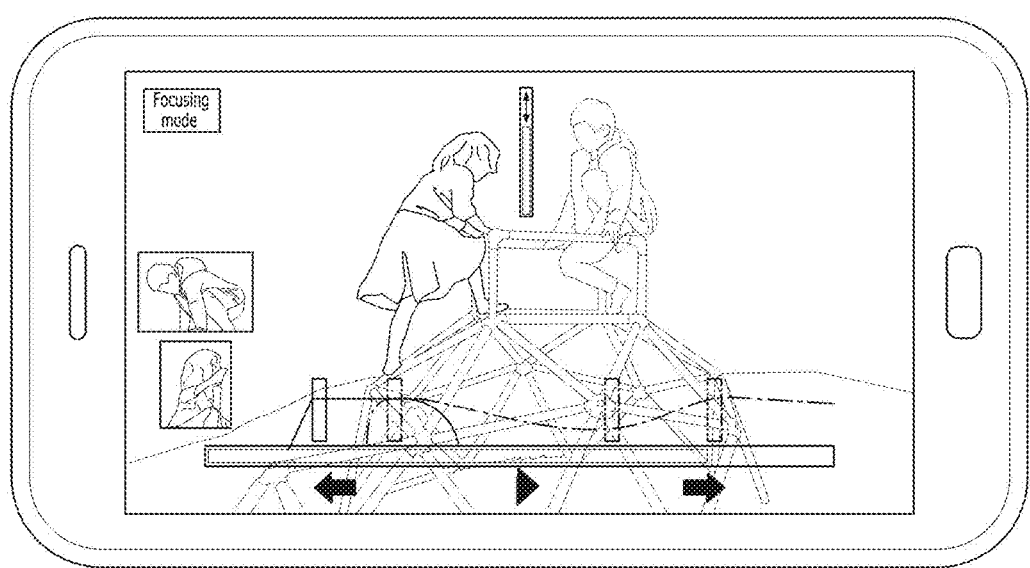
Figure 51:
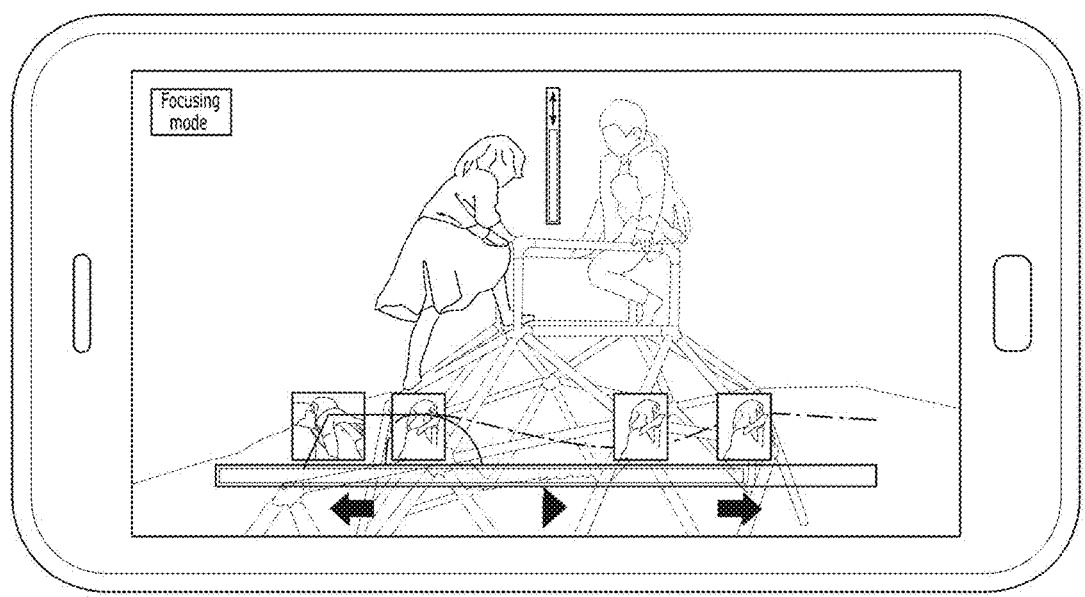
Figure 52:
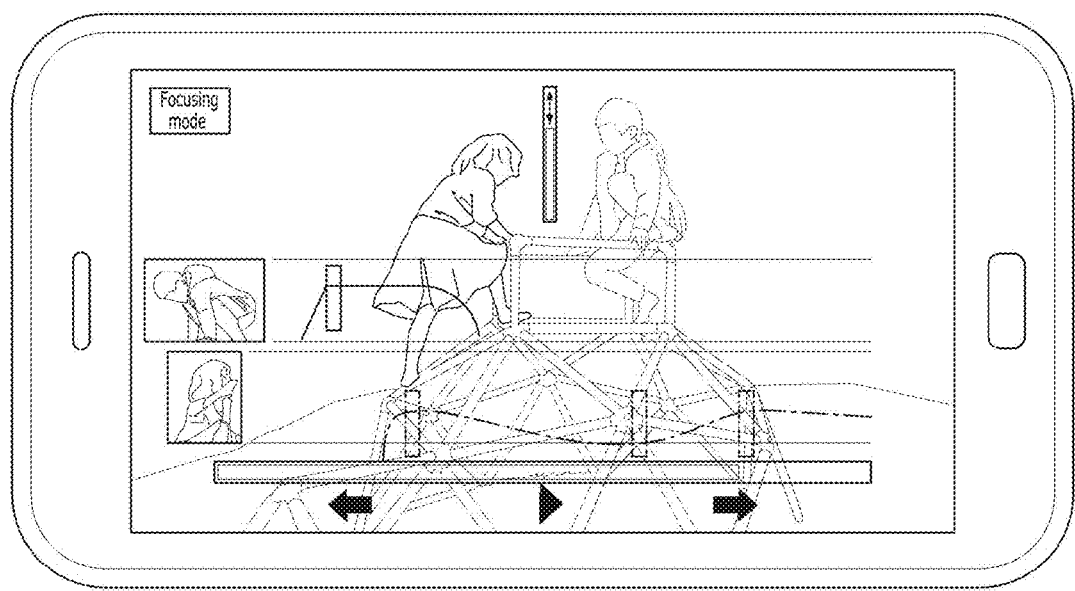
Figure 53:
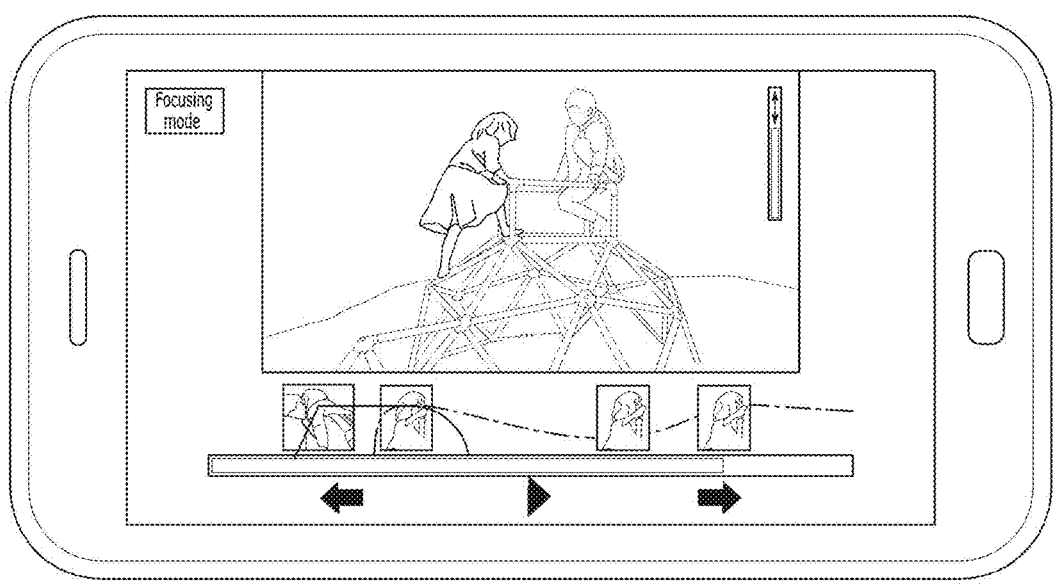

Referring to FIG. 49, if a user changes the graph indicating the focus gauge/clarity of the new target (Character b), the controller 180 can change the focus gauge/clarity of the new target. Moreover, referring to FIG. 50, the controller 180 can control information on the new target to be displayed on the playtime bar. For instance, if the new target is a person, the controller 180 can display information (e.g., a name, a phone number, an address, a photo, etc.) on the person. Particularly, referring to FIG. 51 and FIG. 53, the controller 180 can display a photo of each subject on the playtime bar. Through this, it can check what kind of a subject is focused on in the currently played video. Moreover, referring to FIG. 52, the controller 180 can display the graph indicating the focus gauge/clarity together with a photo of each subject.

If focuses are changed in a video many times, the controller 180 can set the screen, on which a target designated to be in focus appears only, to be played by skipping a screen, from which a target designated to be in focus disappears, or a screen during a time for a focus to move to another target. Thereafter, the controller 180 can control the corrected video to be saved in the memory 160 or sent to an external device. When the corrected video is played, it is played when the focus and the focus gauge are changed while the information on the new target is displayed.

Figure 54:
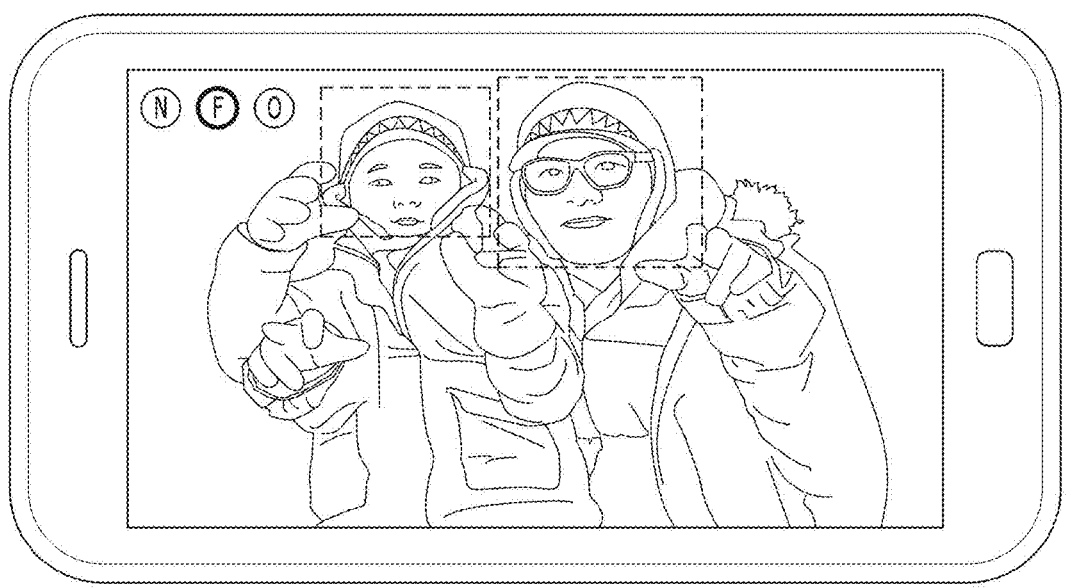
FIGS. 54 to 96 are diagrams to describe operations of a mobile terminal in association with a photos or videos according to an embodiment of the present invention.

FIGS. 54 to 57 are diagrams to describe one example of an operation of the mobile terminal 100 in association with an image/video. Referring to FIG. 54, if one of a normal mode, a face tracking mode and an object tracking mode is selected, the controller 180 can display a user-desired image among images saved in the memory 160 on the display unit 151 in accordance with the selected mode. For instance, if the face tracking mode is selected, the controller 180 displays face-tracking available faces in a specific photo or video within a gallery. If the user selects a desired face from the specific photo or video through a touch input (e.g., a long touch), the controller 180 searches the memory 160 for videos containing the selected face.

Figure 55:
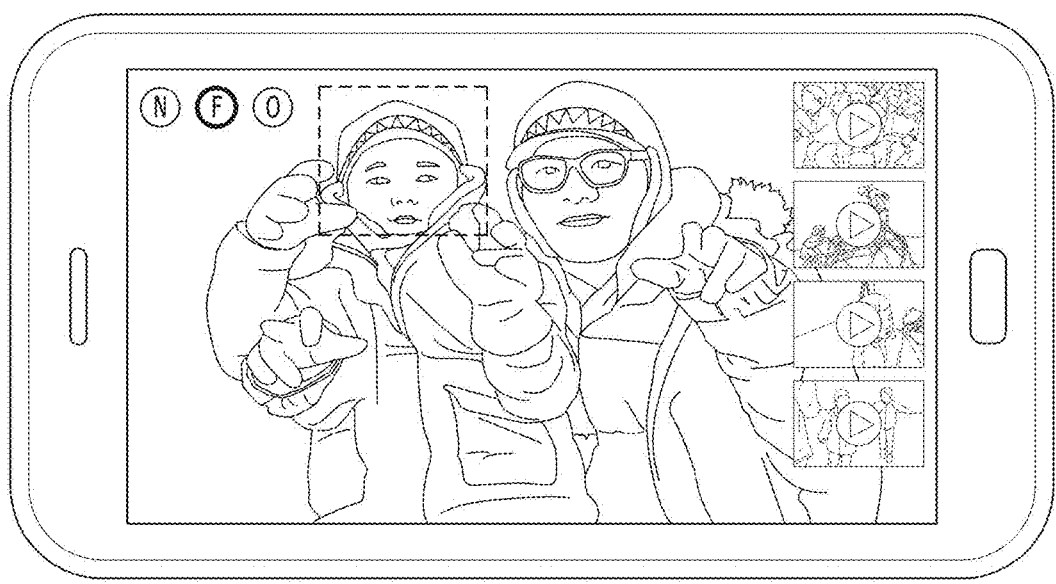
Figure 56:
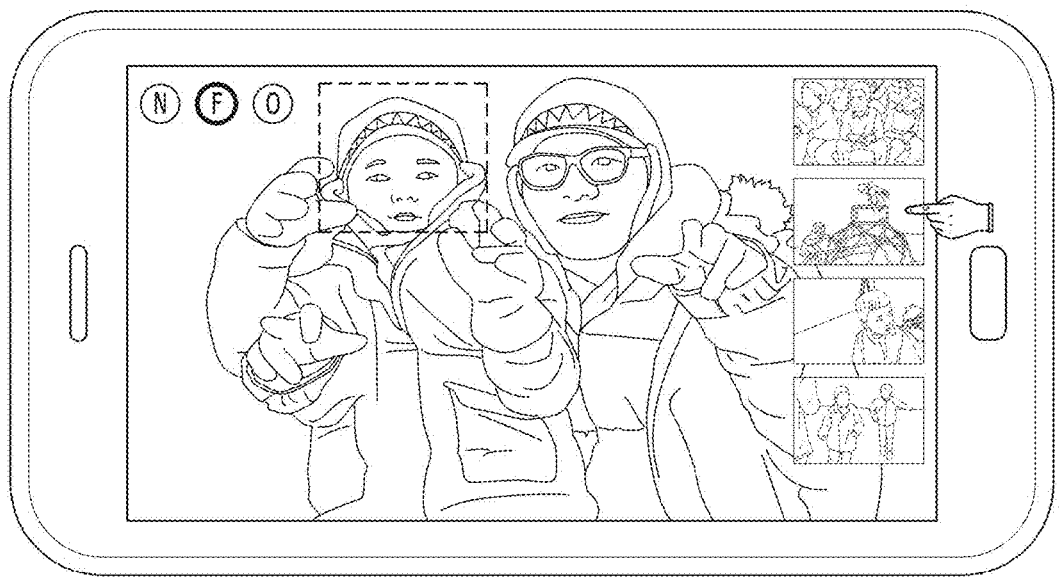
Figure 57:
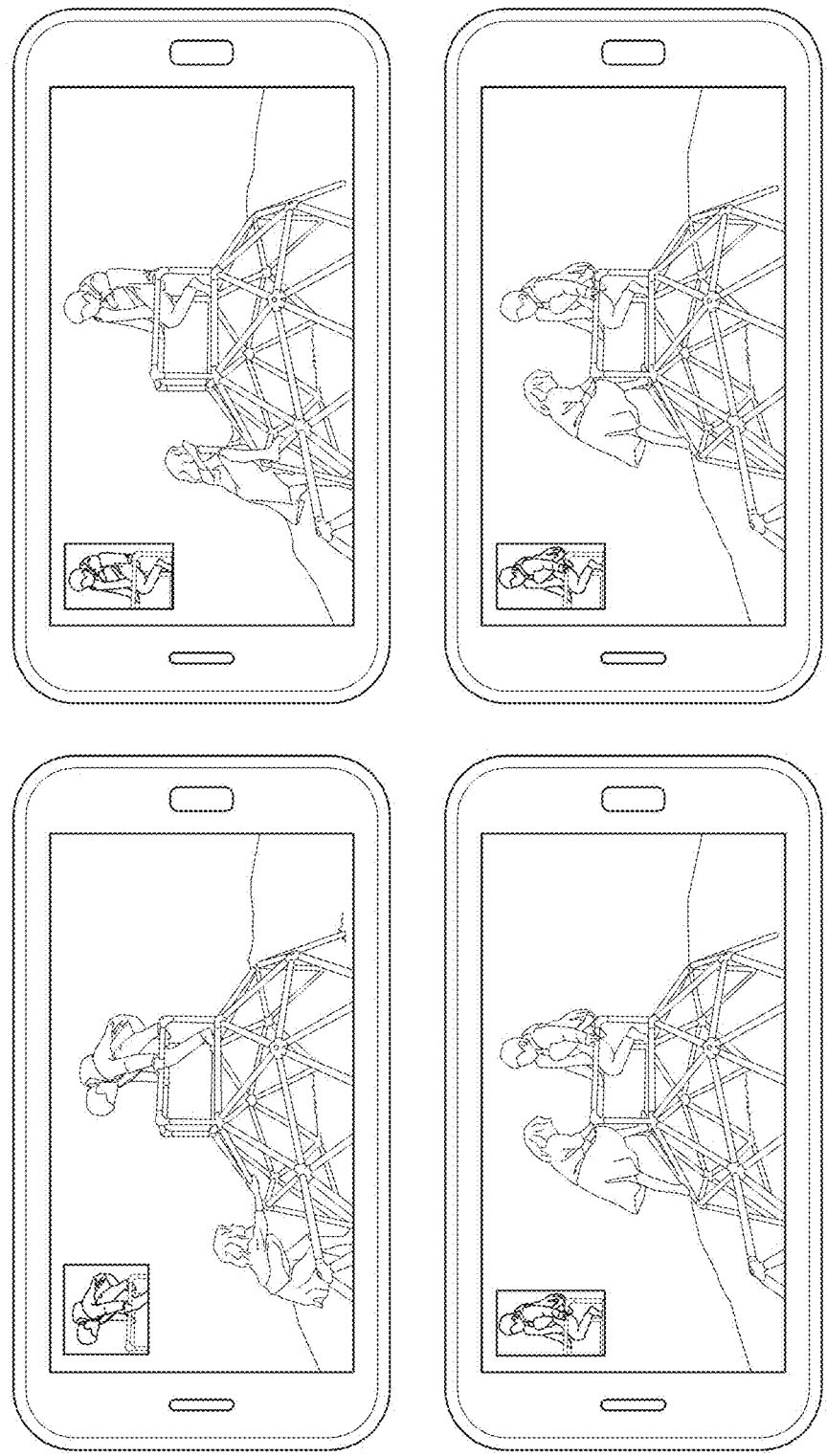

Subsequently, referring to FIG. 55, the controller 180 displays the found videos on the display unit 151. Further, the displayed videos can be sorted in order of video recorded date or frequency/time of appearance of the selected face. Subsequently, referring to FIG. 56, if the user selects a prescribed video from the found videos, a tracking zoom function is executed and the selected video is played. In this instance, the tracking zoom function means that a target selected from a video is enlarged or displayed through a separate window by being continuously tracked. FIG. 57 shows one example of the tracking zoom for displaying a selected target through a separate window.

Figure 58:
Figure 59:
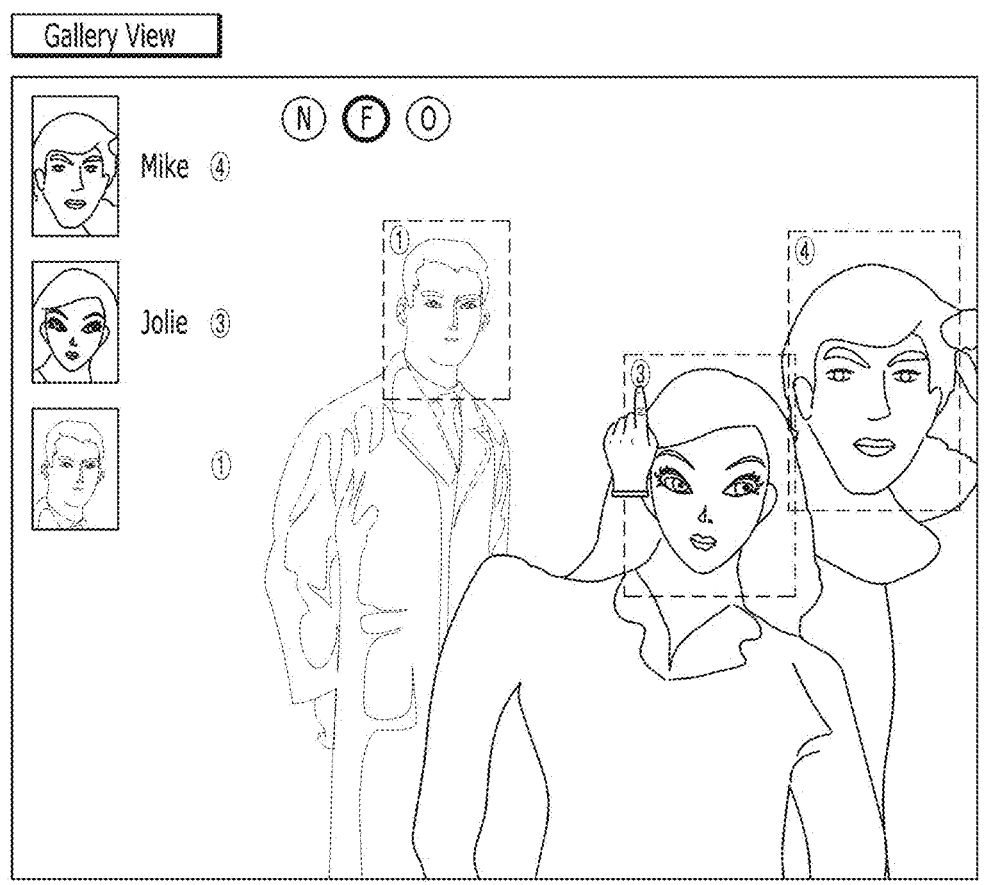
Figure 60:

FIGS. 58 to 60 are diagrams to describe other examples of an operation of the mobile terminal 100 in association with an image/video. Referring to FIG. 58, if a face tracking mode is selected, the controller 180 displays faces available for face tracking in a specific photo included in a gallery and then searches the memory 160 for videos in which the faces appear, respectively. And, the controller 180 displays the number of the videos, in which each face appears, around the corresponding face.

Referring to FIG. 59, the controller 180 can additionally display thumbnails of faces and the number of videos of each of the faces on one side (e.g., a left edge) of the display unit 151. Further, the controller 180 can sort the thumbnails in accordance with the number of the videos per face. For instance, the thumbnail of the character 'Mike' appearing most frequently appearing in the videos is displayed on the top. If a user selects a specific character 'Jolie', referring to FIG. 60, the controller 180 displays a list of the videos having the selected character 'Jolie' appear therein on the display unit 151.

Figure 61:
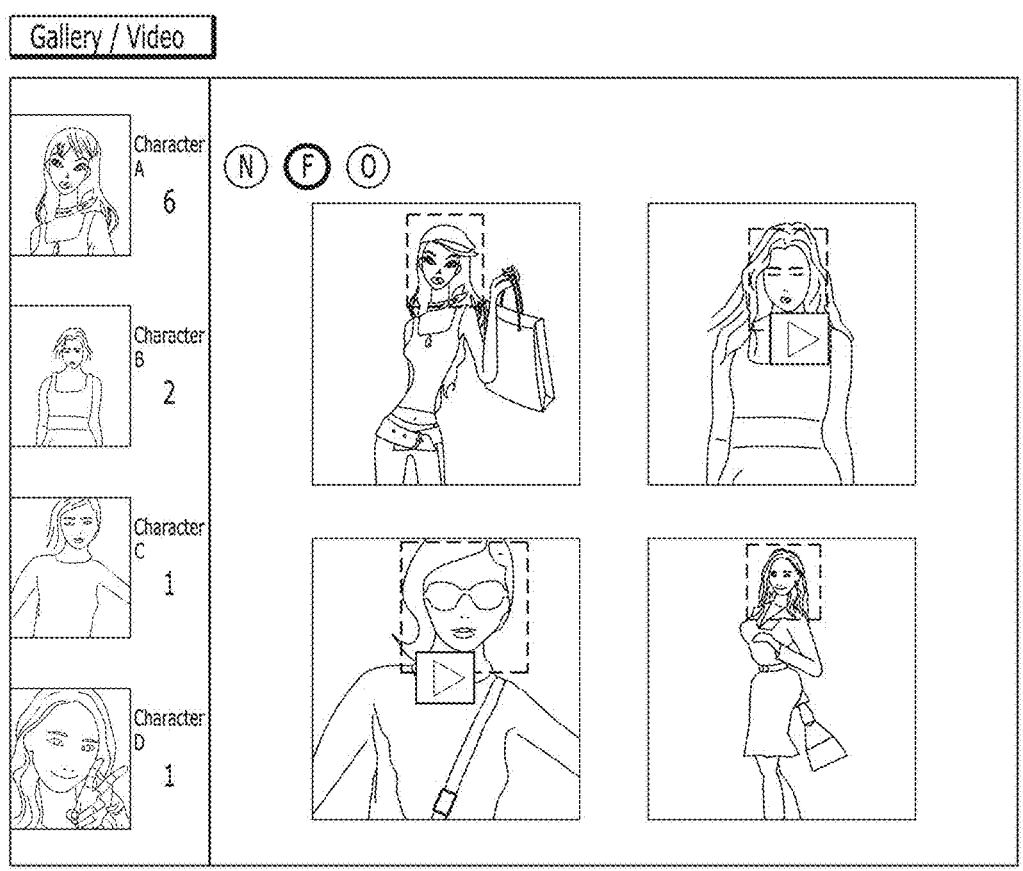

FIG. 61 is a diagram to describe other examples of an operation of the mobile terminal 100 in association with an image/video. Referring to FIG. 61, the controller 180 displays a multitude of images and videos per same folder, same date or same time slot within a gallery on the display unit 151.

Subsequently, if a face tracking mode is selected, the controller 180 displays faces available for face tracking in the images and videos included in a specific folder and can also display a thumbnail, personal information, and the number of images and videos, in which a corresponding face appears, of each of the faces on one side of the display unit 151. In this instance, the numeral around each of the thumbnails indicates the number of images and videos in which the corresponding character is included. If a user selects a specific character, the controller 180 can display a list of images and videos, in which the selected character 'Jolie' appears, on the display unit 151.

Figure 62:
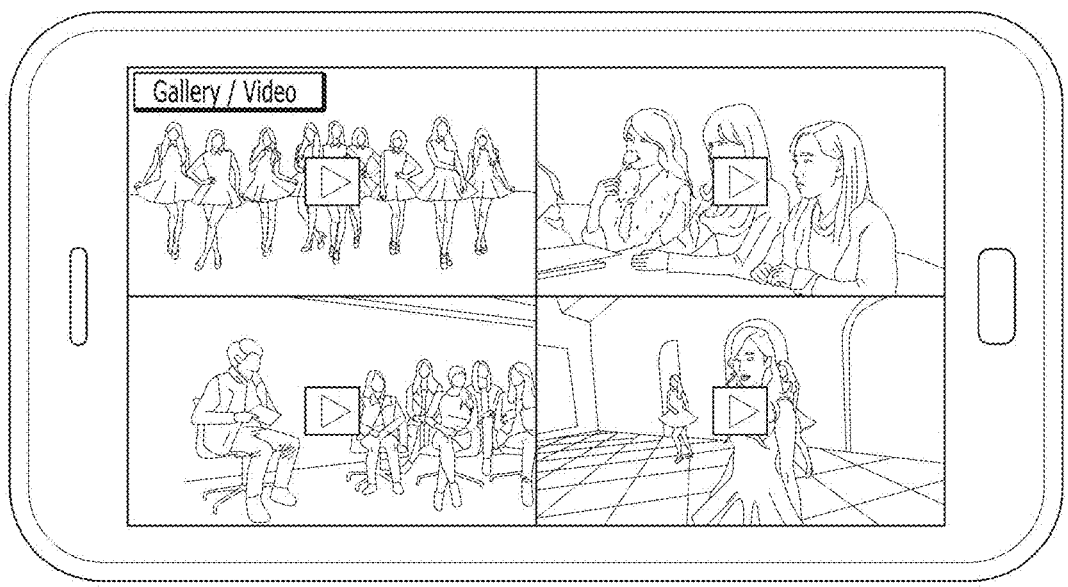

FIGS. 62 to 67 are diagrams to describe other examples of an operation of the mobile terminal 100 in association with a video. Referring to FIG. 62, if a list of videos included in a gallery is displayed on the display unit 151, a user can select one of the videos from the list through a touch input (e.g., a long touch).

Figure 63:
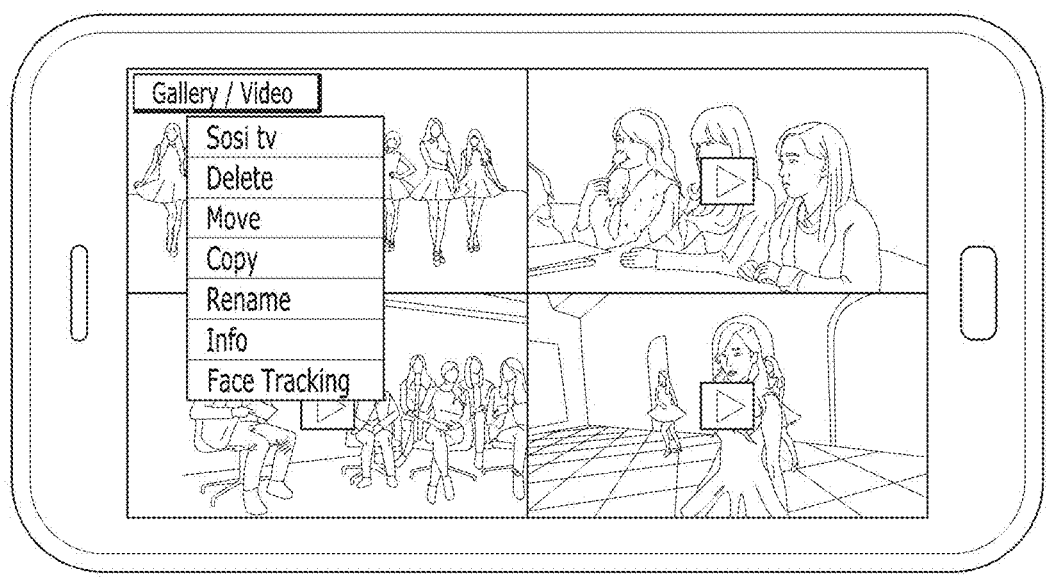
Figure 64:
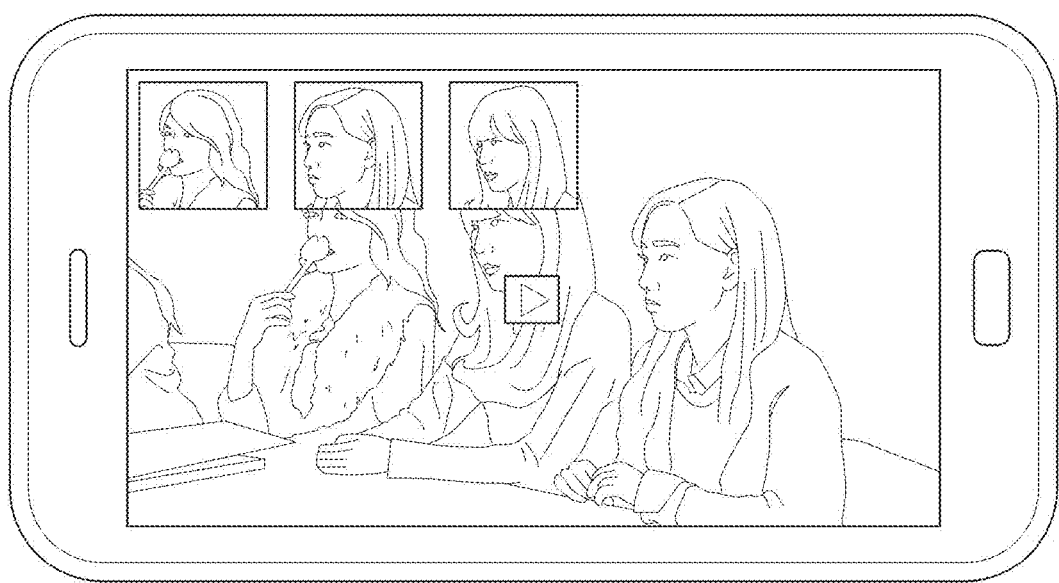
Figure 65:
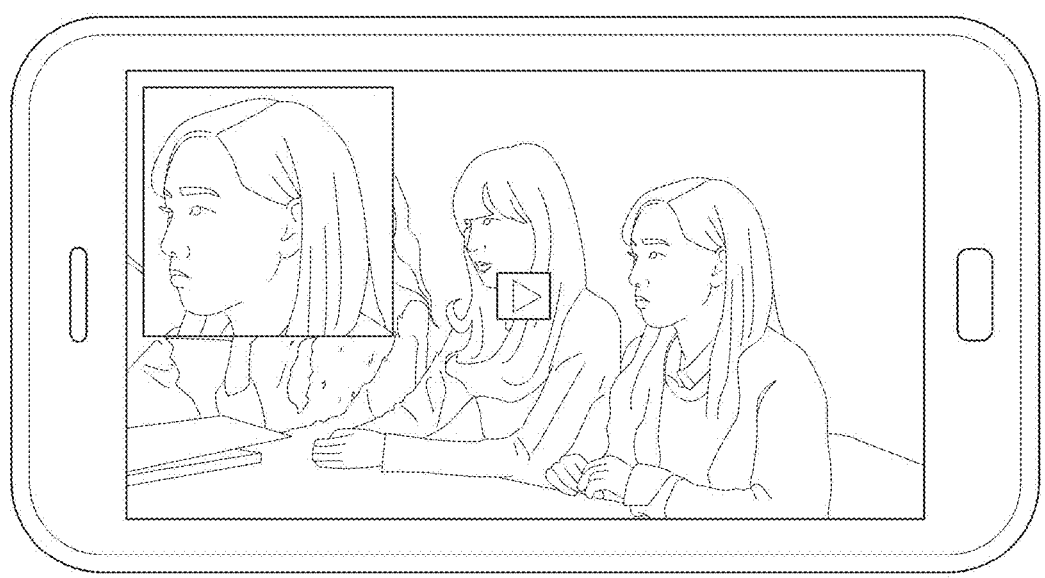
Figure 66:
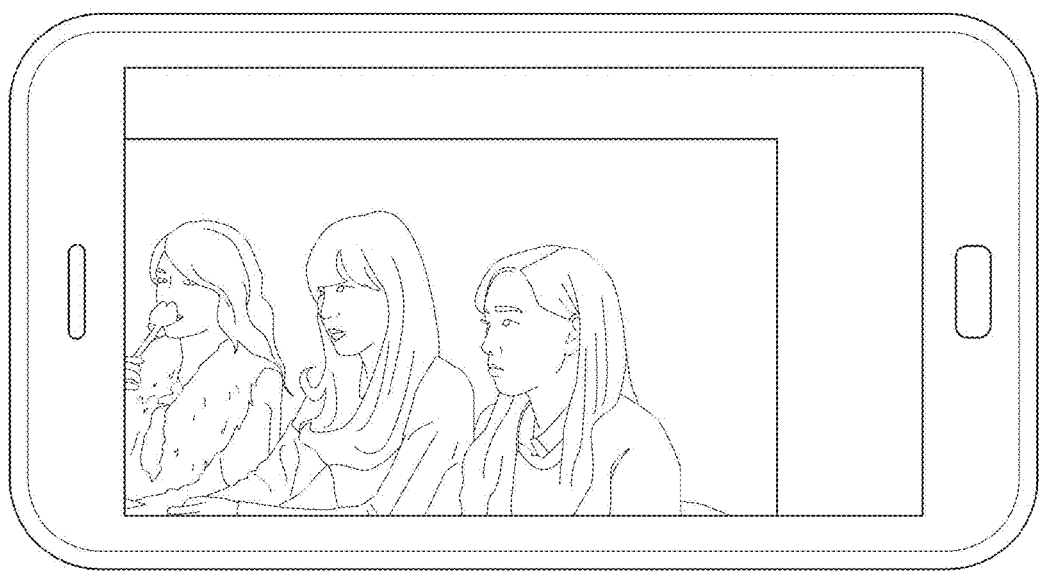
Figure 67:
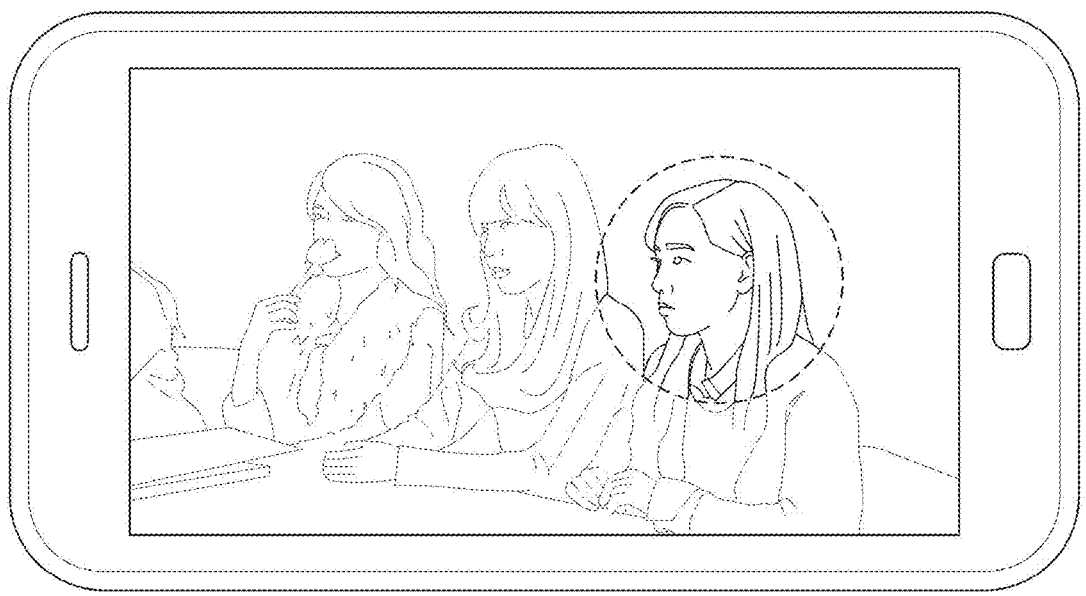

Referring to FIG. 63, if a face tracking mode is selected, the controller 180 displays faces available for face tracking in the gallery. Referring to FIG. 64, if a specific face is selected, the controller 180 can play the corresponding video while tracking the selected specific face. FIGS. 65 to 74 show examples of playing a video. In particular, FIG. 65 shows a case that the video is played together with a tracking zoom function. FIG. 66 shows a case that the video is played in a manner that the selected specific face is displayed at the center of the display unit 151. And, FIG. 67 shows a case that the video is played in a manner that the selected specific face is in focus.

Figure 68:
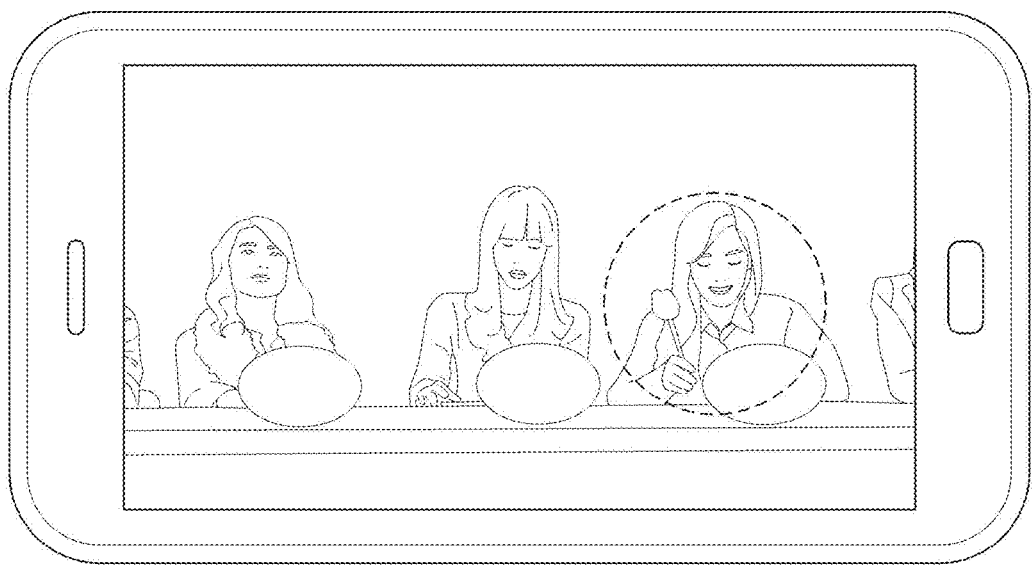
Figure 69:
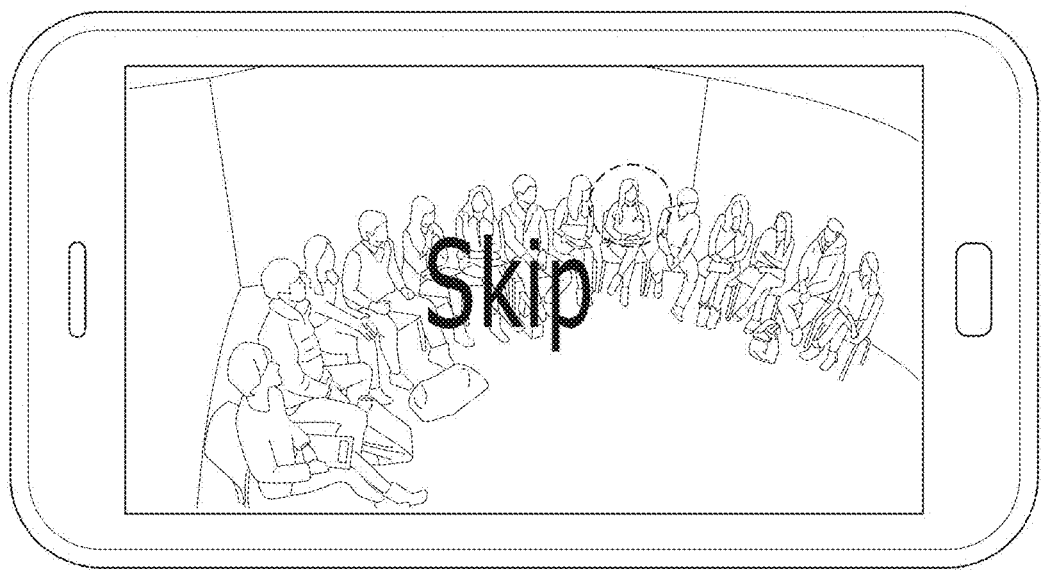

Referring to FIG. 68, the controller 180 selectively plays only the video sections in which a size or rate of the selected specific face is equal to or greater than a predetermined size (e.g., a preset reference value) on a screen only. Further, referring to FIG. 69, the controller 180 selectively does not play but skips the video sections in which a size or rate of the selected specific face is smaller than a predetermined size (e.g., a preset reference value).

Figure 70:
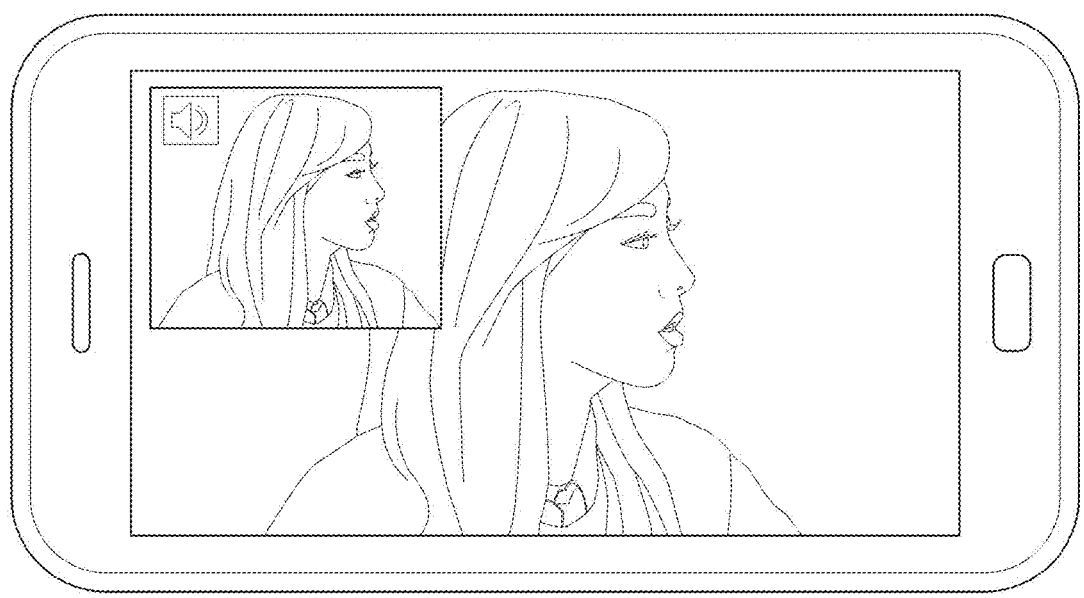

Referring to FIG. 70, if the user selects a user interface (e.g., a speaker emoticon), the controller 180 can selectively play the video section in which a voice or sound of a selected character appears only. Moreover, the controller 180 can selectively play only the video section, in which a face of the selected character appears, by performing the face tracking in the video section in which the voice of the selected character is output.

Figure 71:
Figure 72:
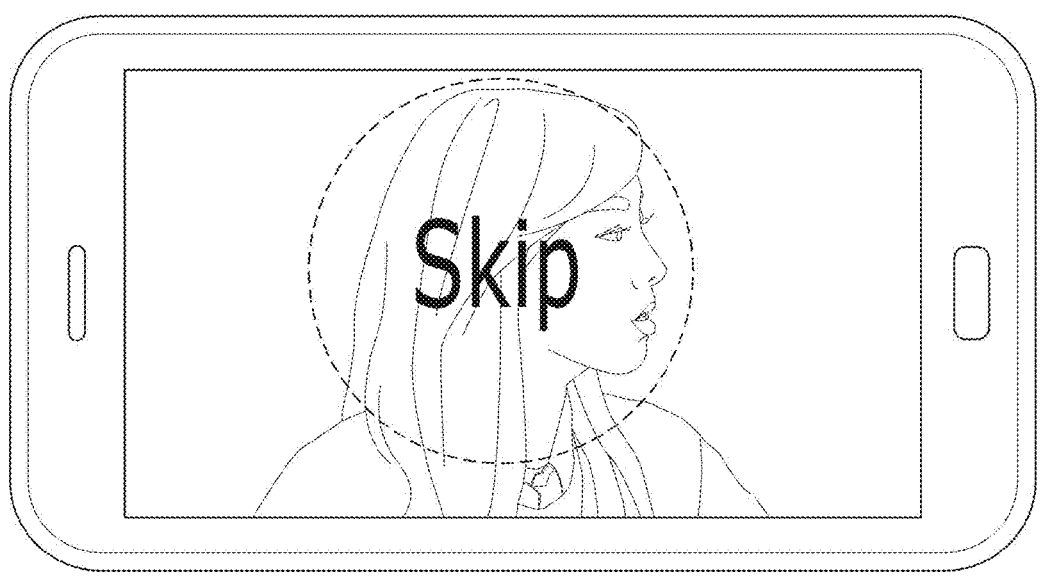
Figure 73:
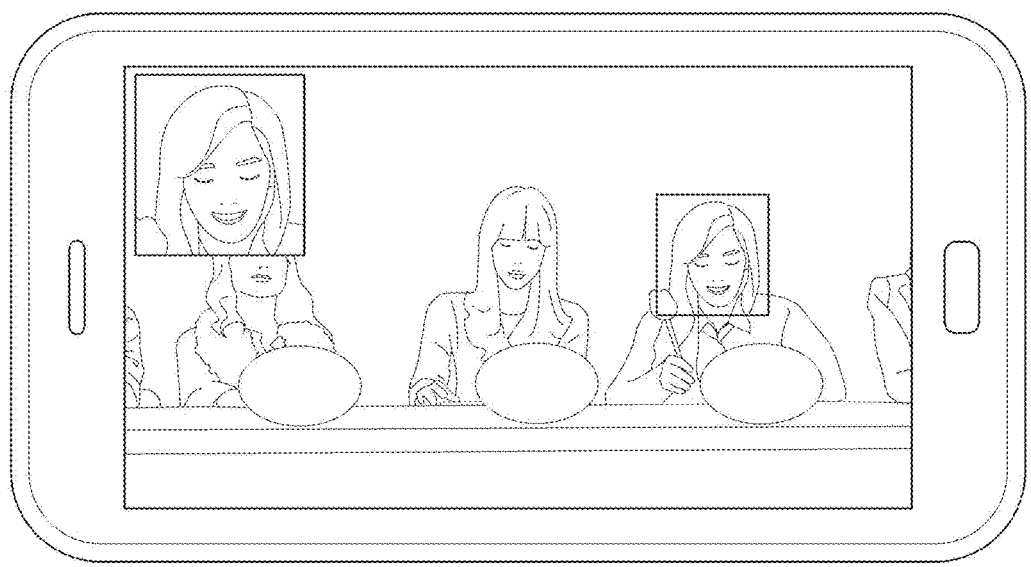
Figure 74:
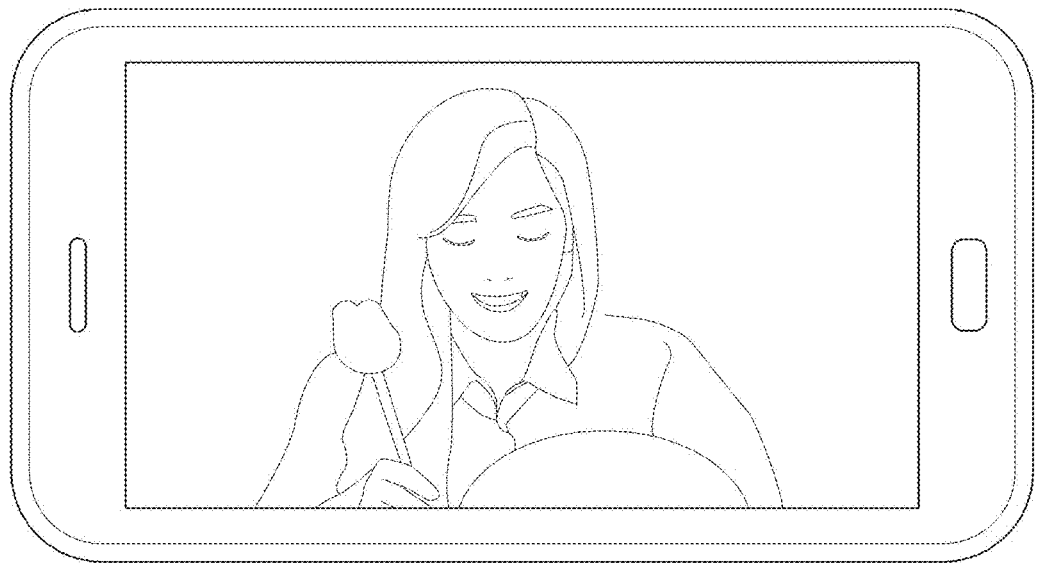
Figure 74:
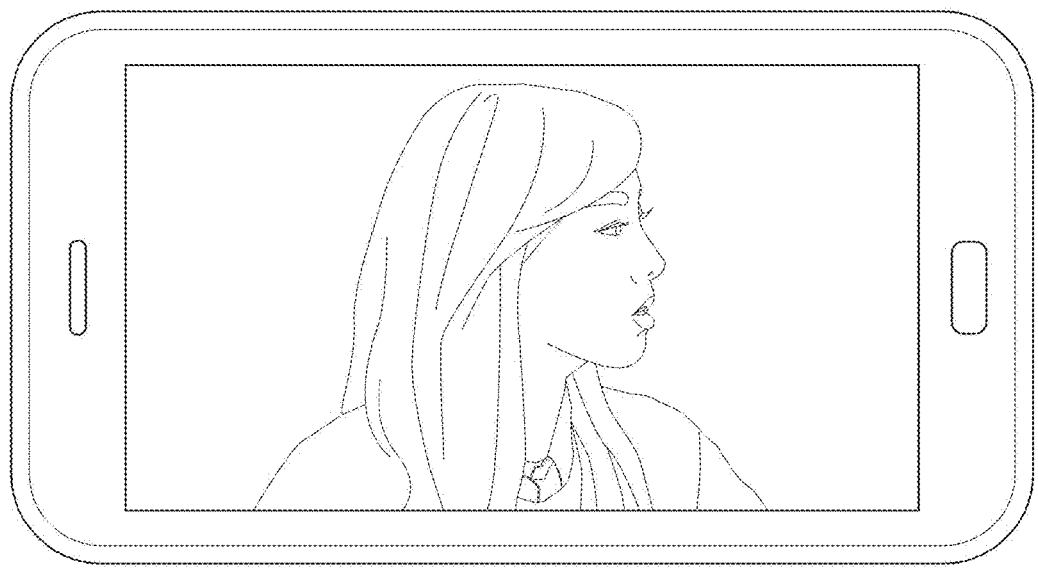

Referring to FIG. 71, the controller 180 can selectively play only the video section in which both eyes of the selected character appear. Yet, referring to FIG. 72, if only one eye appears, the controller 180 determines that it is a profile and then skips to play the corresponding video section. In order to determine whether both eyes are displayed on the screen, the controller 180 makes a determination by combining the eye shapes, a presence or non-presence of eyebrow, and the like but does not take the pupil of the eyes as a reference only to prevent a video section of closing eyes or winking from being skipped. If a user selects an emoticon for a zoom-in play during a tracking zoom play (FIG. 73), the controller 180 plays a tracked face as a full screen (FIG. 74).

Figure 75:
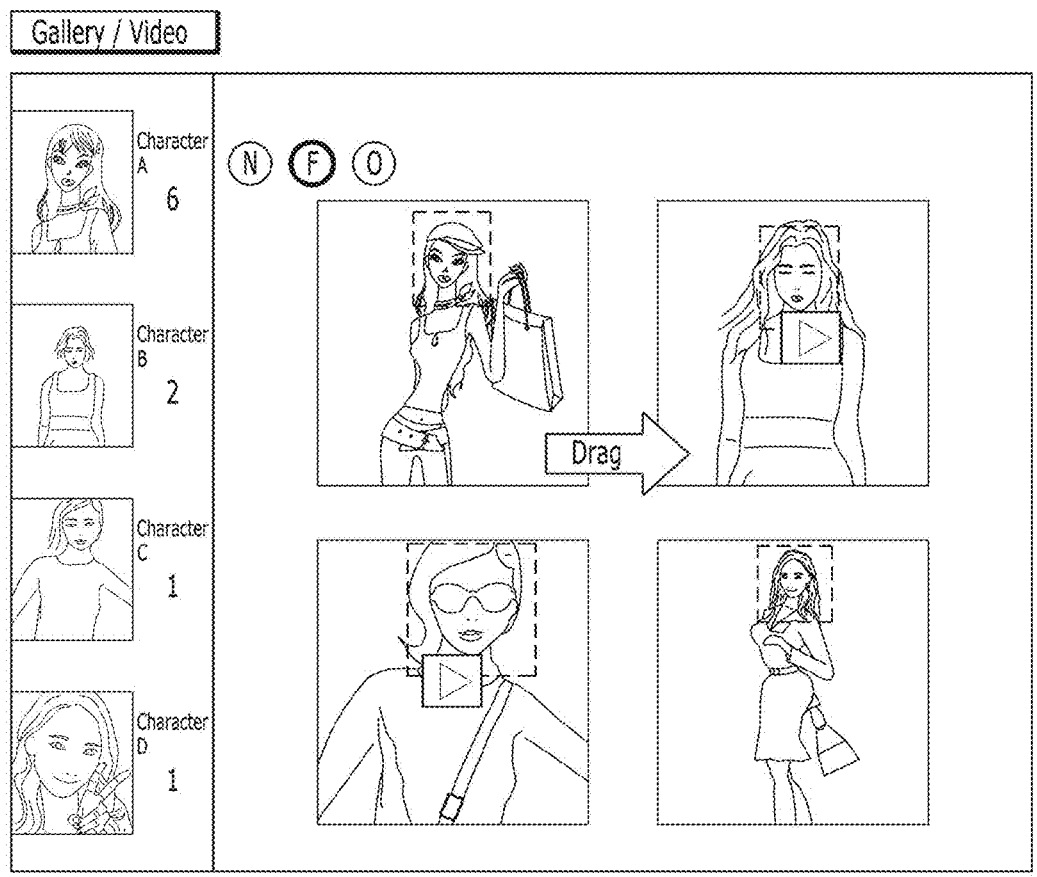
Figure 76:
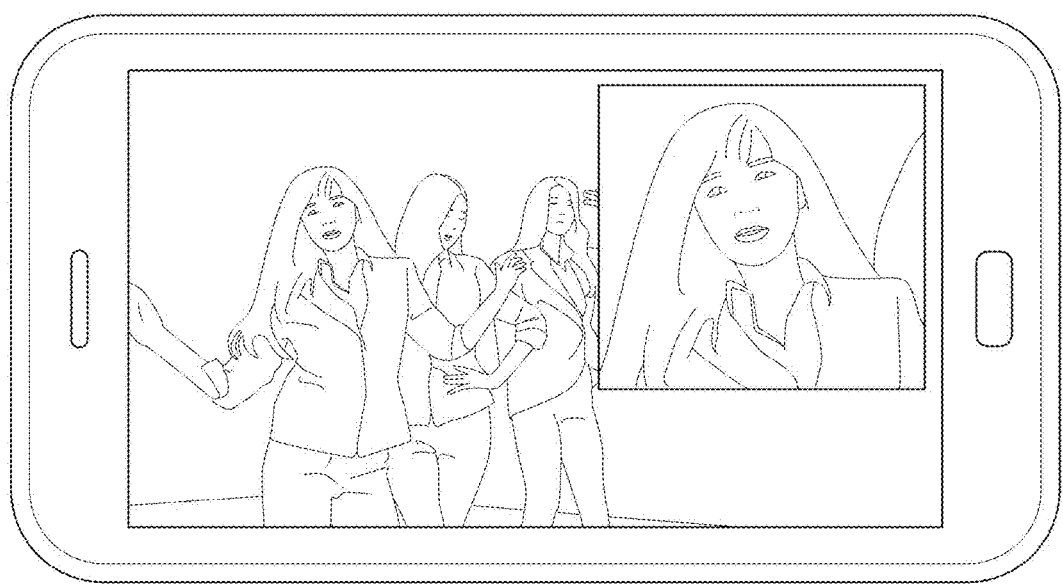

FIG. 75 and FIG. 76 are diagrams to describe another example of an operation of the mobile terminal 100 in association with a video. Referring to FIG. 75, the controller 180 displays a multitude of images and videos per same folder, same date or same time slot within a gallery on the display unit 151.

Subsequently, if a face tracking mode is selected, the controller 180 displays faces available for face tracking in the images and videos included in a specific folder and can also display a thumbnail, personal information, and the number of images and videos, in which a corresponding face appears, of each of the faces on one side of the display unit 151. Further, the controller 180 can sort the thumbnails in order of the number of per-face videos. If a user selects a face included in an image through a touch input (e.g., a drag) and then moves it to a specific video, referring to FIG. 76, the controller 180 plays the specific video by tracking zooming in on the selected face.

Figure 77:
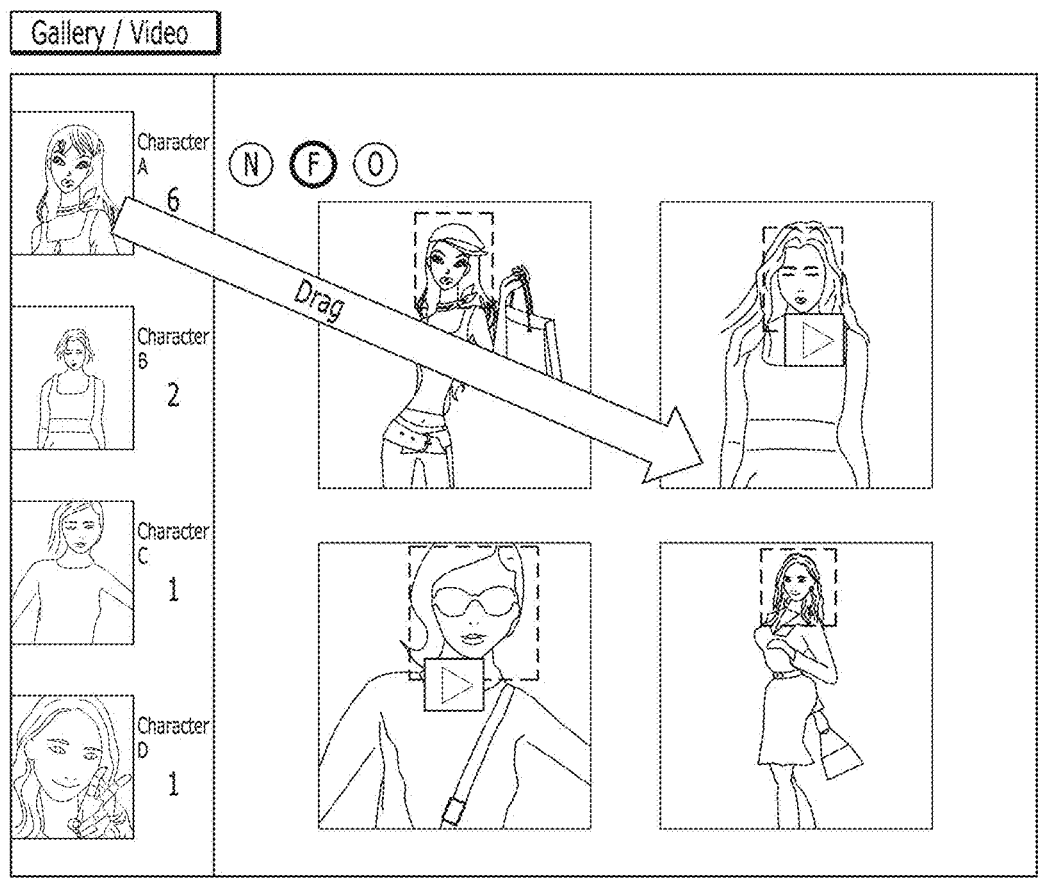
Figure 78:
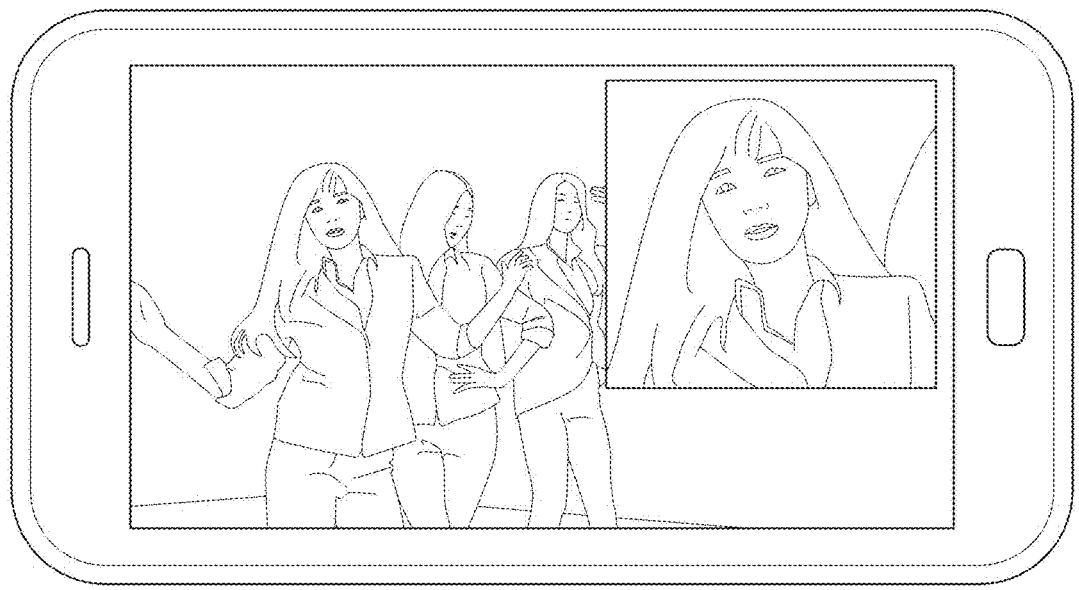

FIG. 77 and FIG. 78 are diagrams to describe another example of an operation of the mobile terminal 100 in association with a video. Referring to FIG. 77, the controller 180 displays a multitude of images and videos per same folder, same date or same time slot within a gallery on the display unit 151.

Subsequently, if a face tracking mode is selected, the controller 180 displays faces available for face tracking in the images and videos included in a specific folder and can also display a thumbnail, personal information, and the number of images and videos, in which a corresponding face appears, of each of the faces on one side of the display unit 151. Further, the controller 180 can sort the thumbnails in order of the number of per-face videos. If a user selects a thumbnail or personal information displayed on a left side through a touch input (e.g., a drag) and then moves it to a specific video, referring to FIG. 78, the controller 180 plays the specific video by tracking zooming in on the selected face (Character b).

Figure 79:
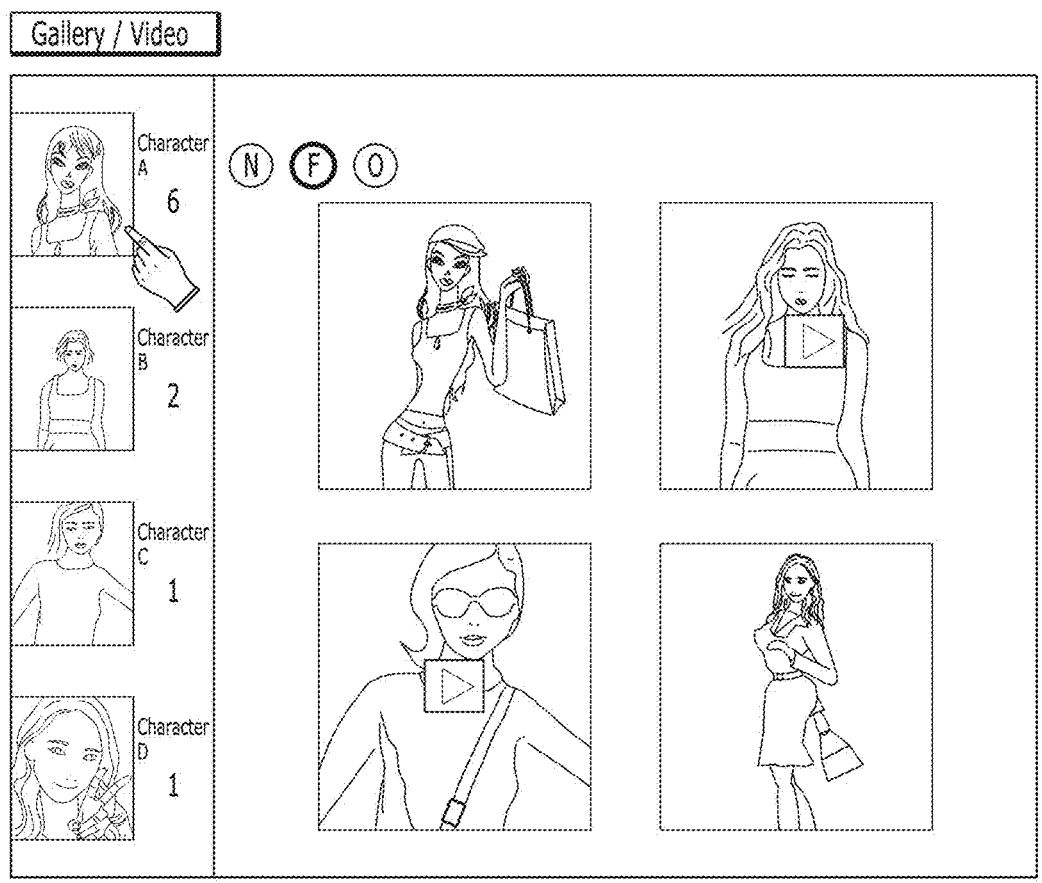
Figure 80:
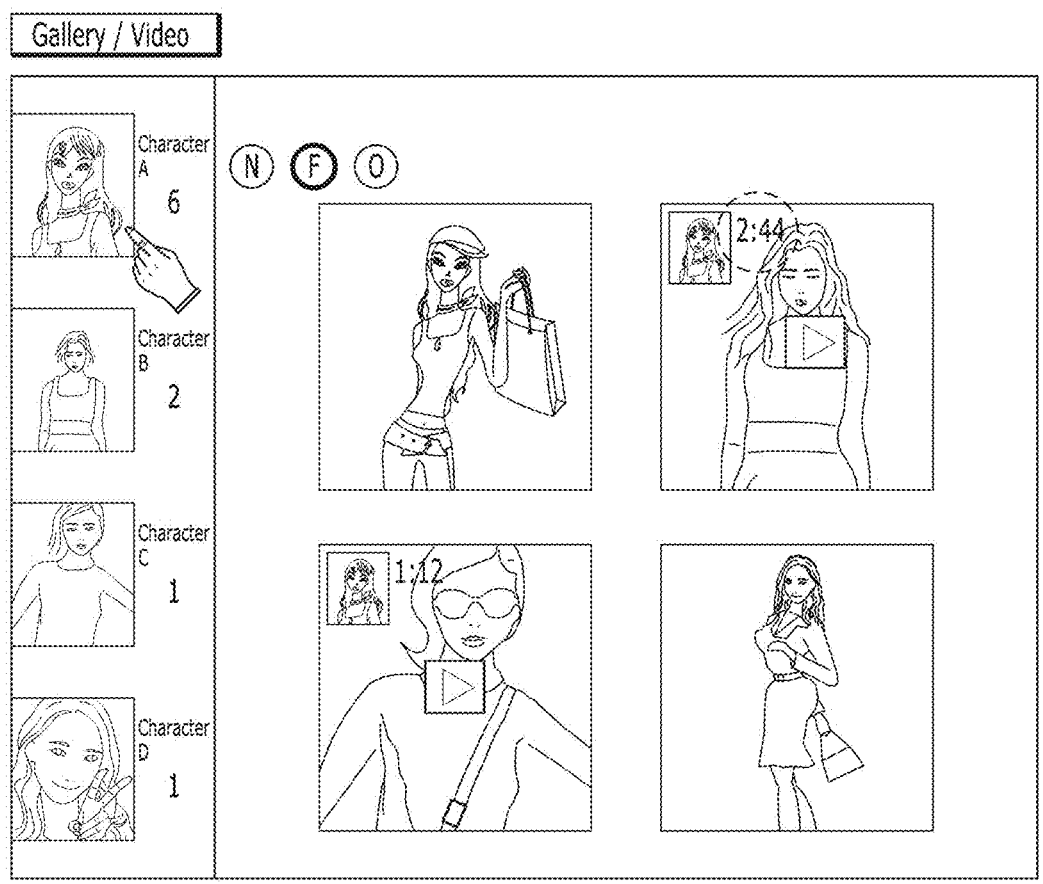

FIG. 79 and FIG. 80 are diagrams to describe another example of an operation of the mobile terminal 100 in association with a video. Referring to FIG. 79, the controller 180 displays a multitude of images and videos per same folder, same date or same time slot within a gallery on the display unit 151.

Subsequently, if a face tracking mode is selected, the controller 180 displays faces available for face tracking in the images and videos included in a specific folder and can also display a thumbnail, personal information, and the number of images and videos, in which a corresponding face appears, of each of the faces on one side of the display unit 151. Further, the controller 180 can sort the thumbnails in order of the number of per-face videos.

If a user selects a thumbnail or personal information of Character a through a touch input, referring to FIG. 80, the controller 180 can sort the videos in order of length/time of a video section in which the selected face (Character a) has a rate equal to or greater than a predetermined rate in a screen. In particular, the controller 180 sorts the videos in order of a long time for the selected face to appear. Further, the controller 180 can display a selected face appearing time on each of the videos.

Figure 81:
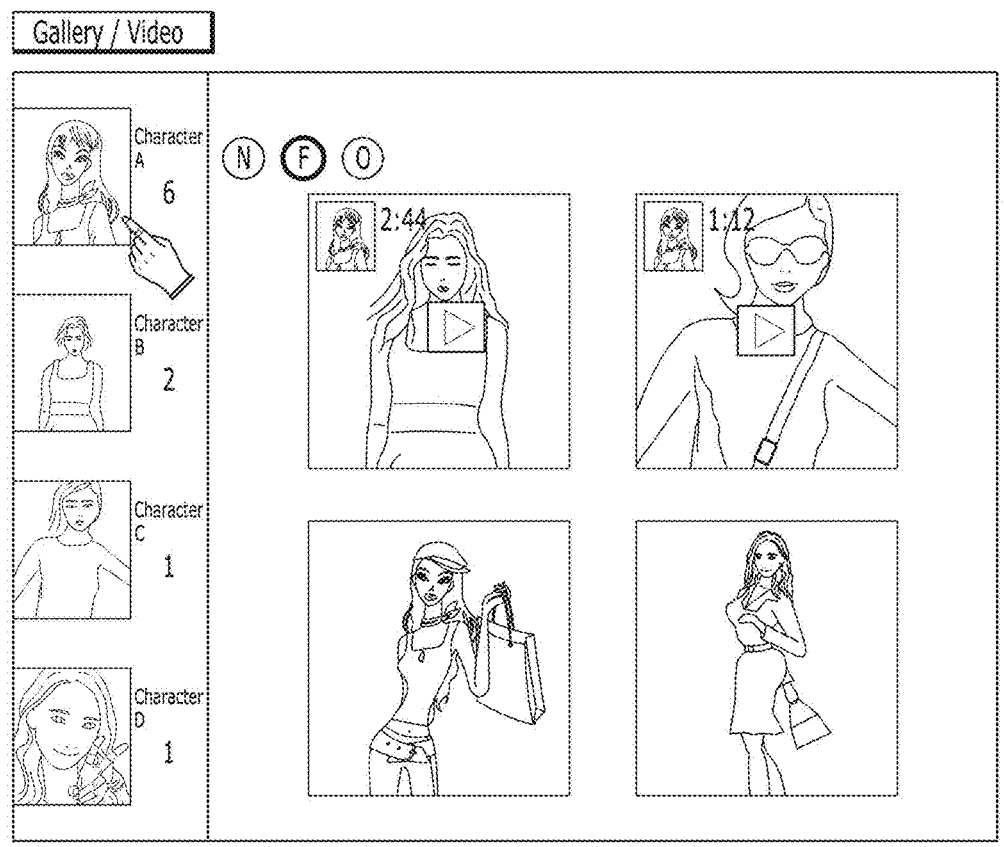
Figure 82:
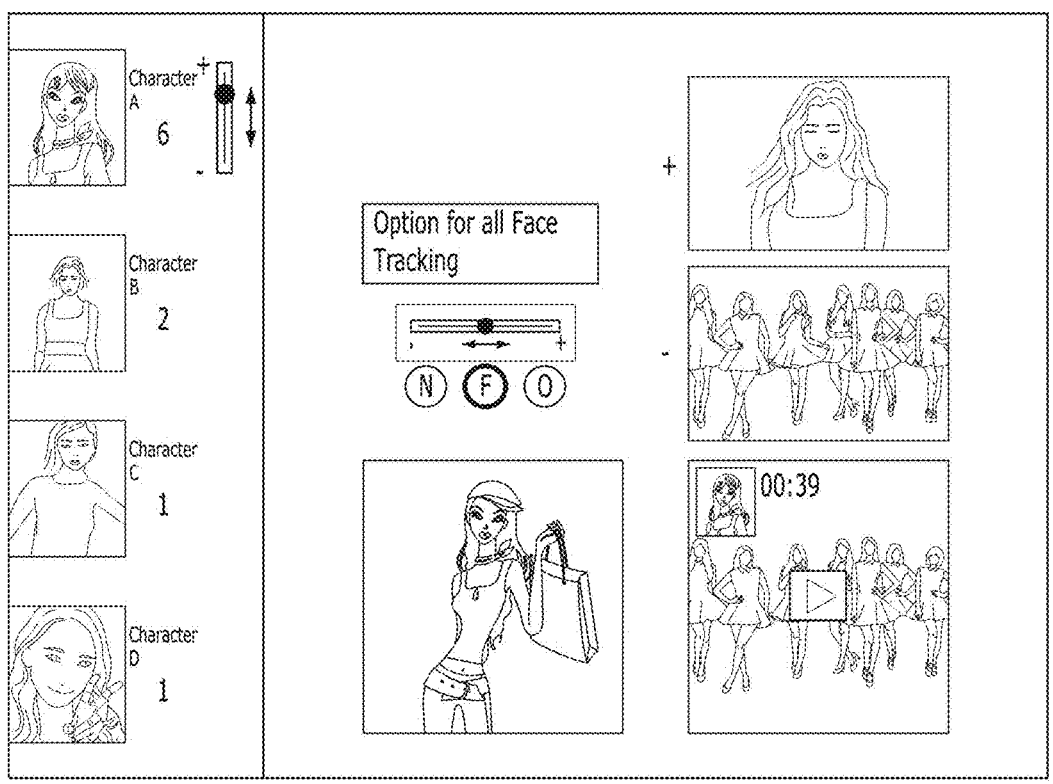

FIG. 81 and FIG. 82 are diagrams to describe another example of an operation of the mobile terminal 100 in association with a video. Referring to FIG. 81, the controller 180 displays a multitude of images and videos per same folder, same date or same time slot within a gallery on the display unit 151.

Subsequently, if a face tracking mode is selected, the controller 180 displays faces available for face tracking in the images and videos included in a specific folder and can also display a thumbnail, personal information, and the number of images and videos, in which a corresponding face appears, of each of the faces on one side of the display unit 151. Further, the controller 180 can sort the thumbnails in order of the number of per-face videos.

If a user selects a thumbnail or personal information of Character a through a touch input, the controller 180 can sort the videos in order of length/time of a video section in which the selected face (Character a) has a rate equal to or greater than a predetermined rate in a screen. In particular, the controller 180 sorts the videos in order of a long time for the selected face to appear. Further, the controller 180 can display a selected face appearing time on each of the videos.

Moreover, it can set up a size of the selected face. Referring to FIG. 82, a user can set up a size of the selected face using a bar displayed around the corresponding thumbnail. For instance, if a pointer is shifted up (+) on the bar, the controller 180 sets a size of a face, which is to be tracked, to a large size. The controller 180 can display a time of a video section in which a face having a size equal to or greater than the set size appears. And, the controller 180 can control the corresponding section to be selectively played.

Figure 83:
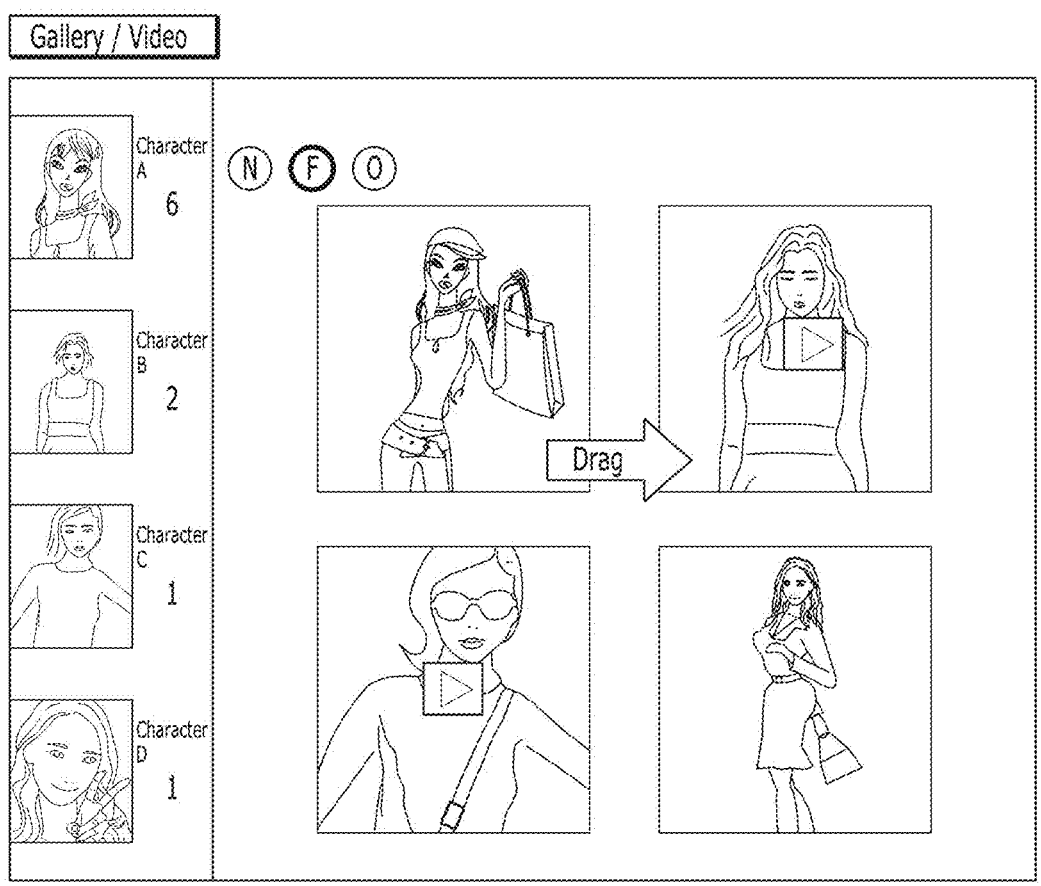
Figure 84:
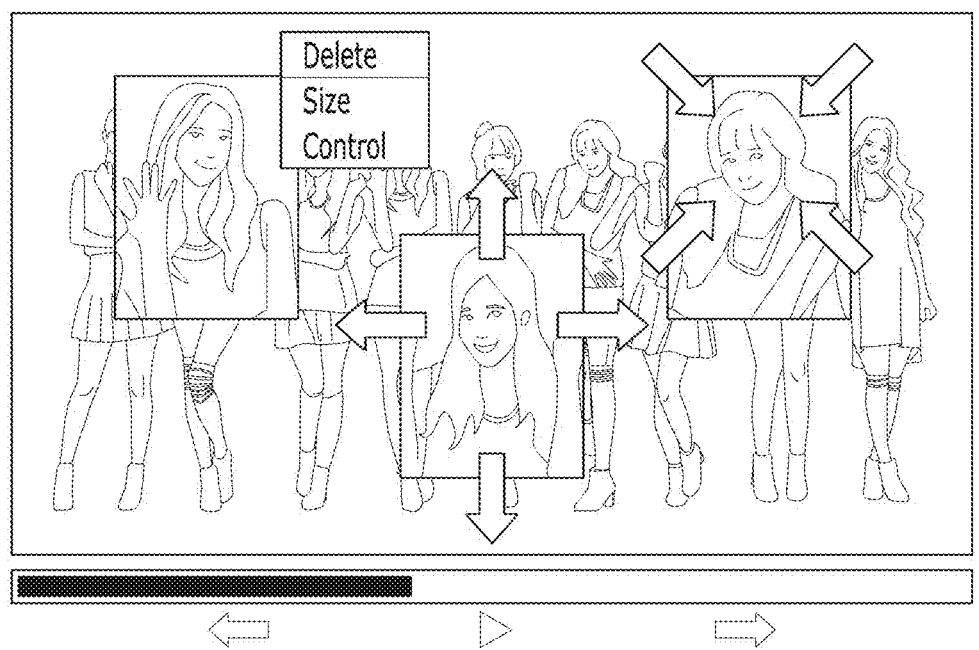

FIG. 83 and FIG. 84 are diagrams to describe another example of an operation of the mobile terminal 100 in association with a video. Referring to FIG. 83, the controller 180 displays a multitude of images and videos per same folder, same date or same time slot within a gallery on the display unit 151.

Subsequently, if a face tracking mode is selected, the controller 180 displays faces available for face tracking in the images and videos included in a specific folder and can also display a thumbnail, personal information, and the number of images and videos, in which a corresponding face appears, of each of the faces on one side of the display unit 151. Further, the controller 180 can sort the thumbnails in order of the number of per-face videos.

If a user selects an image containing a multitude of characters therein through a touch input (e.g., a drag) and then moves it to a specific video, referring to FIG. 84, the controller 180 plays the specific video by tracking zooming in on the selected faces. Further, the controller 180 can perform deletion, size adjustment, focus adjustment, and/or position shift on some of the selected faces.

Figure 85:
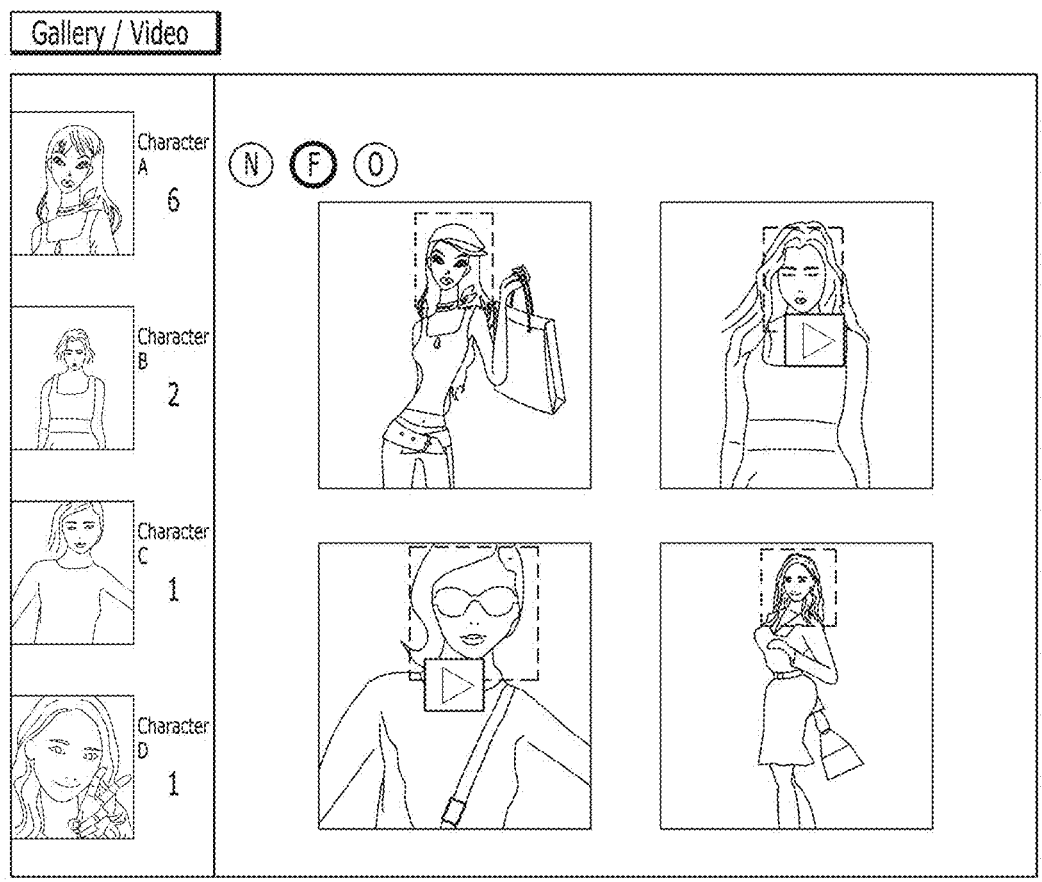
Figure 86:
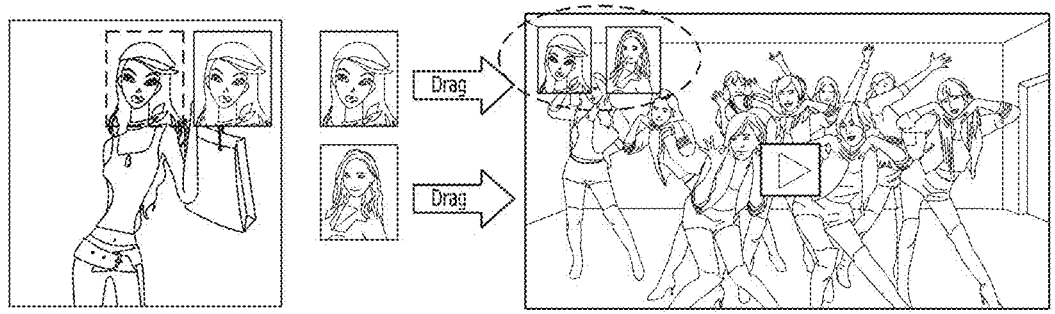
Figure 87:

FIGS. 85 to 87 are diagrams to describe another example of an operation of the mobile terminal 100 in association with a video. Referring to FIG. 85, the controller 180 displays a multitude of images and videos per same folder, same date or same time slot within a gallery on the display unit 151.

Subsequently, if a face tracking mode is selected, the controller 180 displays faces available for face tracking in the images and videos included in a specific folder and can also display a thumbnail, personal information, and the number of images and videos, in which a corresponding face appears, of each of the faces on one side of the display unit 151. Further, the controller 180 can sort the thumbnails in order of the number of per-face videos.

Referring to FIG. 86, if a user selects a thumbnail or a face from an image through a touch input (e.g., a long key) and then moves the selected face to a specific video through a different touch input (e.g., a drag), the controller 180 plays the specific video by tracking zooming in on the selected face. Further, referring to FIG. 87, the controller 180 can perform deletion, size adjustment, focus adjustment, and/or position shift on some of the selected faces.

Figure 88:
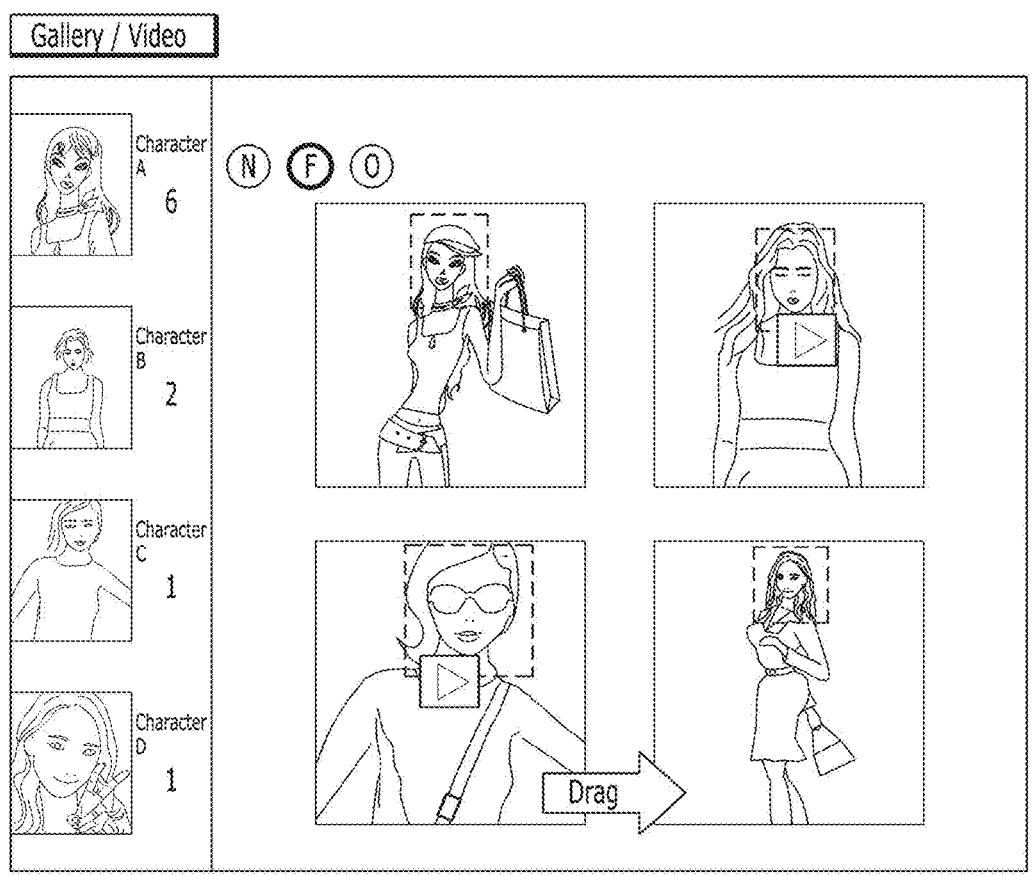
Figure 89:
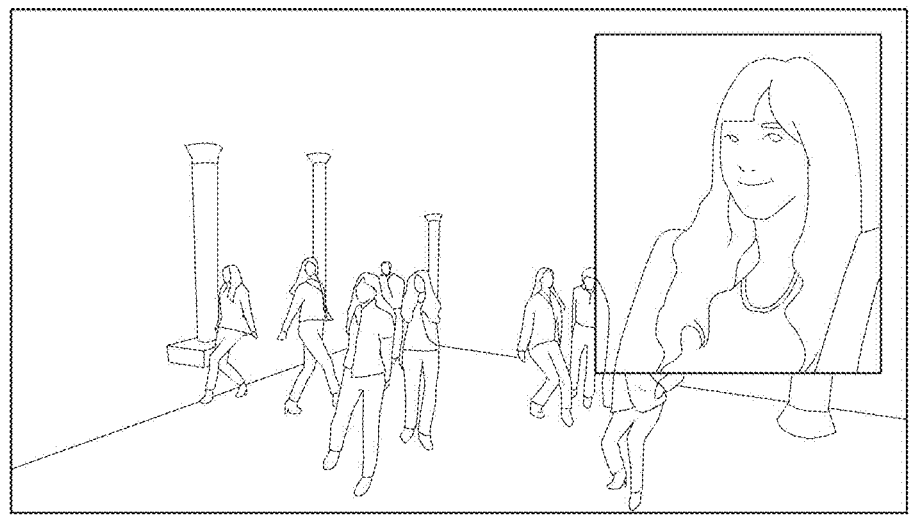
Figure 90:
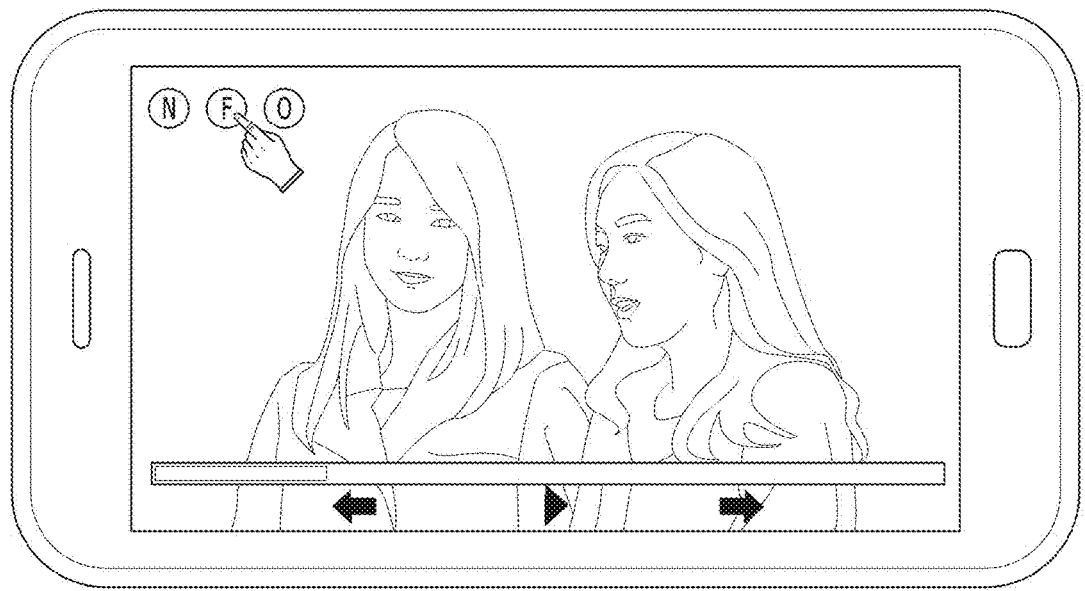
Figure 91:
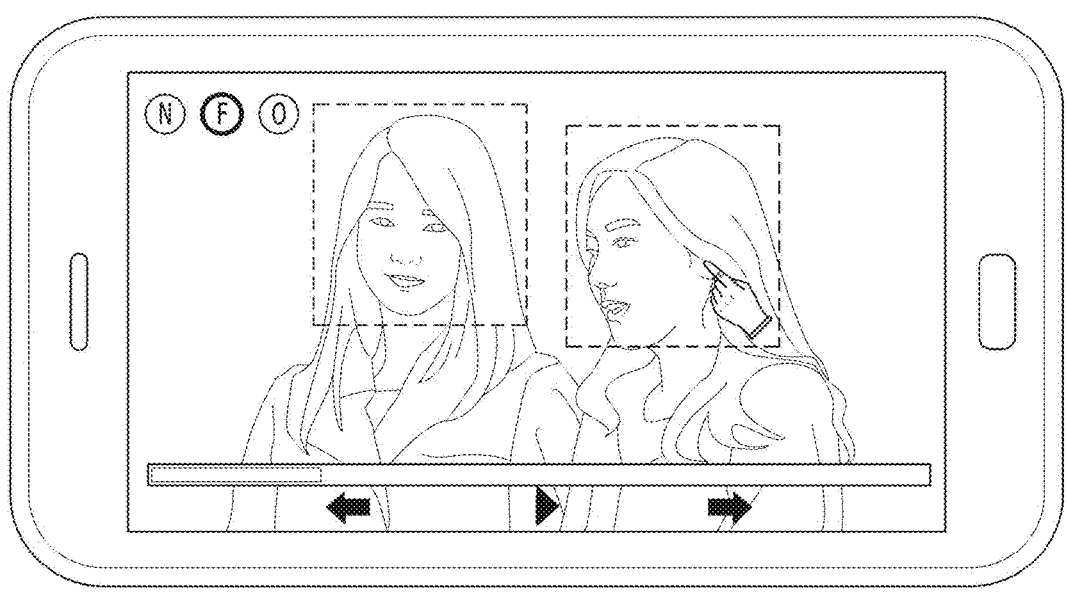

FIG. 88 and FIG. 89 are diagrams to describe another example of an operation of the mobile terminal 100 in association with a video. Referring to FIG. 88, the controller 180 displays a multitude of images and videos per same folder, same date or same time slot within a gallery on the display unit 151.

Subsequently, if a face tracking mode is selected, the controller 180 displays faces available for face tracking in the images and videos included in a specific folder and can also display a thumbnail, personal information, and the number of images and videos, in which a corresponding face appears, of each of the faces on one side of the display unit 151. Further, the controller 180 can sort the thumbnails in order of the number of per-face videos.

If a user moves a face selected from a video to a specific image through a touch input (e.g., a drag), referring to FIG. 89, the controller 180 can display a photo of the selected face on a portion of a video screen while playing the corresponding video.

Figure 92:
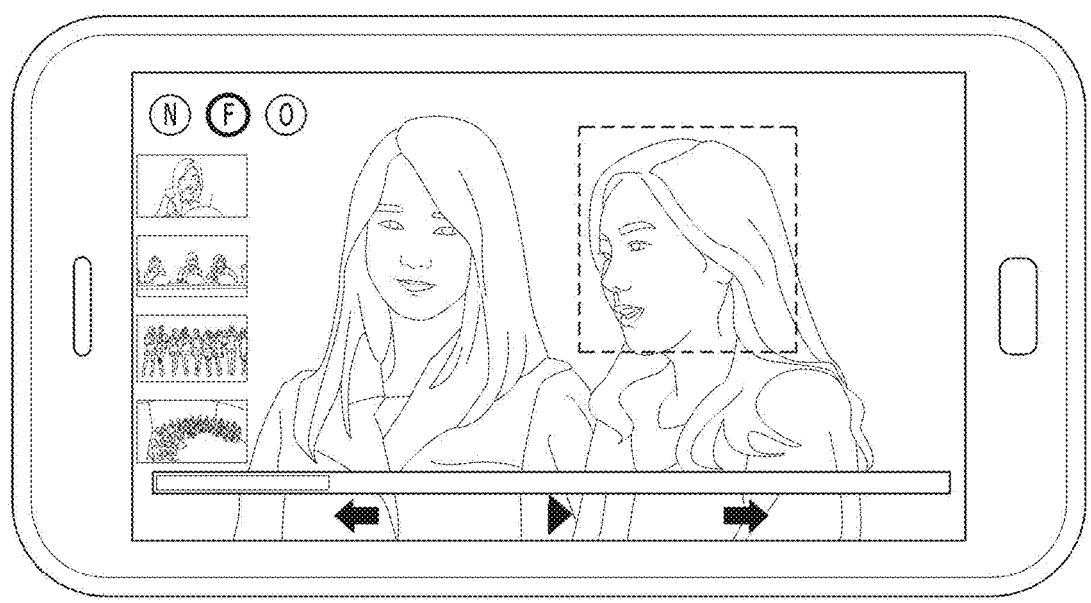

FIGS. 90 to 94 show one example of playing a video. Referring to FIGS. 90 to 94, while a video is played, if a user selects a face tracking mode (FIG. 90) and also selects a desired face from the video (FIG. 91), the controller 180 displays photos containing the selected face therein on one side of the video screen (FIG. 92).

Figure 93:
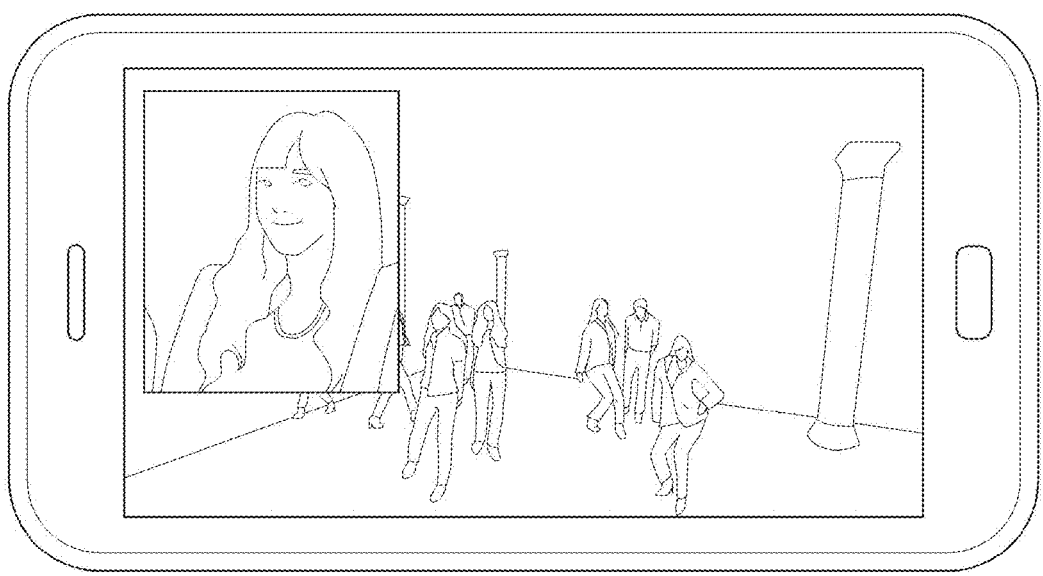
Figure 94:
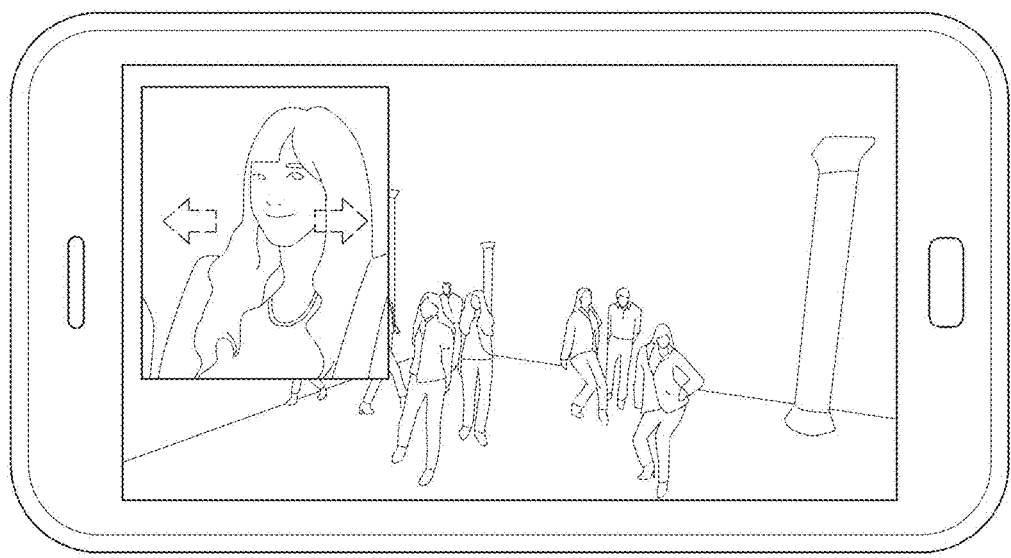

If the user selects one of the photos containing the selected face, referring to FIG. 93, the controller 180 displays the selected photo on the display unit 151 and then performs tracking zoom-in on the selected face in the selected photo. Further, referring to FIG. 94, the controller 180 can change a size of the selected face in response to a user's touch input.

Figure 95:
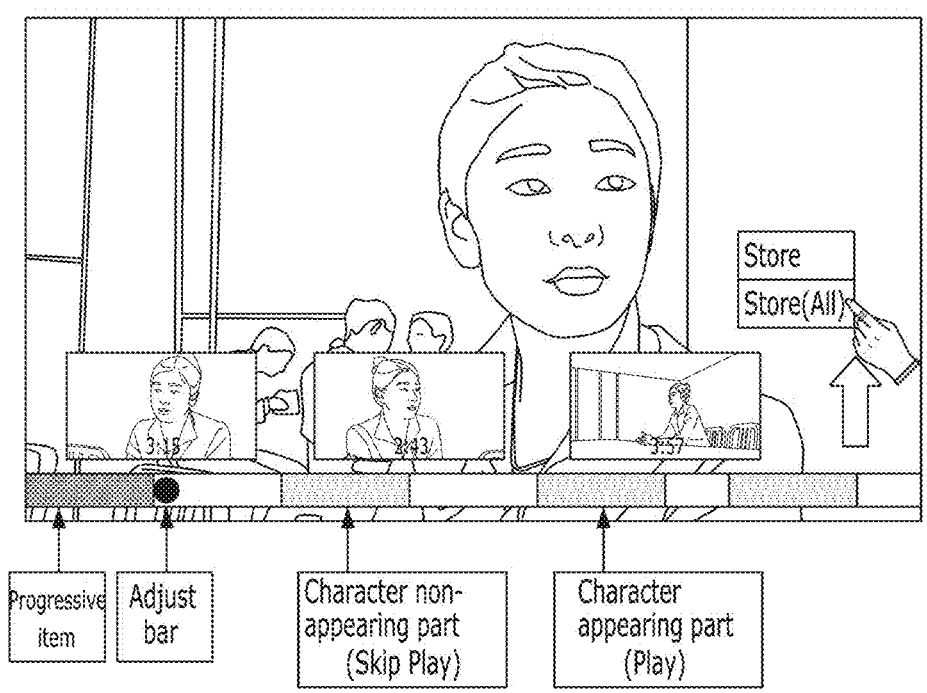

FIG. 95 shows another example of playing a video. First of all, while a video is being played using face detecting and face tracking, the controller 180 can selectively play only a video section in which a selected face occupies a screen of the video over a predetermined rate. On the contrary, a video section in which the selected face fails to occupy the video screen over the predetermined rate is skipped.

Referring to FIG. 95, the controller 180 displays a video section containing a selected face and a video section failing to contain the selected face on a playtime bar. In particular, the controller 180 can display a thumbnail on the playtime bar as well in order to indicate a start position of a video section occupied over a predetermined rate by the selected face. And, the controller 180 can control thumbnails to be saved in the memory 160 automatically or manually.

Figure 96:
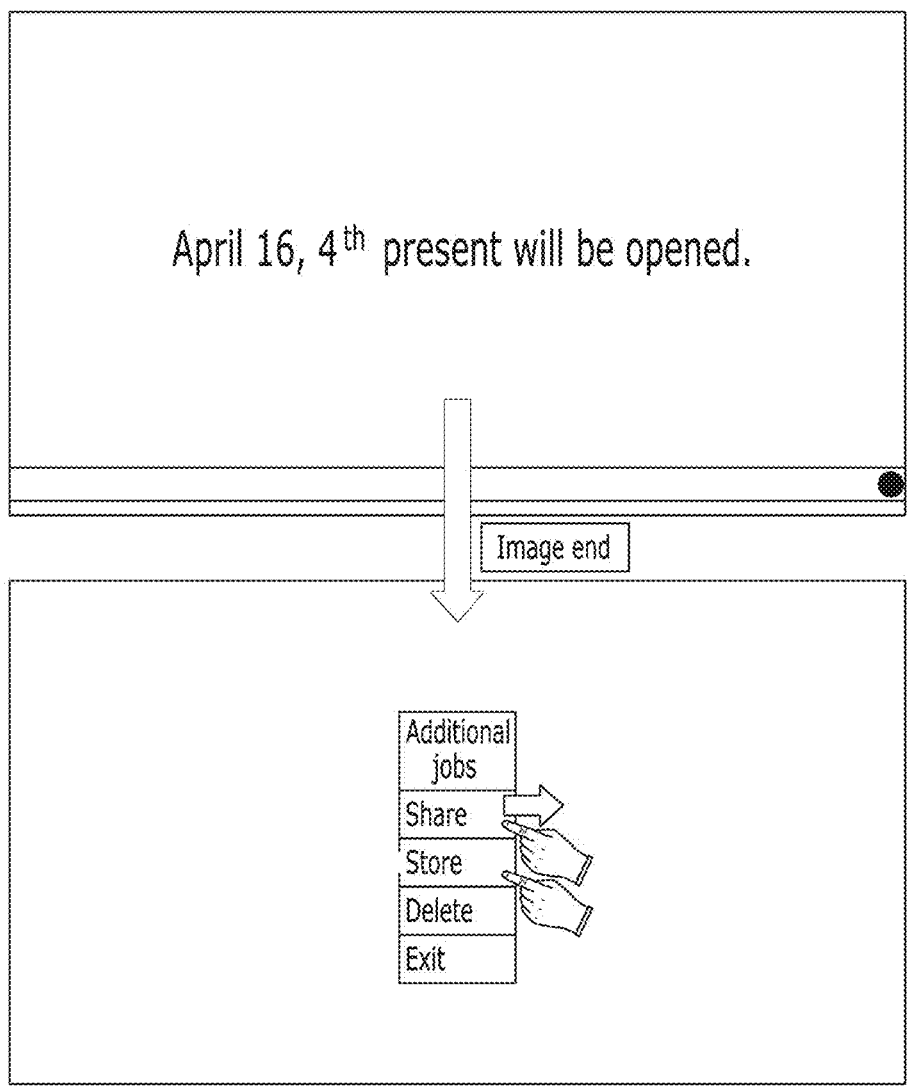

Referring to FIG. 96, the image/videos corrected/played by the methods according to the embodiments mentioned in the foregoing description can be converted to or saved as a different file and can be sent to other terminals. Moreover, the correcting methods and the playing methods according to the embodiments mentioned in the foregoing description can be combined together or modified.

Accordingly, embodiments of the present invention provide several advantages. According to at least one of embodiments of the present invention, focus adjustment of a photographed photo or video is facilitated and a multi-focus can be set. Further, a face included in a photographed photo or video is tracked and the photo or video can be played or edited using the tracked face.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a memory configured to store a plurality of videos;
a touchscreen configured to display an image on a screen; and
a controller configured to:
in response to receiving a selection of an object included in the image, search the videos for at least one video including an image of the selected object,
control the touchscreen to display an item list including at least one item indicating the searched at least one video on the image,
when the object within the image is touched and then dragged and dropped onto a specific item of the item list, play a video corresponding to the specific item,
when the video corresponding to the specific item is played, simultaneously enlarge the image of the object included in the played video while continuously tracking the image of the object included in the played video, and
control the touchscreen to display each item within the item list by sorting the each item in order of frequency of appearance of the object,
wherein:
the controller is further configured to:
control the touchscreen to display a number of videos including an image of each of a plurality of objects in the image,
control the touchscreen to display a plurality of thumbnails corresponding to each of the plurality of objects, and
sort the plurality of thumbnails in order of the number of videos, and
the image includes a photographed image photographed via a camera of the mobile terminal, and
the controller is further configured to:
control the touchscreen to display the photographed image,
change a focused position in the photographed image in response to a first touch drag input in a first direction,
change a field depth to adjust a range of the focused position in the photographed image in response to a second touch drag input in a second direction orthogonal to the first direction, the second touch drag input being applied to a position having the first touch drag input ended thereat, and
fix the focused position and the range of the focused region in the photographed image in response to a third touch drag input in a third direction orthogonal to the second direction, the third touch drag input being applied to a position having the second touch drag input ended thereat.

2. The mobile terminal of claim 1, wherein when the video is played, the controller is further configured to selectively adjust at least one of a focus, a position, or a size of the object.

3. The mobile terminal of claim 2, wherein the controller is further configured to display a window on a play screen of the video and display a play image of the object adjusted video within the window.

4. The mobile terminal of claim 1, wherein when the video is played, the controller is further configured to selectively play at least one of a section including the object, a section having an area rate of the object equal to or greater than a reference value, or a section having a sound related to the object.

5. The mobile terminal of claim 1, wherein the image includes a video recorded via the camera of the mobile terminal, and
wherein the controller is further configured to adjust a focus of the recorded video in response to a motion of a selected subject while the recorded video is displayed.

6. The mobile terminal of claim 5, wherein the controller is further configured to adjust the focus of the recorded video to enable the selected subject to be focused on in response to a first touch input received from the touchscreen, and adjust a focus gauge of the selected subject in response to a second touch input received from the touchscreen.

7. The mobile terminal of claim 5, wherein the controller is further configured to identify the selected subject in accordance with a motion of user eyes and adjust a focus gauge of the selected subject.

8. The mobile terminal of claim 5, wherein the controller is further configured to predict a moving path of the selected subject in the recorded video, and adjust the focus of the recorded video to focus on at least one subject located on the predicted moving path.

9. The mobile terminal of claim 5, wherein the controller is further configured to adjust the focus of the recorded video to focus on a subject contacting the selected subject in the recorded video.

10. The mobile terminal of claim 5, wherein the controller is further configured to display a video frame before changing the focus of the recorded video and a video frame after changing the focus of the recorded video, and adjust a time taken to change the focus in accordance with a change of a distance between the two displayed video frames.

11. The mobile terminal of claim 5, wherein the controller is further configured to set a multi-focus of the recorded video in response to a multi-touch input received from the touchscreen.

12. A method of searching a video of a mobile terminal, the method comprising:
displaying an image on a screen of a touchscreen;
in response to receiving a selection of an object included in the image, searching previously stored videos for at least one video including an image of the selected object;
displaying an item list including at least one item indicating the searched at least one video on the image;
displaying each item within the item list by sorting the each item in order of frequency of appearance of the object;
when the object within the image is touched and then dragged and dropped onto a specific item of the item list, playing a video corresponding to the specific item;
when the video corresponding to the specific item is played, simultaneously enlarging the image of the object included in the played video while continuously tracking the image of the object included in the played video;
displaying a number of videos including an image of each of a plurality of objects in the image;
displaying a plurality of thumbnails corresponding to each of the plurality of objects;
sorting the plurality of thumbnails in order of the number of videos;
displaying a photographed image photographed via a camera of the mobile terminal;

changing a focused position in the photographed image in response to a first touch drag input in a first direction;

changing a field depth to adjust a range of the focused position in the photographed image in response to a second touch drag input in a second direction orthogonal to the first direction, the second touch drag input being applied to a position having the first touch drag input ended thereat; and fixing the focused position and the range of the focused region in the photographed image in response to a third touch drag input in a third direction orthogonal to the second direction, the third touch drag input being applied to a position having the second touch drag input ended thereat.

* * * * *